(12) United States Patent
Brazeau

(10) Patent No.: US 9,758,302 B1
(45) Date of Patent: Sep. 12, 2017

(54) AQUATIC STORAGE FACILITIES

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/483,709

(22) Filed: Apr. 10, 2017

Related U.S. Application Data

(63) Continuation of application No. 15/279,113, filed on Sep. 28, 2016, now Pat. No. 9,624,034.

(51) Int. Cl.
*G06F 7/00* (2006.01)
*B65G 1/137* (2006.01)
*B65G 1/06* (2006.01)

(52) U.S. Cl.
CPC ............... *B65G 1/06* (2013.01); *B65G 1/137* (2013.01)

(58) Field of Classification Search
None
See application file for complete search history.

(56) References Cited

U.S. PATENT DOCUMENTS

| 3,379,273 | A | 4/1968 | Chelminski |
| 2002/0049389 | A1 | 4/2002 | Abreu |
| 2011/0090088 | A1* | 4/2011 | Kenney ............... G01F 23/68 340/623 |
| 2012/0192779 | A1* | 8/2012 | Teppig, Jr. ............ B60F 3/0015 114/256 |
| 2013/0182531 | A1 | 7/2013 | Gagliardi et al. |
| 2014/0241123 | A1* | 8/2014 | Sallas ................. G01S 7/52004 367/18 |
| 2015/0019013 | A1* | 1/2015 | Rose ........................ G01L 1/16 700/258 |
| 2016/0215753 | A1* | 7/2016 | Westmoreland .......... F03G 3/00 |

* cited by examiner

*Primary Examiner* — Yolanda Cumbess
(74) *Attorney, Agent, or Firm* — Athorus, PLLC

(57) ABSTRACT

An item may be outfitted with a cartridge for varying a net density of the item and deposited in a body of liquid for storage. The cartridge may cause a net density of the item to exceed a density of the liquid, or to fall below the density of the liquid, and to descend or ascend within the liquid, as desired. The cartridge may also cause a net density of the item to equal the density of the liquid, and thus remain at a constant depth. The cartridge may be configured to receive acoustic signals or other forms of instructions for varying a net density of the item, and may send acoustic signals or other messages identifying a depth or position of the item. The cartridge may thus enable an item to be stored at any depth within the liquid, and be retrieved upon demand.

23 Claims, 49 Drawing Sheets

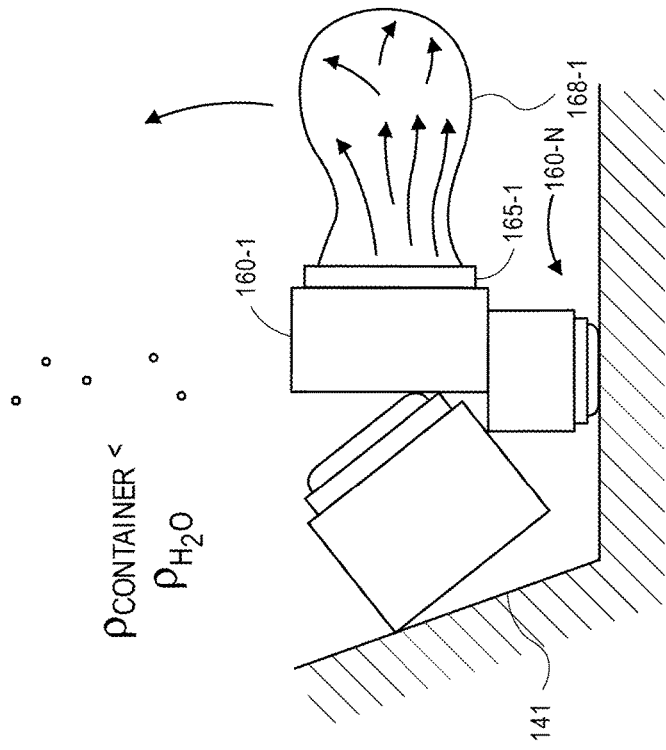
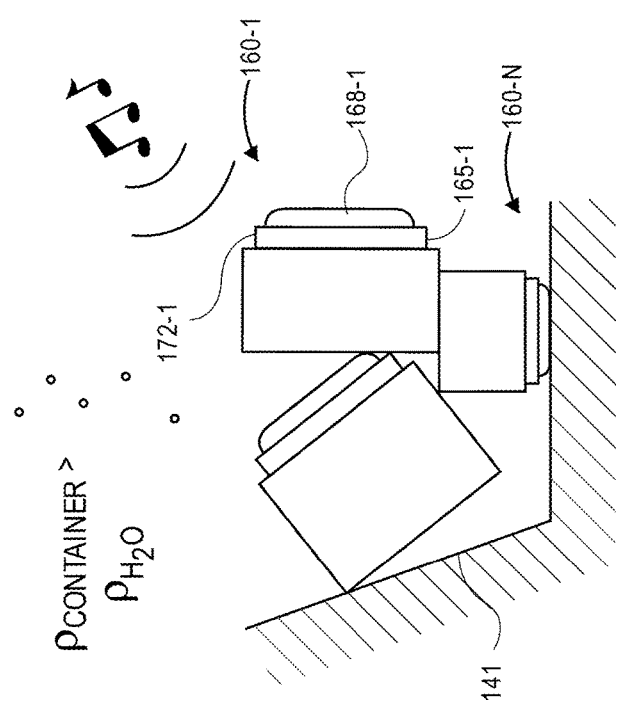

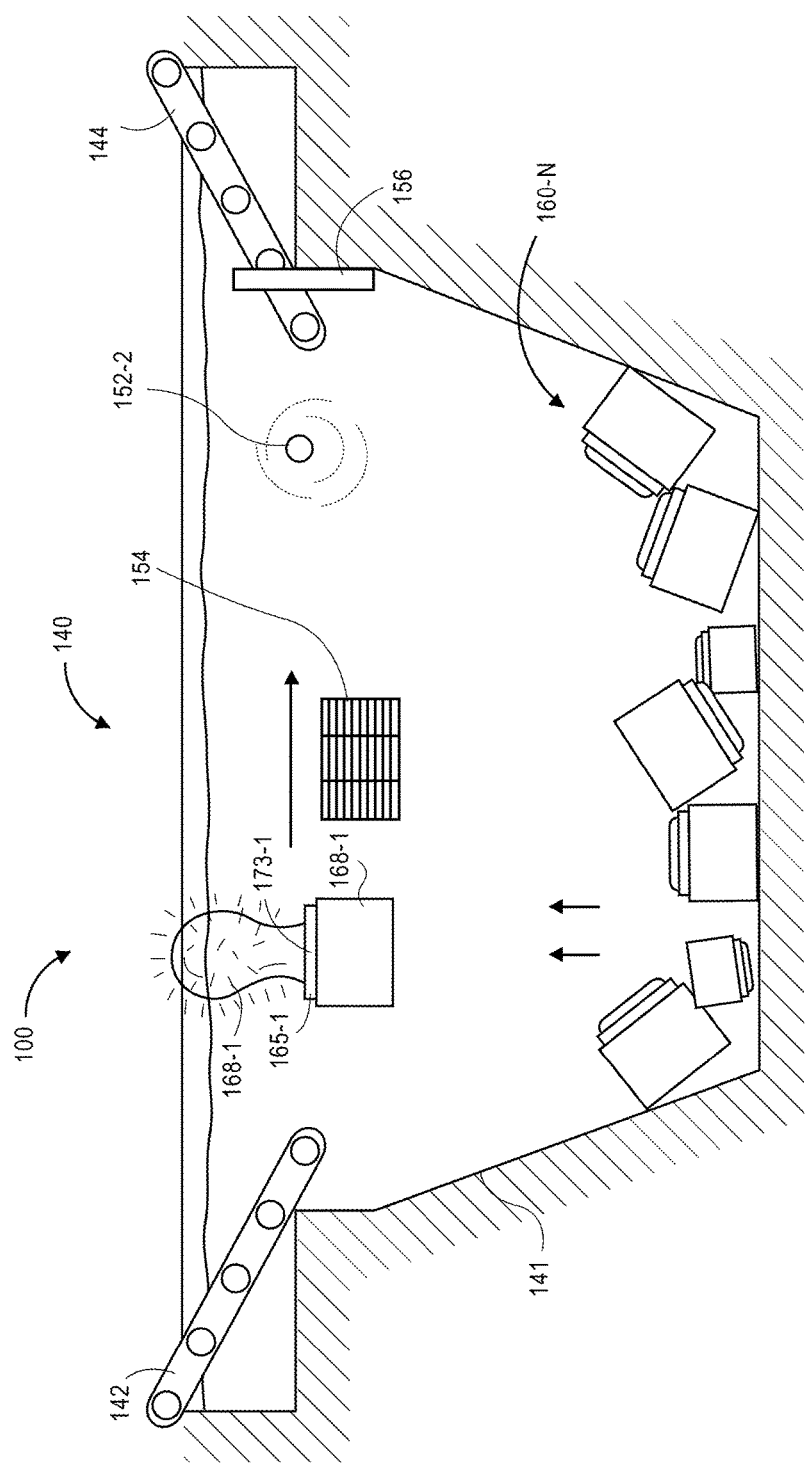

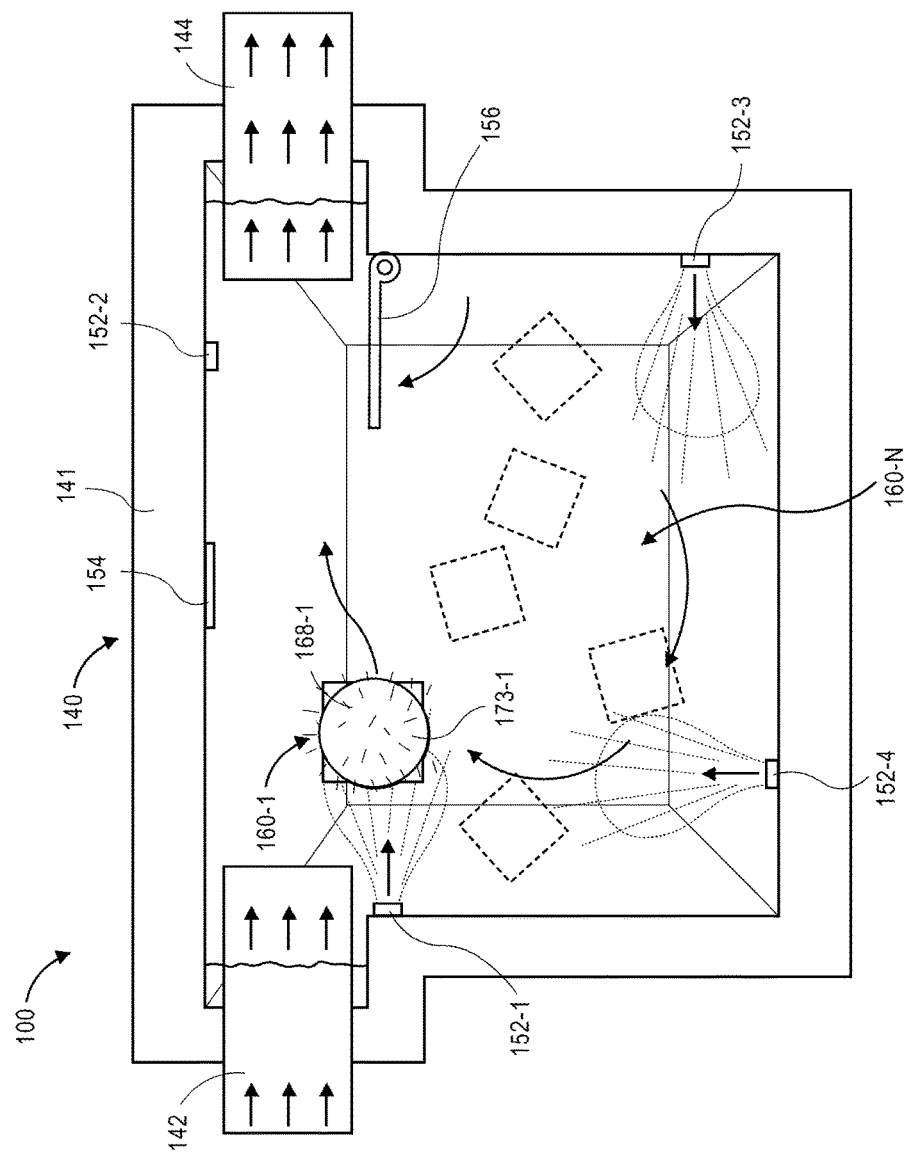

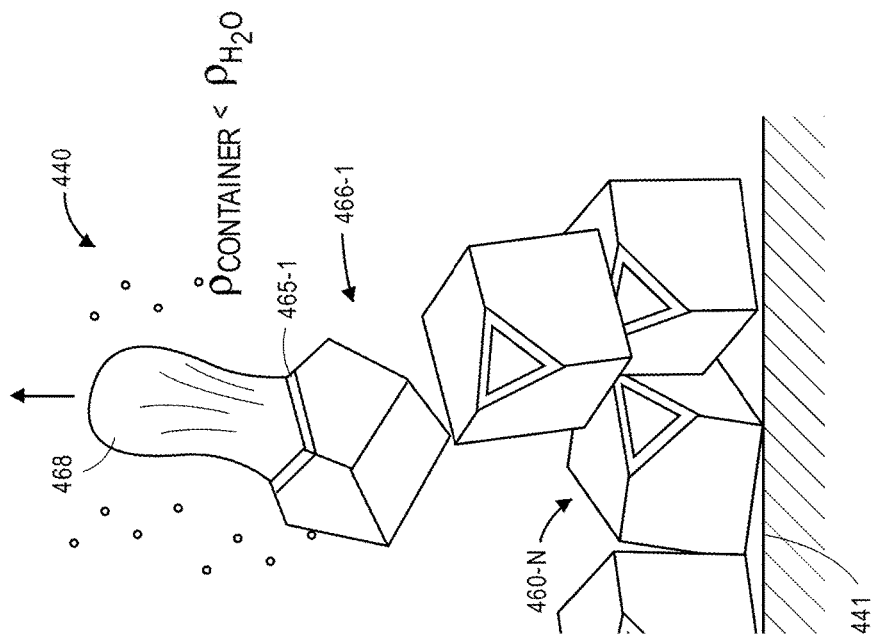
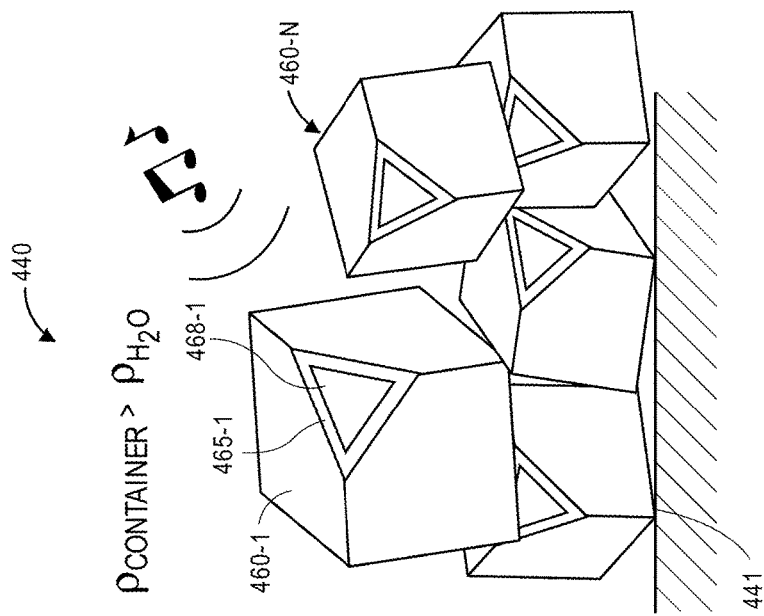
FIG. 4B
FIG. 4A

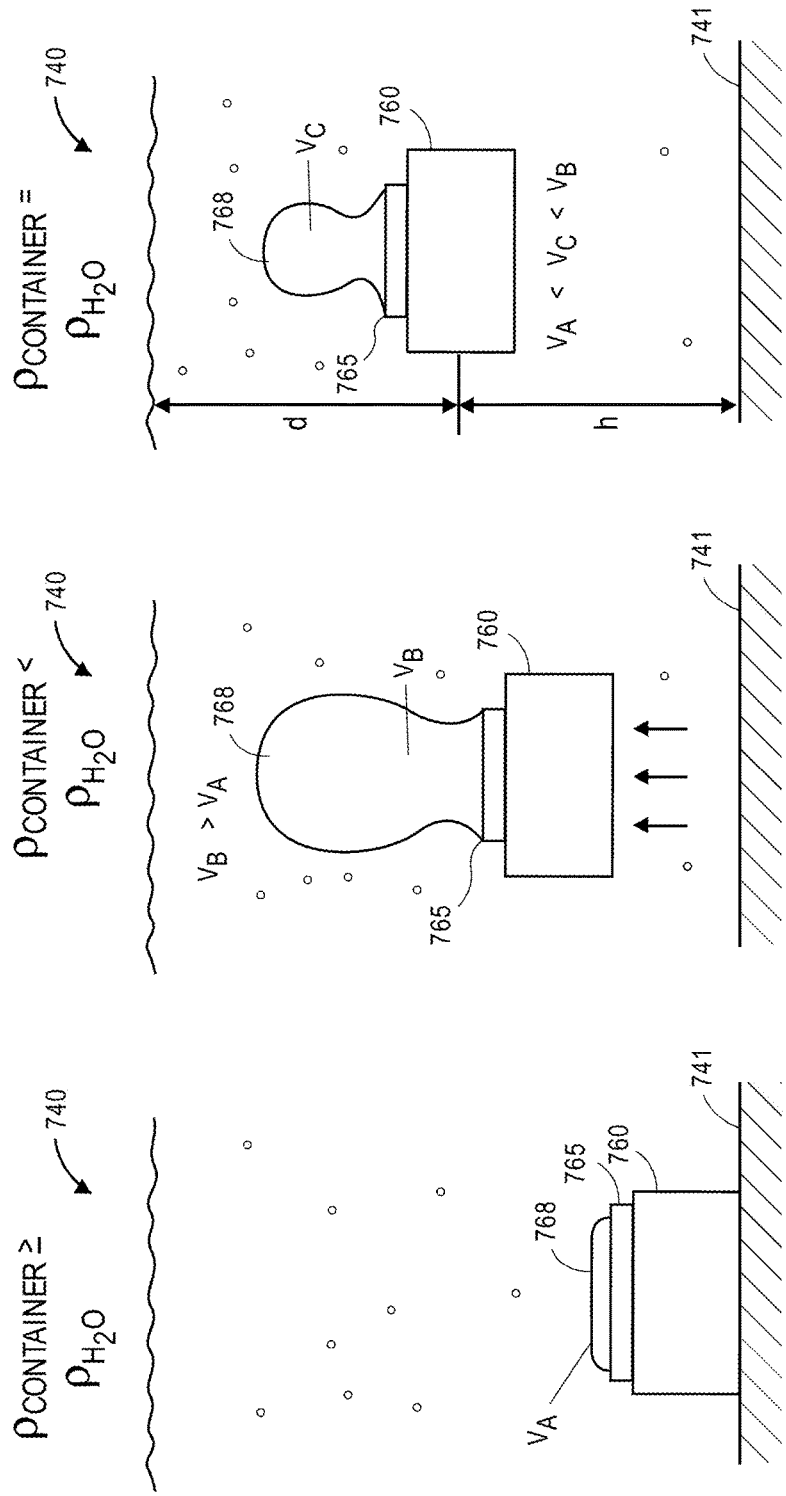

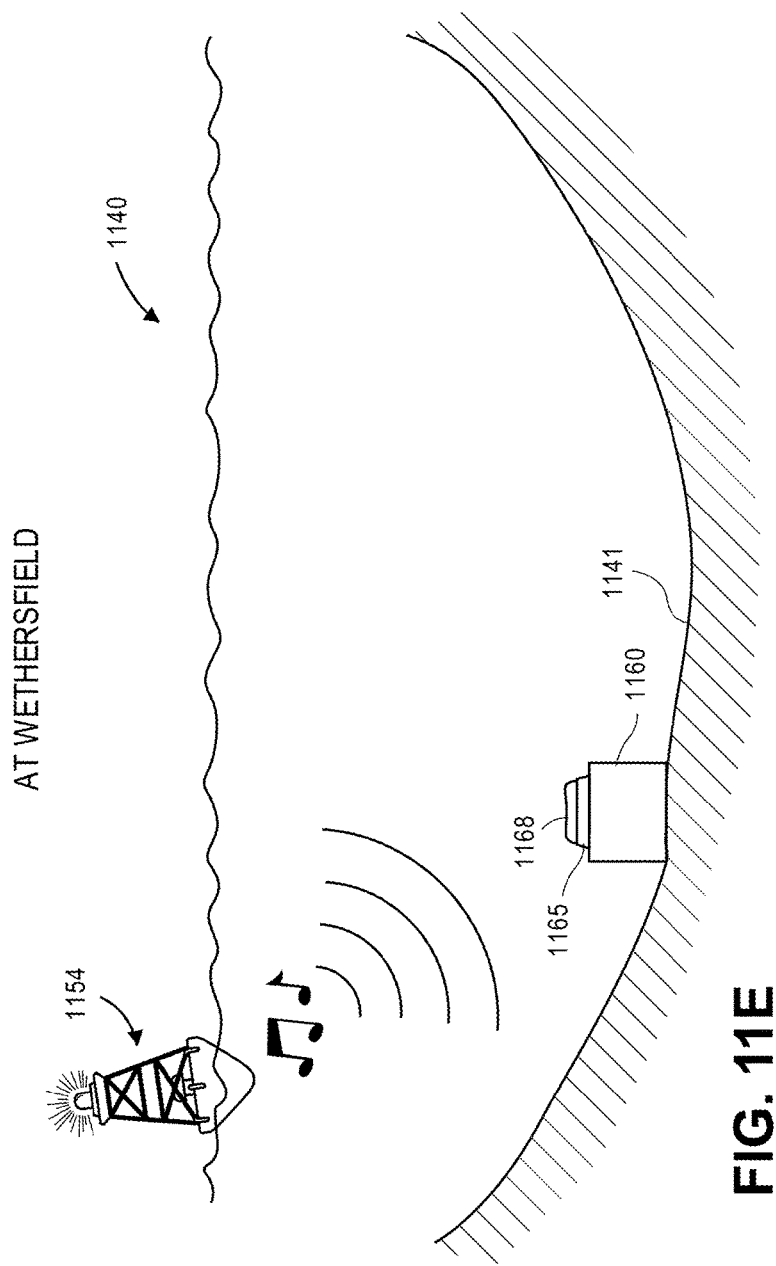

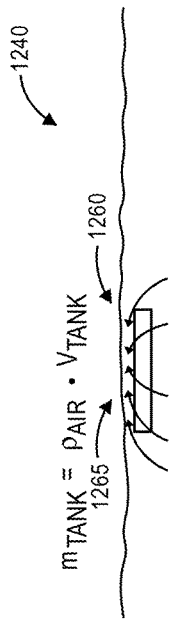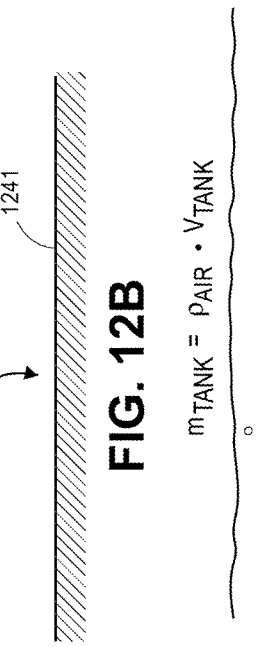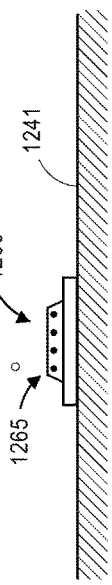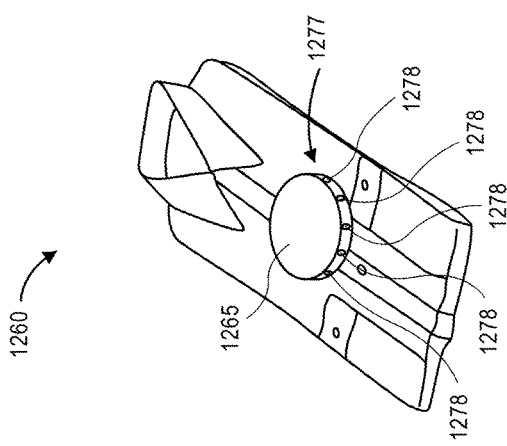
FIG. 12B
FIG. 12C
FIG. 12A

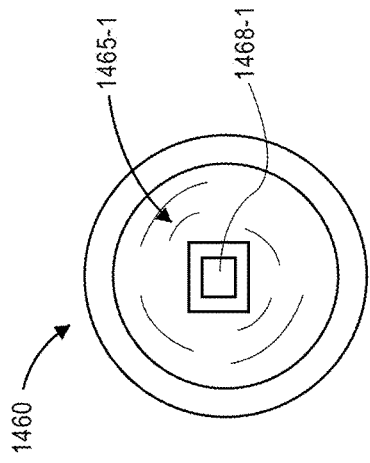
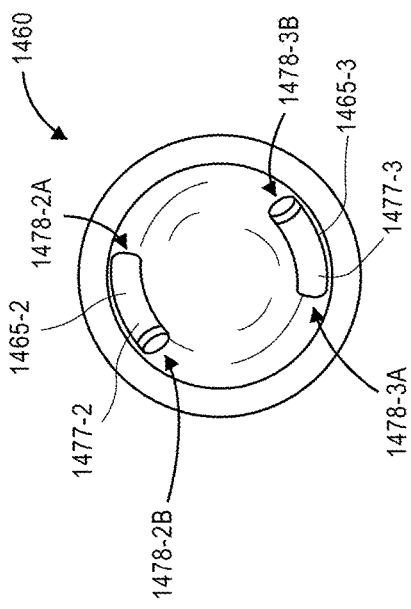
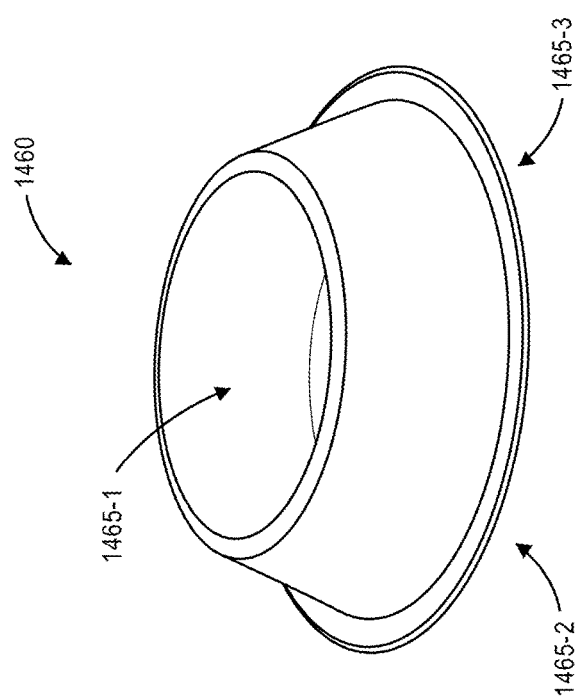

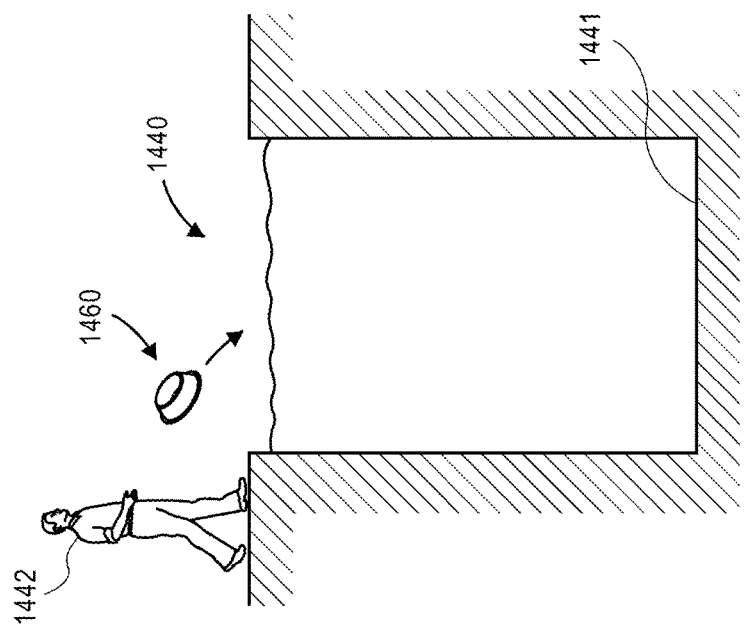
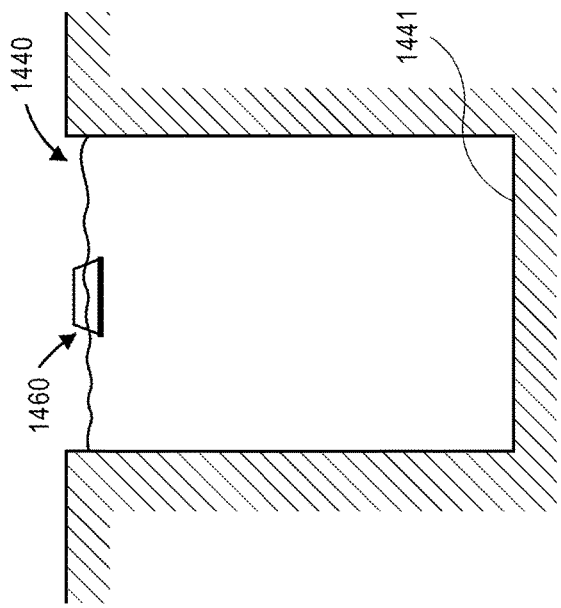
FIG. 14D
FIG. 14E

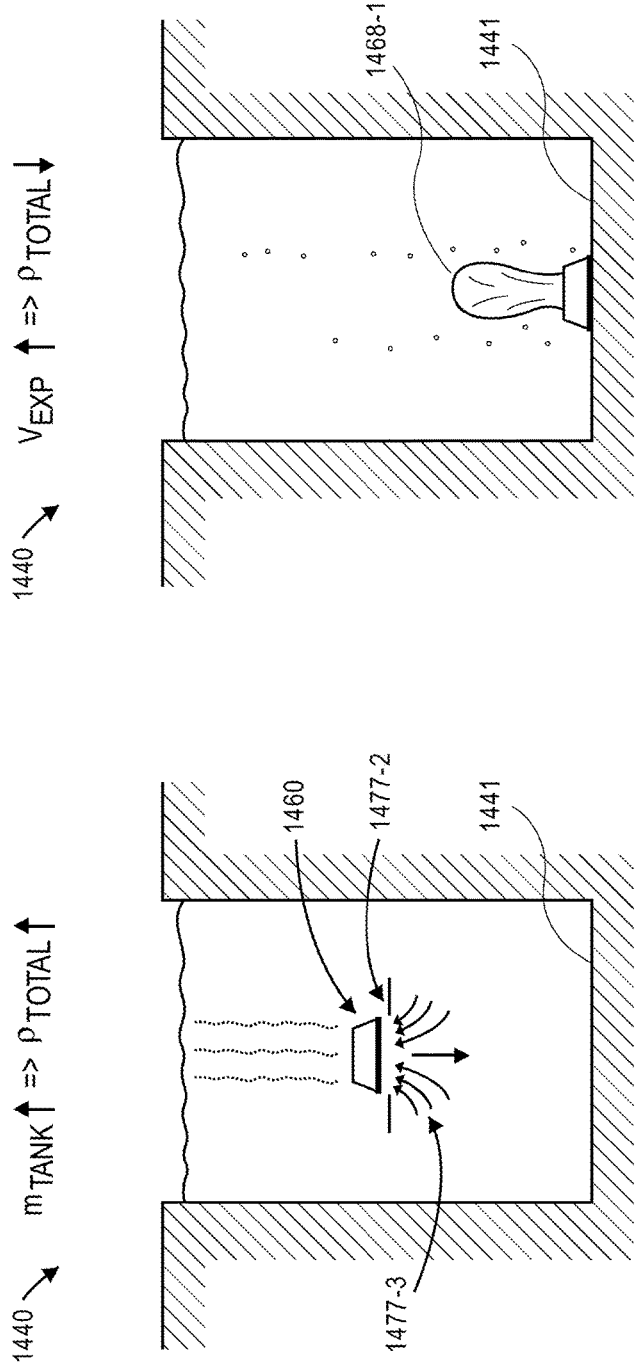

AQUATIC STORAGE FACILITIES

CROSS-REFERENCE TO RELATED APPLICATIONS

This application is a continuation of U.S. patent application Ser. No. 15/279,113, now U.S. Pat. No. 9,624,034, filed Sep. 28, 2016, the contents of which are incorporated by reference herein in their entirety.

BACKGROUND

A fulfillment center is a facility, warehouse or other like structure that is adapted to receive items from vendors or other fulfillment centers, and to store such items in one or more designated storage spaces, areas or units (e.g., cubbies, receptacles, bins, shelves) therein. Such fulfillment centers may include stations for receiving shipments of items, for storing such items, and/or for preparing such items for delivery to customers. When an order for the purchase of one or more of the items stored in a fulfillment center is received from a customer, the ordered items may be retrieved from the spaces, areas or units in which the ordered items are stored, and prepared for delivery to the customer, e.g., by packing the ordered items into one or more appropriate containers with a sufficient type and amount of dunnage, and delivering the containers to an address designated by the customer.

Online marketplaces are increasingly popular electronic forums through which customers may place orders for one or more items over the Internet. The growth of online marketplaces, and the rapid expansion in the scope and breadth of their available offerings, has led to a concomitant proliferation of fulfillment centers. Online marketplaces usually use fulfillment centers to allow vendors to maintain inventories of items that are available for sale at the online marketplaces in a centralized location. Typically, upon the receipt of an order for one or more items that are located at the fulfillment center, a list of the items included in the order is provided to a staff member or one or more autonomous mobile robots at the fulfillment center on paper, electronically (e.g., to a handheld computer maintained by the staff member), or in any other format. The staff member or robot must then traverse the floor of the fulfillment center to physically retrieve the items from the spaces, areas or units in which they are stored, and transport the items to a distribution station in preparation for delivery to the customer.

Because today's online marketplaces offer a wide variety of items to customers, including but not limited to goods, services, products, media or information, fulfillment centers now include increasingly large and complex facilities having expansive capabilities and high-technology accommodations for items, and feature storage areas as large as one million square feet or more. Therefore, in order to prepare and ship an order that includes a large number or different types of items to a customer, a staff member or robot may be required to walk several thousand feet, or even miles, within a fulfillment center in order to retrieve the items in fulfillment of the order. Where a customer submits multiple orders for items, the arduous task of picking, packaging and shipping ordered items must often be repeated for each and every order.

Moreover, for all of their technological advancements, today's fulfillment centers are still plagued by the inefficient use of space. For example, fulfillment centers are commonly box-shaped buildings having a plurality storage spaces, areas or units, each of which is sized and sufficiently durable to support loads of a standard or nominal size or dimension (e.g., fifty pounds, nine cubic feet, or forty pounds per square inch), regardless of whether the spaces, areas or units are actually so loaded. Fulfillment centers also include a number of machines or other features for providing services and utilities to such centers, including cabling, piping, ductwork and the like. Despite the fact that fulfillment centers are designed and intended to receive and distribute items, significant portions of the fulfillment centers remain unused for storage.

BRIEF DESCRIPTION OF THE DRAWINGS

FIGS. 1A through 1M are pictorial diagrams illustrating aspects of one embodiment of an aquatic storage facility in accordance with the present disclosure.

FIGS. 4A and 4B are pictorial diagrams illustrating aspects of one embodiment of an aquatic storage facility in accordance with the present disclosure.

FIGS. 7A through 7C are pictorial diagrams illustrating aspects of one embodiment of an aquatic storage facility in accordance with the present disclosure.

FIGS. 11A through 11I are pictorial diagrams illustrating aspects of one embodiment of an aquatic storage facility in accordance with the present disclosure.

FIGS. 12A through 12C are pictorial diagrams illustrating aspects of one embodiment of an aquatic storage facility in accordance with the present disclosure.

FIGS. 14A through 14G are pictorial diagrams illustrating aspects of one embodiment of an aquatic storage facility in accordance with the present disclosure.

DETAILED DESCRIPTION

Figure 1A:
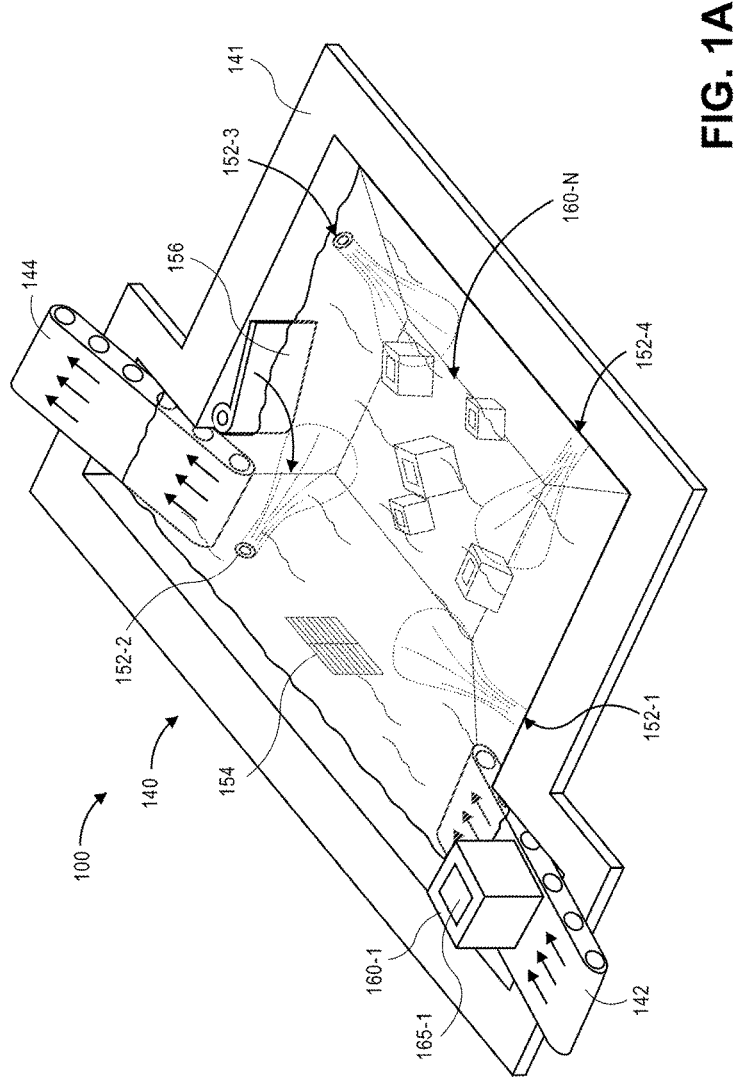

As is set forth in greater detail below, the present disclosure is directed to storing items in liquid-filled environments, and retrieving items therefrom, by manipulating the densities of the items within such environments. More specifically, the systems and methods of the present disclosure are directed to placing an item and/or a container having a depth control cartridge, a depth control device, or another component affixed thereto, and depositing the item or container into a pool, a vat, or another natural or artificial body of a liquid medium for storage therein. The cartridges, devices or components may include one or more expansion sections or volumes (e.g., bladders) that may be expanded or contracted, or one or more tanks or other volumes (e.g., ballast tanks) that may be filled or emptied, as necessary, with air, water or any other fluids, in order to selectively control a net density of the container within the liquid medium, and to cause the cartridges, devices or components to ascend or descend therein.

In some embodiments, when temporary or long-term storage of an item is desired, the item or a container thereof may be placed into a body of liquid (e.g., water), with a depth control device affixed thereto. The depth control device may include one or more sensors (e.g., hydrophones, Global Positioning System or "GPS" receivers, depth sensors), computer components (e.g., processors, transceivers, memory components), expandable or compressible volumes (e.g., bladders), ballast tanks and one or more other features for causing a net mass or volume of the item or the container to be varied in a controlled fashion. Implementing a change in the density of the item or the container within the body of liquid may cause the item or the container to change in vertical depth within the liquid, or to reach a desired vertical depth within the liquid. For example, a depth control device may include a pressurized source of air or other compressed fluids (e.g., pneumatic, hydraulic or other tanks or vessels) or, alternatively, one or more reagents that may be combined or catalyzed to trigger a favorable chemical reaction resulting in the release or consumption of fluids or energy, thereby increasing or decreasing a density of the depth control device. A depth control device may also include one or more ballast tanks that may be selectively filled or emptied as necessary, or to a predetermined extent, thereby increasing or decreasing a mass of the depth control device. When the item or container is placed within the body of liquid, the depth control device may be configured to cause a density of the container to exceed the density of the liquid, e.g., by decreasing a volume and/or increasing a mass of the depth control device, thereby causing the item or the container to naturally descend to a bottom or lower portion of the body of liquid.

Upon receiving an order for the item, the depth control device may be configured to cause the density of the container to fall below the density of the liquid, e.g., by increasing a volume and/or decreasing a mass of the depth control device, thereby causing the item or the container to naturally rise to a surface or upper portion of the body of liquid, from which the item or the container and the device may be retrieved. Additionally, while an item or a container may be vertically positioned by varying a net density of the item or the container within a body of liquid, e.g., using a depth control device, the item or the container may be horizontally positioned by subjecting the item or the container to natural or artificial current flows in one or more directions, with such flows being initiated or halted by natural or artificial means.

Referring to FIGS. 1A through 1M, pictorial diagrams illustrating aspects of one system 100 including an aquatic storage facility (e.g., a storage pool or other natural or artificial basin) 140 in accordance with embodiments of the present disclosure are shown. The aquatic storage facility 140 includes a frame 141 filled with water (or any other mixtures, solutions or other liquid media), an ingress unit 142 and an egress unit 144. A plurality of items 160-$n$ are submerged within the aquatic storage facility 140, and rest on a bottom of the frame 141, below a surface of the water therein.

The frame 141 may be constructed or formed in any manner and from any materials that are sufficiently suitable and durable to contain the water and one or more items (e.g., the items 160-$n$) therein, and also to withstand any pressure differentials between hydrostatic pressure provided by the water contained therein and the soil, sand, rock, bedrock or other underlying materials into which the frame 141 is installed, which may occasionally shift. For example, the frame 141 may include one or more sidewalls (e.g., vertical or substantially vertical portions located generally along a perimeter of the frame 141) and bottoms (e.g., non-vertical or substantially non-vertical portions such as flat or angled surfaces). In some embodiments, the frame 141 may be formed from durable materials such as one or more layers of concrete, cement and/or sand, as well as steel, aluminum or other metals, and lined with one or more layers of plastic, rubber or other materials that are impermeable to water or other liquids. The frame 141 may have any cross-sectional area or shape in accordance with the present disclosure.

FIG. 1A is a perspective view of the aquatic storage facility 140. As is shown in FIG. 1A, a number of flow sources 152-1, 152-2, 152-3, 152-4 are installed within the frame 141 of the aquatic storage facility 140. The flow sources 152-1, 152-2, 152-3, 152-4 may be jets, pumps or other apparatuses for propelling or expelling water within the frame 141 in one or more directions, thereby locally inducing current flow in such directions. Alternatively, one or more of the flow sources 152-1, 152-2, 152-3, 152-4 may be vacuum and/or suction ports for receiving or withdrawing water from within the frame 141 in one or more directions, thereby locally inducing current flow in such directions. As is also shown in FIG. 1A, the frame 141 further includes a transducer 154 provided on one sidewall of the frame 141. The transducer 154 may be configured to emit or radiate one or more predetermined sounds into the water within the frame 141, including but not limited to one or more specific tonals (or a series of such tonals) at any desired frequency or intensity. The frame 141 also includes a pivotable diverter arm 156 aligned adjacent to the egress unit 144. The diverter arm 156 is configured to swing or pivot outwardly from one sidewall of the frame 141, about an axis, and to guide any items within a range of the diverter arm 156 toward the egress unit 144.

The ingress unit 142 and the egress unit 144 are conveyors or like systems for depositing items into the water within the frame 141, or for retrieving items from the water within the frame 141. As is shown in FIG. 1A, a first end of the ingress unit 142 is outside of the frame 141, while a second end of the ingress unit 144 is within the frame 141 and below the surface of the water therein. The ingress unit 142 is configured to deliver or deposit any number of items, including but not limited to an item 160-1, into the water within the frame 141. The egress unit 144 is configured to retrieve or remove any number of items, including the item 160-1 or any of the items 160-$n$, from the water within the frame 141. Alternatively, any other type or form of ingress unit or egress unit may be utilized to deliver or deposit items at the aquatic storage facility 140, or to retrieve or remove items from the aquatic storage facility 140, in accordance with the present disclosure, including but not limited to one or more pumps, pipes, chutes, ramps, edges or weirs incorporated into the frame 141 or elsewhere throughout the aquatic storage facility 140. Items may also be delivered or deposited into, or retrieved or removed from, the aquatic storage facility 140 using one or more vehicles (e.g., trucks or forklifts), autonomous mobile robots, staff members or any other machine or human (not shown).

Figure 1B:
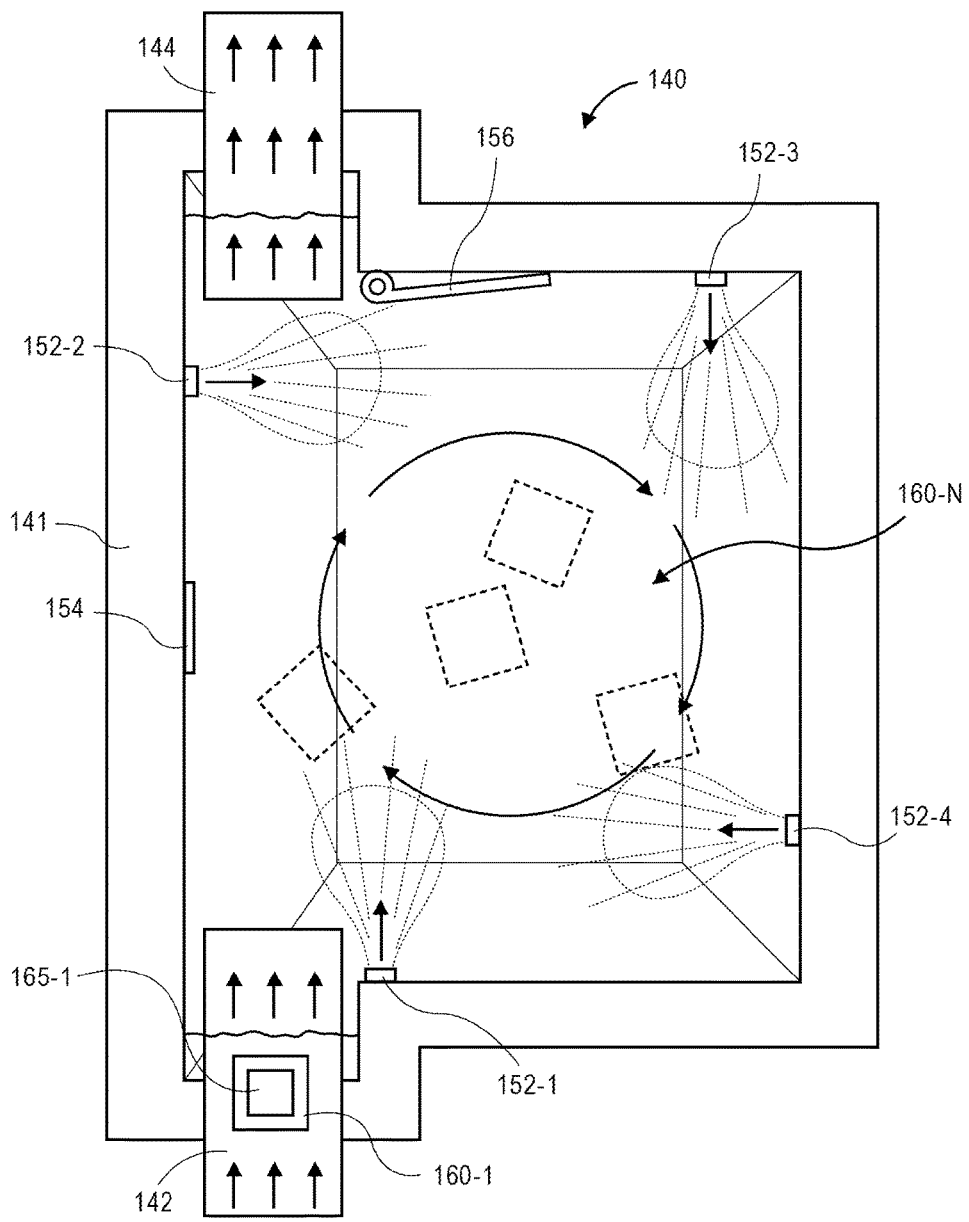

Referring to FIG. 1B, a top view of the aquatic storage facility 140 is shown. As is shown in FIG. 1B, the flow sources 152-1, 152-2, 152-3, 152-4 may, when operated in concert, generate a cyclic current of the water within the aquatic storage facility 140, e.g., in a clockwise direction. Thus, any buoyant or substantially buoyant objects that are positioned at or near a depth or height of the flow sources 152-1, 152-2, 152-3, 152-4 may be caused to revolve about a centroid of the aquatic storage facility 140 within the water, based on the cyclic flow of current therein.

Figure 1C:
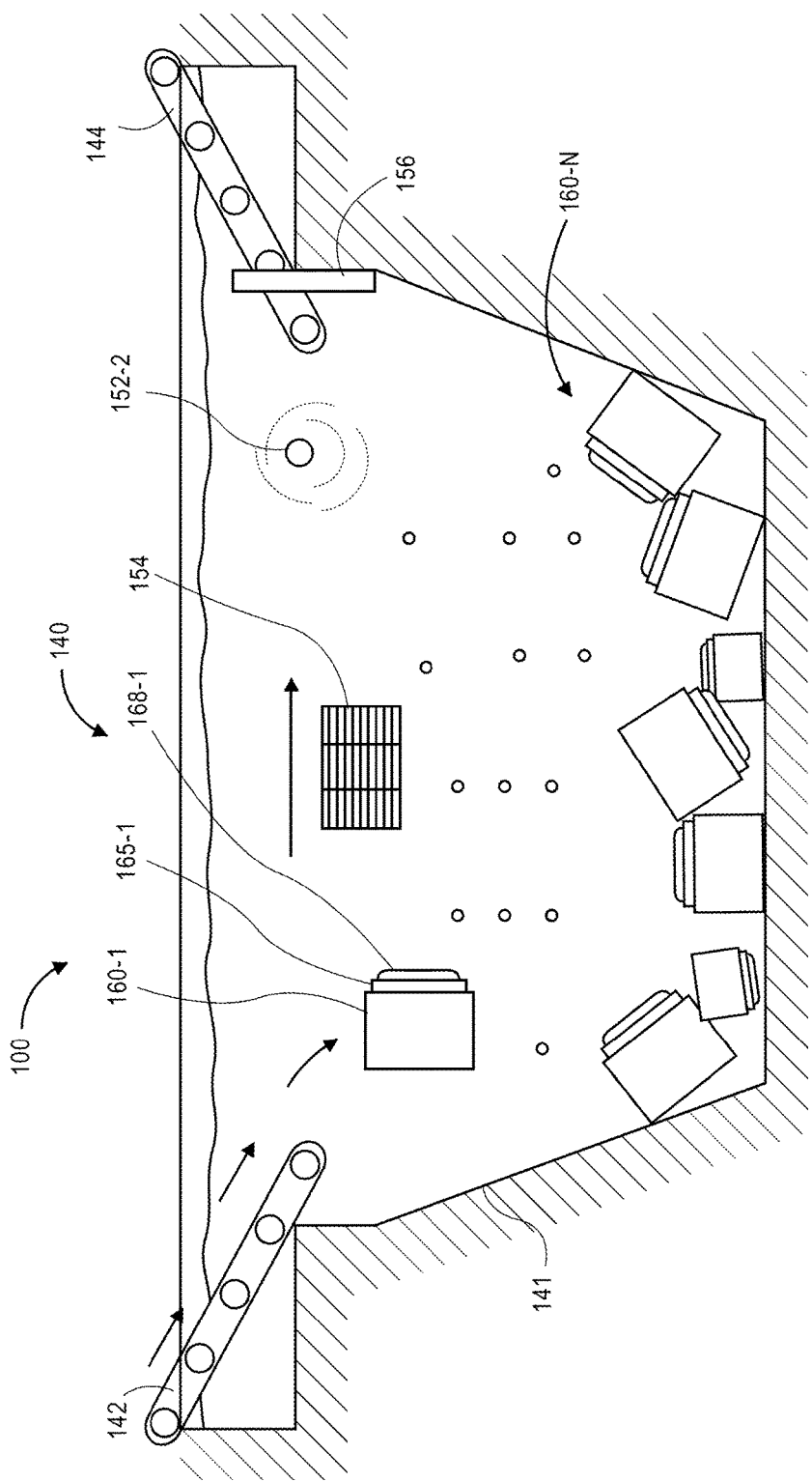

Referring to FIG. 1C, a side view of the aquatic storage facility 140 is shown, shortly after the item 160-1 has been deposited into the water by way of the ingress unit 142. As is shown in FIG. 1C, the item 160-1 includes a depth control device 165-1 thereon. The depth control device 165-1 may be in the form of a cartridge or other component that may be releasably or fixedly mounted to an outer surface of the item 160-1, and includes a flexible bladder 168-1 (or other expandable volume). As is shown in FIG. 1C, the flexile bladder 168-1 is in a contracted (or unexpanded) state. Because a net density of the item 160-1 is greater than a density of the water within the frame 141, the item 160-1 tumbles from the second end of the ingress unit 142 toward a bottom of the frame 141, where the plurality of items 160-n are also at rest.

Figure 1D:
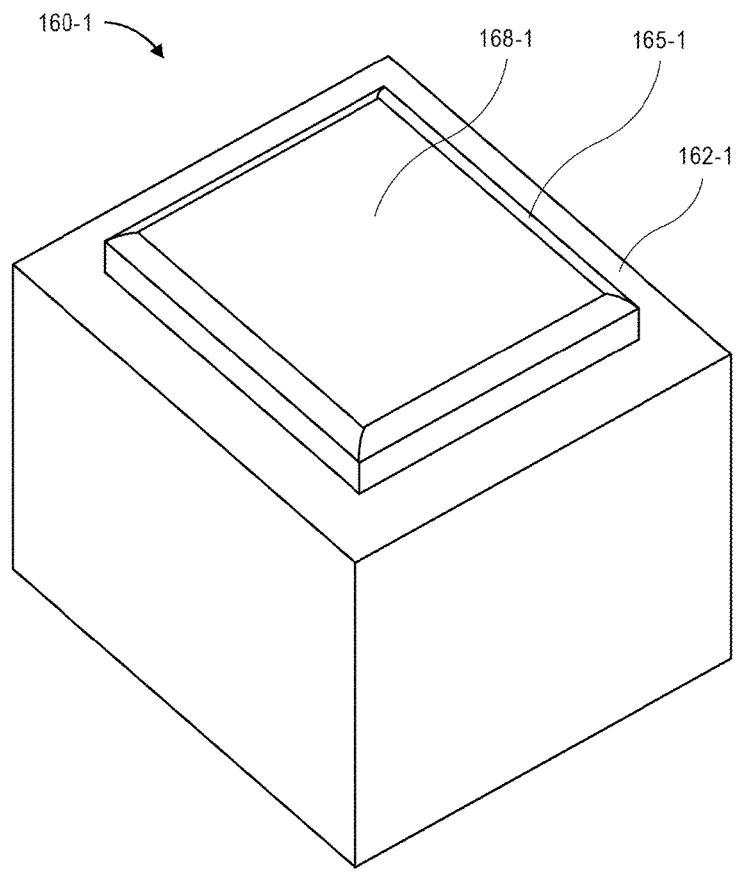

Referring to FIG. 1D, the item 160-1 is shown. The item 160-1 includes a durable and waterproof container (or shell) 162-1, the depth control device 165-1 and the flexible bladder 168-1. The container 162-1 may be formed from any suitably durable material, e.g., plastics, rubbers, metals, or, alternatively, wood, cardboard or paper containers that are treated with one or more sealants (e.g., acrylics, latex, enamels, polyurethanes, resins, or the like). The depth control device 165-1 may be fixedly or releasably joined to the container 162-1 in any manner or by any means, such as by one or more adhesives (e.g., glues, tapes or pastes). The flexible bladder 168-1 may be formed from any suitably elastic and deformable materials such as rubbers or plastics or, alternatively, one or more woven or non-woven fabrics such as nylons or polyesters. In a contracted (or unexpanded) state, such as is shown in FIG. 1D, the flexible bladder 168-1 may be drawn closely to an outer surface of a frame or other aspect of the depth control device 165-1.

Figure 1E:
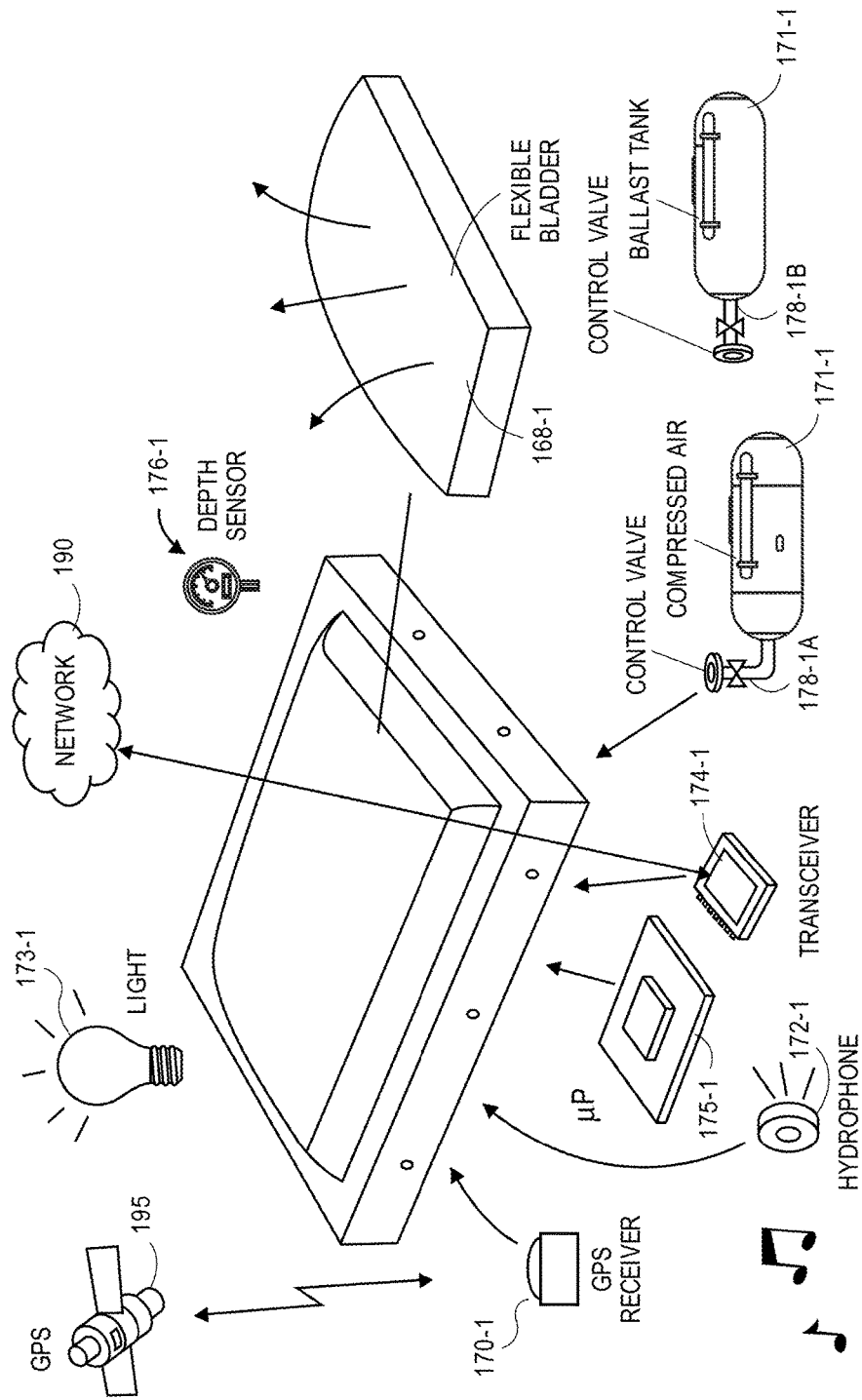

Referring to FIG. 1E, the depth control device 165-1 includes a GPS receiver 170-1, a hydrophone 172-1 or other acoustic listening device or component, a light 173-1 or other visual beacon, a transceiver 174-1 or other communications device, a depth sensor 176-1, a ballast tank 177-1 coupled to an external surface of the depth control device 165-1 and a pair of control valves 178-1A, 178-1B, each of which may be automatically controlled, manipulated or utilized by a processor 175-1. For example, the GPS receiver 170-1 may be configured to receive GPS signals from one or more orbiting GPS satellites 195, e.g., when all or portions of the item 160-1 are on a surface of the water or at a shallow depth, and to provide such signals to the processor 175-1. The hydrophone 172-1 may be configured to monitor the water for any type or form of sounds, e.g., at any intensity or within any frequency spectra, including but not limited to tonals or series of tonals that are directed to the item 160-1 and include one or more discrete instructions. The hydrophone 172-1 may be further configured to provide information or data regarding any sounds captured thereby to the processor 175-1. The light 173-1 or other visual beacon may be activated (e.g., illuminated), as necessary, thereby enhancing the visibility of the item 160-1 when the item 160-1 is at or near the surface of the water within the frame 141, or at any depth within the water. The transceiver 174-1 may be configured to communicate with one or more other computer devices, e.g., over a network 190, when all or portions of the item 160-1 are on a surface of the water or at a shallow depth, and to transfer signals to or receive signals from the processor 175-1. In some embodiments, the flexible bladder 168-1 may include one or more antennas or other receiving apparatuses associated with one or more of the GPS receiver 170-1, the transceiver 174-1, or any other component stitched, sewn, formed or otherwise applied therein, such that the antennas or apparatuses may be located at a highest point of the item 160-1 when the item 160-1 is at or near a surface of the water or other liquid medium.

The depth sensor 176-1 may be any instrument that is configured to sense a depth of the item 160-1 and/or the depth control device 165-1, or a height of the item 160-1 and/or the depth control device 165-1 from a bottom of the frame 141 of the aquatic storage facility 140, e.g., based on a pressure of the water, or by transmitting a sounding or other acoustic measurement to the bottom, or in any other manner. Alternatively, the depth control device 165-1 may also feature any number of other sensors for determining or sensing additional factors relating to a density of the water, including but not limited to temperature or salinity. The control valve 178-1A may be configured to automatically regulate a pressure within the flexible bladder 168-1 and, therefore, a volume of the depth control device 165-1, e.g., by releasing air or other fluids into the flexible bladder 168-1 from an attached compressed air tank 171-1, or withdrawing air or other fluids from the flexible bladder 168-1, such as by venting the air or other fluids into the water within the frame 141. The control valve 178-1B may be configured to automatically regulate an amount of water within the ballast tank 177-1 and, therefore, a mass of the depth control device 165-1, e.g., by pumping or charging water into the ballast tank 177-1 or pumping, draining or blowing water out of the ballast tank 177-1, as necessary.

Figure 1F:
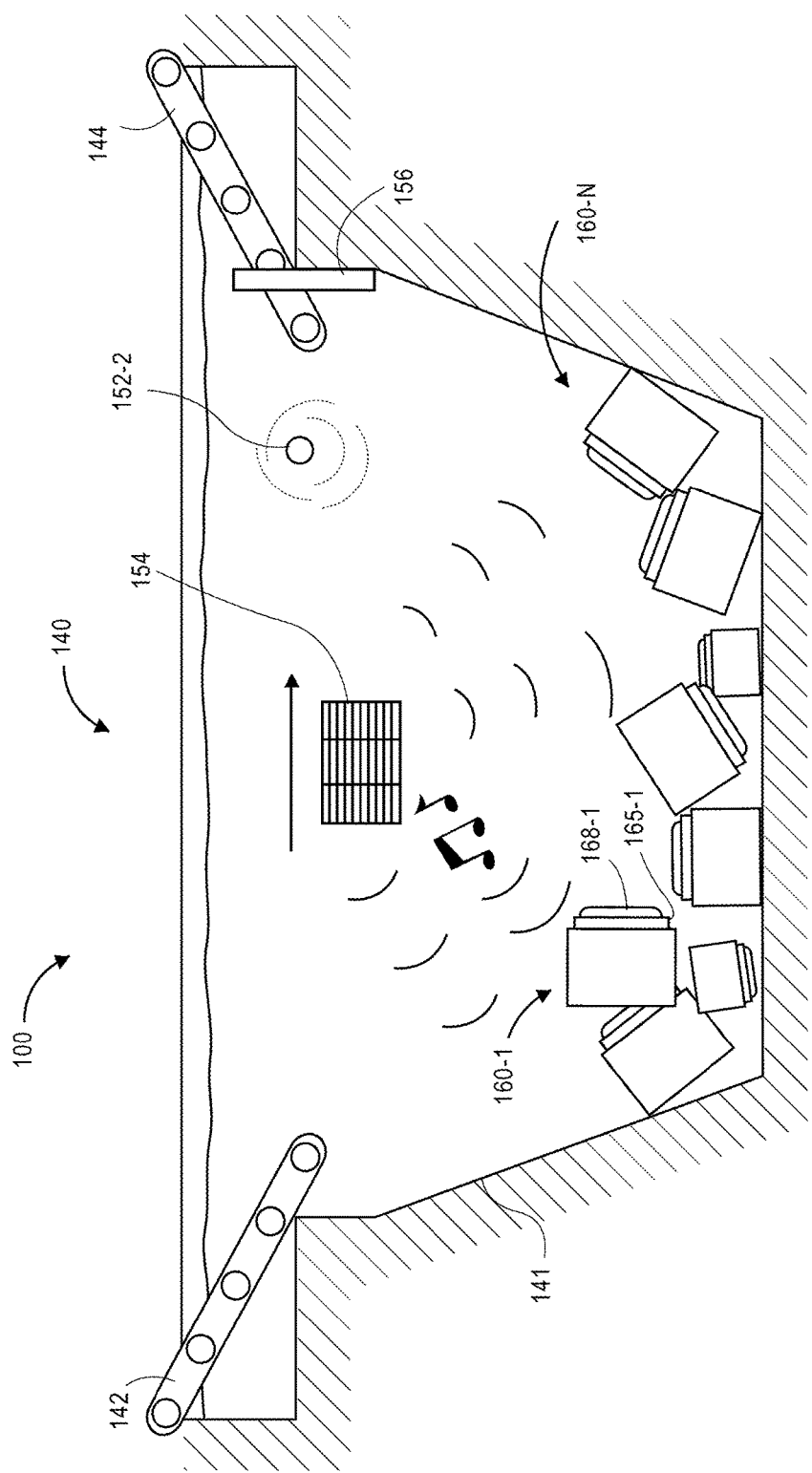

Referring to FIG. 1F, the item 160-1 may receive instructions by acoustic means, e.g., by transmitting an audible signal from the transducer 154 provided in a sidewall of the frame 141. The audible signal may include any number of tonals that are emitted into the water simultaneously or in series, such as a discrete checksum or other prefatory sequence indicating that tonals following thereafter include one or more instructions, as well as one or more instructions, and identifiers of items (e.g., the item 160-1, or one or more of the items 160-n) to which the instructions are directed. For example, such instructions may identify a desired depth or height for the item 160-1, a desired pressure or volume of the flexible bladder 168-1, a desired mass or level of water in the ballast tank 177-1, a desired net density of the item 160-1, a maximum rate of change in depth, height, pressure or density of the item 160-1, a time at which a change in depth, height, pressure or density of the item 160-1 is desired, or any other relevant instruction.

Referring to FIGS. 1G and 1H, the acoustic signal is received by the hydrophone 172-1 within the depth control device 165-1, as the item 160-1 rests on a bottom of the frame 141 and/or one or more of the other items 160-n, with a density of the item 160-1 exceeding a density of the water within the aquatic storage facility. After the acoustic signal is recognized and interpreted to include a predetermined instruction, e.g., to rise to a surface of the water within the frame 141, the depth control device 165-1 may cause the flexible bladder 168-1 to inflate and expand in volume as is shown in FIG. 1H, e.g., by injecting pressurized air from the compressed air tank 171-1 into the flexible bladder 168-1 by way of the control valve 178-1A, thereby increasing a volume of the item 160-1 and lowering a net density of the item 160-1 accordingly. Alternatively, or additionally, the depth control device 165-1 may cause any water within the ballast tank 177-1 to be pumped, drained or blown therefrom, by way of the control valve 178-1B, thereby reducing a mass of the item 160-1 and lowering a net density of the item 160-1 accordingly.

Figure 1I:
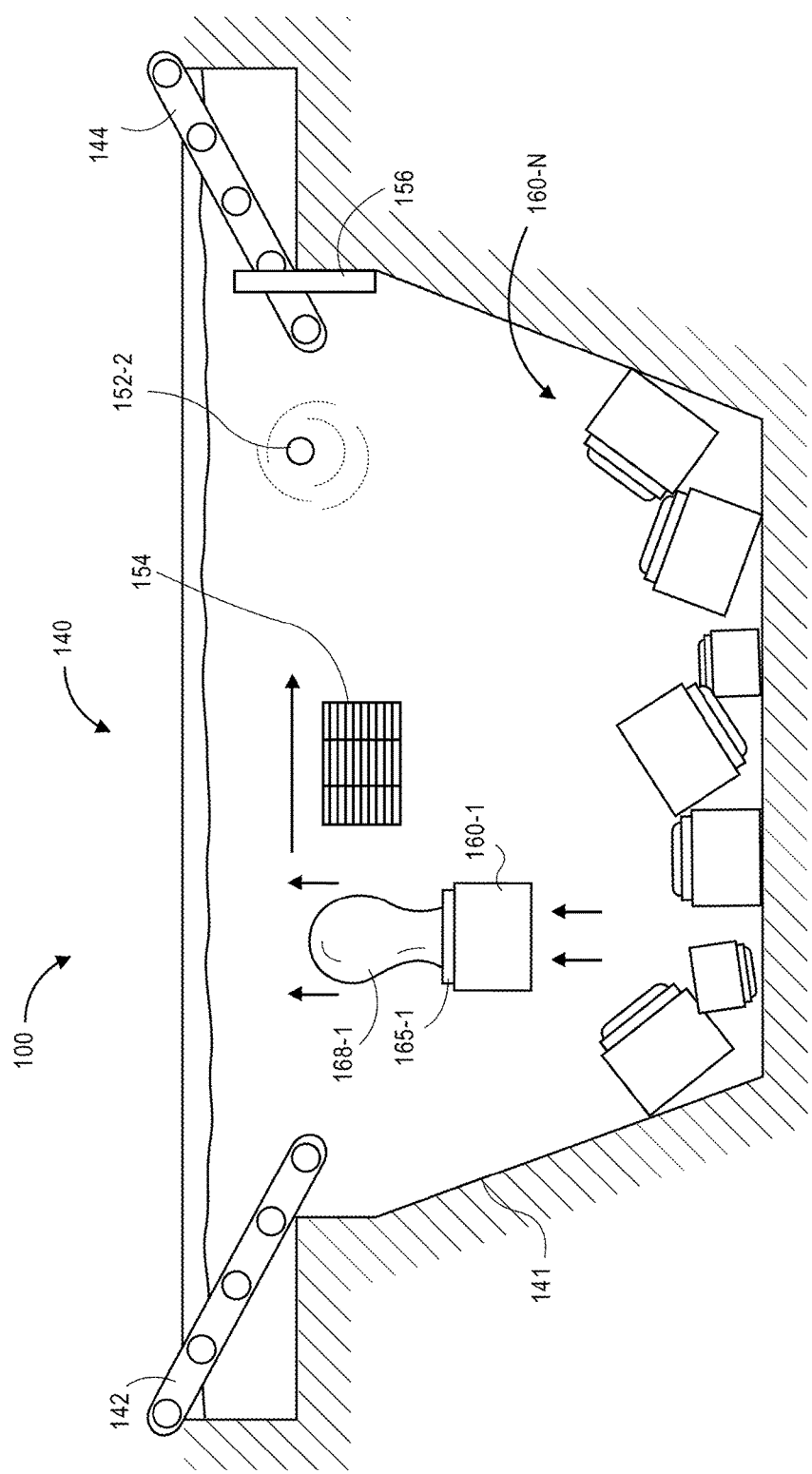

Referring to FIG. 1I, the item 160-1 is shown as rising from the bottom of the frame 141 to the surface of the water within the aquatic storage facility 140. Referring to FIG. 1J, the item 160-1 is shown at or near a surface of the water, with a portion of the flexible bladder 168-1 extending above the surface, and with the light 173-1 illuminated. The item 160-1 is floating in an upright manner, with the flexible bladder 168-1 (e.g., the portion of the item 160-1 having the lowest density) vertically above a center of gravity of the item 160-1. The light 173-1 increases the visibility of the item 160-1 as the item 160-1 is floating at or near the surface of the water.

As is discussed above, items that have been deposited within an aquatic storage facility having water or another liquid medium therein may be laterally transported by one or more currents generated from natural and/or artificial sources. Such currents may be exploited to direct an item floating therein to one or more aspects of the aquatic storage facility. Referring to FIG. 1K, the item 160-1 is being urged toward the egress unit 144 at or near a surface of the water, subject to clockwise currents generated by the flow sources 152-1, 152-3, 152-4. As is shown in FIG. 1K, the flow source 152-2 has been stopped, and the diverter arm 156 has swung away from a sidewall of the frame 141, and is aligned in parallel to the egress unit 144, in order to further guide any objects therein toward the egress unit 144.

Figure 1L:
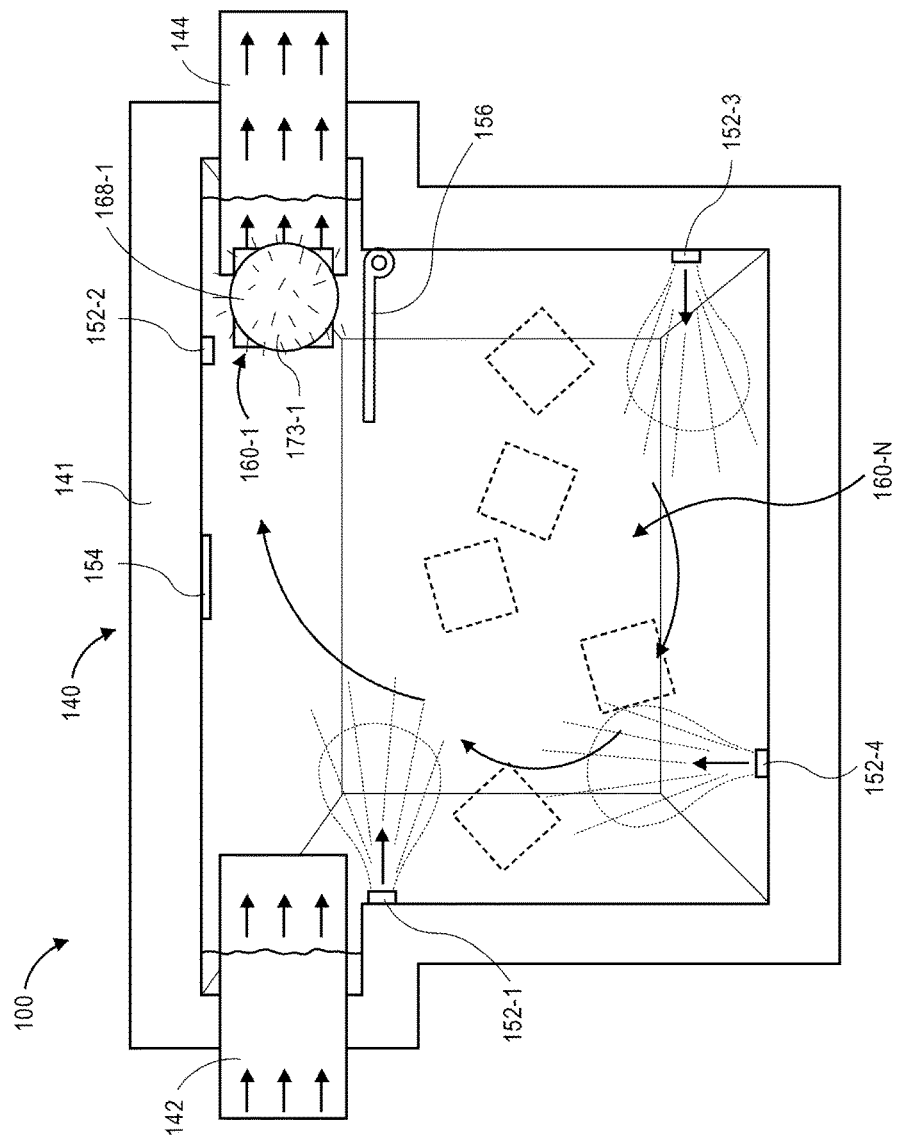
Figure 1M:
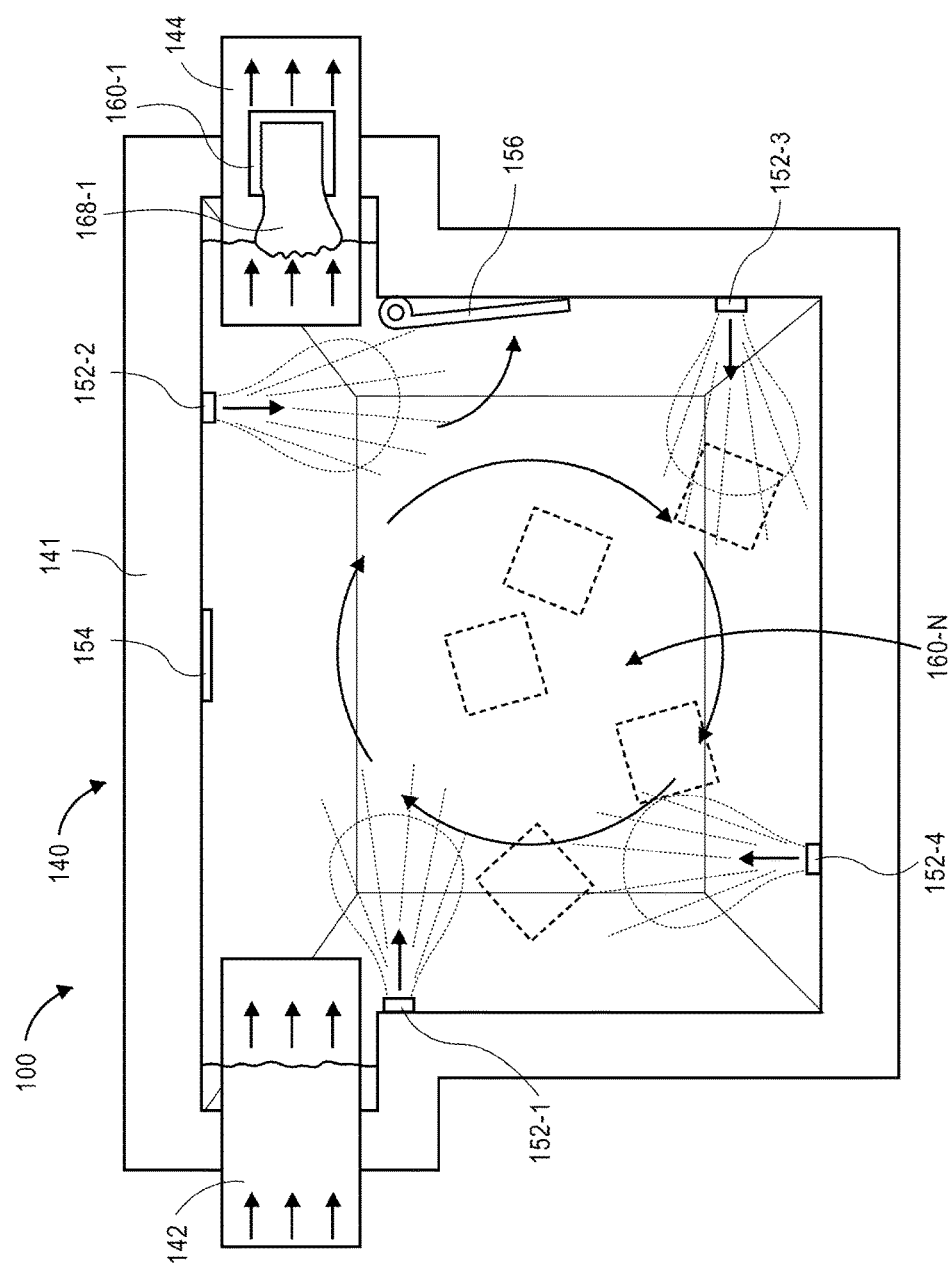

As is shown in FIG. 1L, the item 160-1 contacts a revolving surface of the egress unit 144, and is guided up the egress unit 144 thereby. As is shown in FIG. 1M, the item 160-1 has been removed from the water within the aquatic storage facility 140, and the flexible bladder 168-1 may be emptied, deflated or otherwise depressurized, e.g., by venting the flexible bladder 168-1 to atmosphere, or recharging the fluid into another tank or vessel, such as the compressed air tank 171-1. Alternatively, or additionally, any water that may remain within the ballast tank 177-1 may be pumped, drained or blown therefrom after the item 160-1 has approached or reached the surface of the water, or while the item 160-1 is being removed from the water by the egress unit 144-1. The item 160-1 may then be handled in any manner, by a human and/or autonomous mobile robot, or by any other means, such as by routing the item 160-1 to any other destination (e.g., a packing station or another storage area).

Accordingly, the present disclosure is directed to systems and methods for storing and retrieving items. By manipulating a density of an item (or a container in which the item is stored) within a storage pool, a basin or another natural or man-made facility filled at least in part with a liquid, and initiating or exploiting current flow within the facility, an item may be vertically or laterally positioned within the facility, and stored or retrieved, as necessary. The items and/or containers may be configured with devices such as releasable cartridges that may automatically change in volume or in mass, e.g., by expansion or contraction, or by taking on or expelling fluid therefrom, as necessary in order to initiate vertical motion (or to halt vertical motion) of the items or containers, or to otherwise cause the items or containers to reach a desired depth within the storage pool, the basin or the other facility. In some embodiments, a cartridge or other device equipped with one or more hydrophones or other acoustic sensors may be affixed to an item or a container, and changes in density (e.g., net changes in volume or in mass) of the item or the container may be triggered in response to an acoustic signal emitted into liquid medium within a storage pool, basin or liquid-filled facility. Once the acoustic signal is captured by a hydrophone or another acoustic sensor, the cartridge may expand or contract in volume, or increase or decrease in mass, as necessary to effect a desired change in density. Moreover, the controlled ascent or descent of an item or a container bearing such a cartridge or device may be timed or coincided with an increase, a decrease, an initiation or an elimination of current flow within a vicinity of the item or the container, such that the item or container may be laterally positioned accordingly, as well.

As is noted above, online marketplaces frequently utilize fulfillment centers (which are sometimes referred to as "distribution centers," "fulfillment and distribution centers," "warehouses," "shipment preparation facilities," "processing facilities," or like terms) in order to facilitate the processing of orders for items and the delivery of shipments of ordered items to customers. A typical fulfillment center includes receiving stations or docks at which shipments of items may be received from carriers such as cars, trucks, trailers, freight cars, container ships or cargo aircraft (e.g., manned aircraft or unmanned aircraft, such as drones), as well as one or more storage areas or regions having aisles, rows, bays, shelves, slots, bins, racks, tiers, bars, hooks, cubbies or other like storage means arranged in a fixed or flexible two-dimensional or three-dimensional architecture or layout. The various areas or regions of a fulfillment center are typically configured for access by human operators or machines, e.g., operator-driven vehicles such as fork lifts, as well as autonomous mobile robots, which may place items within such areas or regions upon the items' arrival, and retrieve the items from such areas or regions upon request.

Despite their many advancements in efficiency, traditional fulfillment centers typically include vast amounts of unused or underutilized space. For example, where a storage area or region of a fulfillment center includes a number of shelving units arranged in aisles or rows, the horizontal spaces between such aisles or rows must be reserved for travel by humans on foot or by powered machines. Additionally, the vertical spaces between levels (e.g., shelves) of the shelving units are usually sized and spaced on a nominal or standard basis, despite the wide disparity between the heights, widths, lengths, masses or other attributes of such items.

During the Classical Era, the Greek scientist Archimedes is credited with discovering that a buoyant force supplied to an object that is immersed in a fluid, in whole or in part, is equal to a weight of the fluid displaced by the portion of the object immersed therein, and that this buoyant force is supplied at a center of gravity of the object. This discovery, which is now eponymously codified as Archimedes' principle, is the basis by which numerous aquatic vessels may remain afloat or, in the case of submersible vessels, submerged at a given depth. Whether an object will float or sink within a given fluid is typically determined based on a density of the object as compared to a density of the fluid.

The systems and methods of the present disclosure are directed to storing items within bodies of liquid (e.g., water) by selectively varying net densities of the items with respect to a density of the liquid. More specifically, embodiments of the present disclosure are directed to outfitting items (or containers thereof) with cartridges or other devices or apparatuses that are configured to vary a net density of the items, e.g., by increasing or decreasing occupied volumes or masses of the items. When an item bearing such a device is placed within an artificial body of liquid such as a storage pool, or a natural body of liquid such as a pond, a lake, a river or an ocean, a depth within the liquid (or a height from a bottom) at which the item is stored may be selected by selectively varying a net density of the item using the device. For example, when the device is used to cause a net density of the item to exceed a density of the liquid, the item will begin to vertically descend within the liquid. When the device is used to cause the net density of the item to fall below the density of the liquid, the item will begin to vertically ascend within the liquid. When the device is used to cause the net density of the item to substantially equal the density of the liquid, the item will ultimately settle at a substantially constant depth within the liquid.

In some embodiments, a lateral or horizontal position of an item within a body of liquid may be controlled based on current flows within the body of liquid. Such flows may be initiated using one or more flow sources, such as jets or other apparatuses for propelling or expelling liquid, or vacuum or suction ports or other apparatuses for withdrawing or sucking liquid. Additionally, an item may be guided within a body of liquid using one or more diverters or diversion apparatuses, which may be utilized to mechanically slow or stop a moving item, to impart motion in a given direction upon a stationary item, or in any other manner.

The aquatic storage facilities of the present disclosure may include storage pools, basins or other structures of any size, shape or form, and having any dimension. For example, storage pools may be constructed in-ground or above-ground, and may include frames formed from a variety of materials including but not limited to concrete, cement, sand, wood or metals (e.g., steel, aluminum or others), and lined with or more liquid-impermeable layers of plastic, rubber or other materials. Additionally, the liquid placed within such storage pools may be water (e.g., fresh water or salt water), or any other mixtures or solutions, which may, but need not, include water as a solvent. Such liquids may be selected on any basis, including but not limited to thermal, mechanical or other properties of the liquid, or any other considerations. The liquids may be heated or cooled, as necessary, in order to maintain the items therein at an appropriate temperature. Furthermore, in some embodiments, an aquatic storage facility may be a natural body of water, such as a lake, a pond, a bay, a sound, an ocean, an inlet, a fjord or a river.

The aquatic storage facilities may be configured to manually or automatically receive items therein, and to remove items therefrom, in any manner. For example, an aquatic storage facility may include any number of ingress units and/or egress units, including not only conveyors but also walls and weirs that are aligned to permit items to flow out of the aquatic storage facility, or one or more ramps or other like angled features. Moreover, items may be deposited into or retrieved from an aquatic storage facility by humans or other animals, autonomous mobile robots, watercraft (e.g., surface ships or submersibles), aircraft (e.g., manned aircraft or unmanned aircraft, such as drones) or any other means.

In some embodiments, the aquatic storage facilities of the present disclosure may be covered or exposed, and may include or comprise components of open or closed systems. For example, an ingress unit may include a pump or other mechanical system for initiating flow, as well as piping leading from the pump or other system to a storage pool or like facility. Likewise, an egress unit may include a pump or other mechanical system for initiating flow, as well as piping leading from the storage pool or like facility. The aquatic storage facilities may be incorporated into existing piped fluid systems, such as water works, oil pipelines or other systems for causing fluids to be transported from one location to another. For example, a storage pool or other like facility may be constructed as an offshoot, a branch or a derivative of a water supply system and configured to receive items from and discharge items to the water supply system.

Additionally, the aquatic storage facilities of the present disclosure may include storage pools or like facilities that are filled with two or more liquids of different densities. In such embodiments, a liquid having a first density and a liquid having a second density will typically settle into discrete layers, with the top layer being a liquid having a lower density and the bottom layer being a liquid having a higher density. Two or more layers of liquids within a storage pool or other facility may be used for any reason. For example, a storage pool or other facility may include layers of liquids having densities that are selected in order to control rates at which items ascend or descend through the respective layers, or amounts of volumetric expansion or contraction, or mass gain or loss, that are required in order to cause their ascent or descent. Some common liquids that may be used in an aquatic storage facility may include pure water, which has a density of 1.0000 grams per cubic centimeter ($g/cm^3$) at four degrees Celsius (4° C.), as well as values ranging from 0.9718 to 0.9982 grams per cubic centimeter ($g/cm^3$) between twenty and eighty degrees Celsius (20-80° C.), or seawater, which as typical densities ranging from 1.020 to 1.029 grams per cubic centimeter ($g/cm^3$). Densities of water within an aquatic storage facility typically vary based on the local salinity, temperature, depth and pressure of the liquid, among other factors. Other liquids that may be used in an aquatic storage facility may include isopropyl alcohol, which has a density of approximately 0.7854 grams per cubic centimeter ($g/cm^3$), or kerosene, which has a density of 0.790 to 0.810 grams per cubic centimeter ($g/cm^3$), and may inhibit any evaporation or exchange of oxygen therefrom.

The aquatic storage facilities may also include one or more diverters or diversion systems in order change a direction of travel of one or more items within liquid, or to cause such items to travel in an intended direction toward a desired destination. For example, a diverter may be used to direct an item from one location within an aquatic storage facility to another, or to remove or otherwise extricate an item from a body of liquid entirely. When used in concert with one or more jets or other flow sources, diverters may direct a floating item toward or away from a desired location, e.g., an egress unit. One such diverter may include a pusher diverter, which may physically move one or more items within water or another liquid toward (or away from) an egress unit or a flow of current generated by a jet, a vacuum or suction port, or another flow source. Any type of diverters or diversion systems may be utilized to interact with one or more floating items within an aquatic storage facility in accordance with the present disclosure.

Items may be stored within aquatic storage facilities in their native or original shells, packaging or other containers or, alternatively, in one or more additional or supplemental waterproofed containers. Such containers may be formed from plastics, rubbers, metals, wood, cardboard or paper that may be treated as necessary (e.g., by one or more sealants such as acrylics, latex, enamels, polyurethanes, resins, or the like) to withstand conditions present within a body of liquid. For example, where an item is sufficiently waterproof or liquid resistant, a depth control cartridge or like device may be releasably or fixedly joined to the item, and the item may be deposited in a body of liquid. Alternatively, where an item is not sufficiently waterproof or liquid resistant, the item may be placed in a waterproof or liquid resistant container having a depth control cartridge or a like device affixed thereto, and deposited in a body of liquid. Items and/or containers that are stored within bodies of liquid may have any shape, size or form, and the range of items that may be stored within a body of liquid is not limited.

The depth control devices (e.g., cartridges) of the present disclosure are apparatuses or other components that may be applied, affixed or adhered to an item, or otherwise physically associated with the item, and configured to vary a density of the item when the item is deposited within a body of liquid. For example, depth control devices may be permanently or releasably joined or bound to an item or a container using waterproof or liquid resistant tapes, glues, pastes, cements or other adhesives, or by one or more bands of plastic, rubber, metal or the like. In some embodiments, a depth control device may have a shape or a size that enables the depth control device to be readily mated to an item or a container, e.g., to one or more flat, rounded or correspondingly angled or shaped surfaces of the item or the container. In some other embodiments, a container may be formed with a depth control device integrated therein.

Moreover, a depth control device of the present disclosure may include any number of components for causing a mass or a volume of the depth control device to vary as desired. For example, referring again to the depth control device 165-1 shown in FIG. 1E, a depth control device may include any number of components such as tanks or valves (e.g., the compressed air tank 171-1 and the control valve 178-1A) for ejecting air or other fluids into an expansion volume, such as the bladder 168-1, or releasing air or other fluids therefrom. Alternatively, the depth control devices may include reagents or fuels for initiating a chemical reaction (e.g., an exothermic reaction, or a pyrotechnic reaction) that causes a change in density of the depth control devices. The depth control devices may also include any number of tanks or valves (e.g., the control valve 178-1B) for pumping water or other liquids into a tank, such as the ballast tank 177-1, or pumping, draining or blowing liquids therefrom. In some embodiments, a depth control device may include a compressed air source, e.g., the compressed air tank 171-1, that is aligned to blow air into an expansion volume, such as the bladder 168-1, and also to blow water out of a tank, such as the ballast tank 171-1, thereby enabling the depth control device to reduce its density by increasing in volume or decreasing in mass, respectively. The depth control devices may further include one or more computer devices or components, communications devices or systems, or any type or form of sensor. In some embodiments, depth control devices may be configured for use and reuse on multiple occasions, e.g., in association with a single item or container, or reused on multiple items or containers. Alternatively, the depth control devices may be configured for a single use, e.g., including one or more components that may permanently or semi-permanently vary a mass or a volume of an item or container to which the depth control device is affixed on just one occasion.

A depth control device of the present disclosure may be further configured to communicate in any manner with one or more external computer devices or systems. For example, a depth control device may include a transceiver or other communications device for sending and receiving digital and/or analog data over one or more networks. A depth control device may further include one or more hydrophones and/or transducers for emitting or radiating acoustic signals into a liquid within an aquatic storage facility, or capturing and interpreting acoustic signals that are emitted or radiated into the liquid. For example, when an item bearing a depth control device is partially or entirely submerged, an acoustic signal including one or more instructions for the item may be transmitted to the depth control device. Such instructions may include a desired depth or height within the aquatic storage facility for the item, or a desired density for the item within a liquid of the aquatic storage facility. Upon receiving such instructions, the depth control device may transmit one or more acoustic signals in response. Such signals may indicate that the depth control device has received the acoustic signals and is responding thereto, or otherwise include any relevant information. When the item approaches or reaches a surface of a liquid within an aquatic storage facility, the depth control device may transmit and/or receive one or more messages from any external computer devices or systems, e.g., over a network, or any other relevant information or data. The depth control devices may be specifically programmed with any information or data regarding the items to which such devices are affixed, the aquatic storage facility into which the item is to be deposited, or any other relevant information or data.

The depth control devices of the present disclosure may be heterogeneous in nature, and may take any size, shape or form. For example, the depth control devices may be rectangular in shape, such as the depth control device 165-1 of FIGS. 1A through 1M, or may be disc-shaped, cylindrical, pyramidal, triangular, trapezoidal or in any other shape or form. Additionally, a depth control device may include any number or type of components that may be selected based on any attributes of the items to which the depth control device is to be affixed. In some embodiments, where an item or container has a net density that is greater than a density of a liquid into which the item is to be stored, a depth control device having one or more expandable volumes (e.g., bladders) may be affixed thereto, and a depth or height of the depth control device may be selected by manipulating a pressure within the expandable volume. In other embodiments, where an item or container has a net density that is less than a density of a liquid into which the item is to be stored, a depth control device having one or more ballast tanks may be affixed thereto, and a depth or height of the depth control device may be selected by varying a mass of the liquid that is received within such ballast tanks. In still other embodiments, a depth control device may feature one or more expandable volumes and also one or more ballast tanks, and a depth or a height of the depth control device may be selected by manipulating both a pressure within the expandable volumes and a mass of the liquid that is received within the ballast tanks. Additionally, two or more depth control devices may be affixed to a given item, and operated independently or in concert (e.g., by any number of control valves or other components) to vary a net density of the items or the containers to which each is affixed, and to select a depth or a height of the depth control device thereby.

In some embodiments of the present disclosure, an order may be received for an item that is stored within an aquatic storage facility (e.g., a storage pool, a basin or another natural or artificial facility) and includes a depth control cartridge or other like device for controlling a depth or height of the item within the aquatic storage facility affixed thereto. Upon receiving the order, and determining that the item is stored within the aquatic storage facility, an acoustic signal including an instruction to change a net density of the item may be transmitted to the depth control cartridge. In response to the instruction, the depth control cartridge may change the net density of the item, e.g., by pressurizing and inflating or depressurizing and deflating a flexible bladder or other expansion volume provided thereon, or by pumping or blowing liquid into or out of a tank provided therein. Additionally, a flow may be induced within the aquatic storage facility by one or more jets, vacuum or suction ports, or other like devices in order to cause the item to be urged toward an egress unit, by which the item may be removed from the aquatic storage facility.

In some other embodiments of the present disclosure, a set of items, each bearing depth control devices, may be deposited into a storage pool or other aquatic storage facility based on a known demand for the items. A schedule may be established for causing the items to be removed from the storage pool based on the demand. In accordance with the schedule, one or more of the items may be elevated from the storage pool, e.g., by causing a net density of the items to fall below a density of water or another liquid within the aquatic storage facility, in response to one or more acoustic signals, or in accordance with a predetermined schedule.

In still other embodiments of the present disclosure, items bearing depth control devices may be selectively stored at various depths of an aquatic storage facility. The depth control devices may be configured to calculate or otherwise determine a density of a liquid within the aquatic storage facility, and vary a net density of the items in order to cause the items to reach a desired depth from a surface of the liquid, or a height from a bottom of the acoustic storage facility. The depth control devices may be pre-programmed with attributes of the items to which each of the devices is affixed, e.g., dimensions, masses, volumes or contents of the items, and the extent to which the net densities of the items should be changed in order to cause the items to reach a specific depth may be determined accordingly.

Figure 2A:
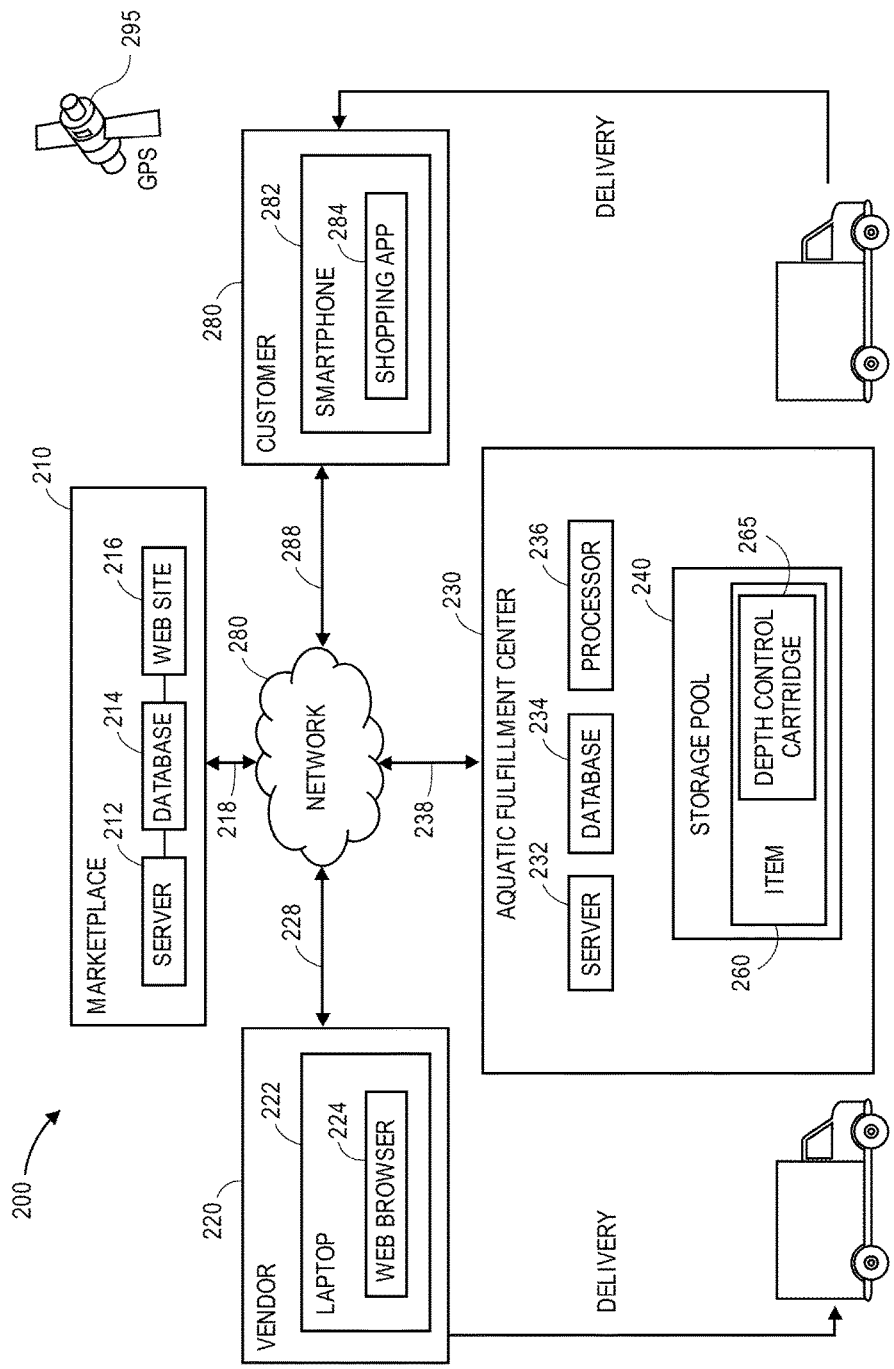
FIGS. 2A and 2B are block diagrams of components of one embodiment of a system including an aquatic storage facility in accordance with the present disclosure.
Figure 2B:
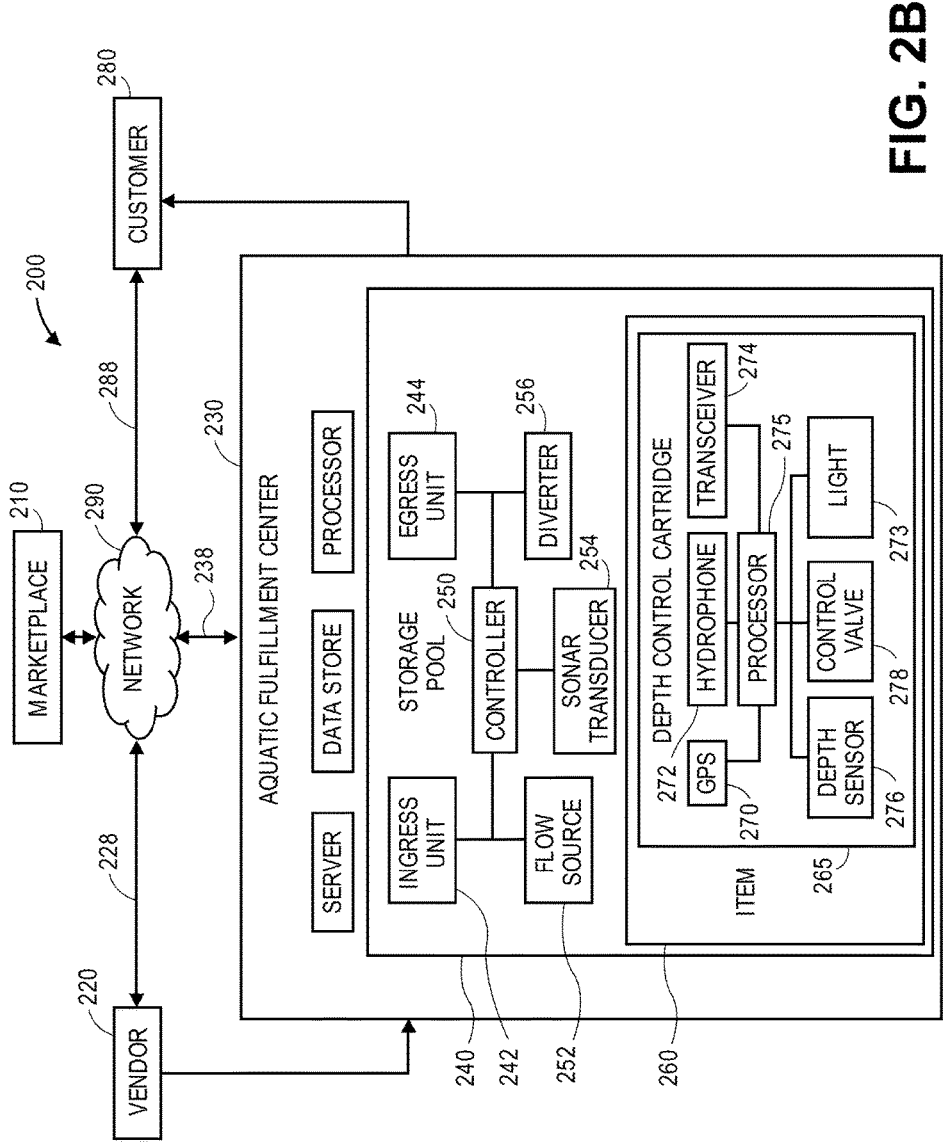

Referring to FIGS. 2A and 2B, block diagrams of components of one embodiment of a system 200 including an aquatic storage facility in accordance with the present disclosure are shown. The system 200 includes a marketplace 210, a vendor 220, an aquatic fulfillment center 230 and a customer 280 that are connected to one another across a network 290, such as the Internet. Except where otherwise noted, reference numerals preceded by the number "2" shown in FIG. 2A or FIG. 2B indicate components or features that are similar to components or features having reference numerals preceded by the number "1" shown in FIGS. 1A through 1M.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution facilities, including but not limited to the aquatic fulfillment center 230, as well as one or more other fulfillment centers (not shown), including but not limited to traditional fulfillment centers, as well as one or more other embodiments of aquatic fulfillment centers disclosed herein. The web site 216 may be implemented using the one or more servers 212, which connect or otherwise communicate with the one or more databases 214 as well as the network 290, as indicated by line 218, through the sending and receiving of digital data. The servers 212 may cause the display of information associated with the web site 216 in any manner, e.g., by transmitting code such as Hypertext Markup Language (HTML) over the network 290 to another computing device that may be configured to generate and render the information into one or more pages or to cause a display of such pages on a computer display of any kind. Moreover, the database 214 may include any type of information regarding items that have been made available for sale through the marketplace 210, or ordered by customers (e.g., the customer 280) from the marketplace 210. The servers 212 may further execute any type of computer-based function or compute any type or form of calculation, including but not limited to any formulas, equations, algorithms or techniques for determining one or more probabilities or performing any number of statistical tests.

The vendor 220 may be any entity or individual that intends to make one or more items available to customers, such as the customer 280, by way of the marketplace 210. The vendor 220 may operate one or more order processing and/or communication systems using a computing device such as a laptop computer 222 (as well as a tablet computer, a smartphone, a desktop computer or any other type or form of computing device) and/or software applications such as a browser 224, which may be implemented through one or more computing machines that may be connected to the network 290, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the aquatic fulfillment center 230, one or more other fulfillment centers or other destinations (not shown), or a location specified by the customer 280. Additionally, the vendor 220 may receive one or more items from manufacturers, merchants, sellers or other vendors (not shown), and may deliver one or more of such items to locations designated by the marketplace 210, such as the aquatic fulfillment center 230, for fulfillment and distribution to customers, or to the customer 280 directly. Furthermore, the vendor 220 may perform multiple functions. For example, the vendor 220 may also be a manufacturer, a merchant or a seller of one or more other items, and may also offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be, or may be operated by, a manufacturer, a merchant, a seller or a vendor.

The aquatic fulfillment center 230 may be any facility that is adapted to receive and store items within a body of liquid medium, process orders for such items, and distribute such items from the body of liquid medium, on behalf of the marketplace 210. As is shown in FIG. 2A and FIG. 2B, the aquatic fulfillment center 230 includes a networked computer infrastructure for performing various computer-related functions associated with the receipt, storage, processing and distribution of such items, including one or more physical computer servers 232, databases (or other data stores) 234 and processors 236, that may be provided in the same physical location as the aquatic fulfillment center 230, or in one or more alternate or virtual locations, e.g., in a "cloud"-based environment. The aquatic fulfillment center 230 may also include stations for receiving, storing and distributing items to customers, such as one or more receiving stations, storage areas and distribution stations. The aquatic fulfillment center 230 further includes a storage pool 240 having at least one item 260 bearing a depth control cartridge (or other like depth control device) 265 therein.

The storage pool 240 may be any natural or artificial basin, cavity, chamber or other opening capable of accommodating a liquid medium (e.g., water) therein. For example, the storage pool 240 may be a man-made structure having one or more sidewalls, bottoms or other structural features or, alternatively, a natural formation. The storage pool 240 may include any number of components for receiving or removing items from a body of liquid, inducing or inhibiting current flow within the body of liquid, or providing underwater communications with items within the body of liquid. As is shown in FIG. 2B, the storage pool includes one or more ingress units 242, one or more egress units 244, one or more flow sources 252, one or more sonar transducers 254 and one or more diverters 256, each of which is in communication with one or more controllers 250.

The ingress units 242 and the egress units 244 may be any systems or components configured to deposit or deliver an item into the storage pool 240 or retrieving an item therefrom. In some embodiments, such as the aquatic storage facility 140 shown in FIGS. 1A through 1M, the ingress units 242 or the egress units 244 may comprise one or more powered or powerless conveyors that are provided for transporting items of varying sizes and shapes into or out of the storage pool, and include any number of machines or elements for causing the motion or translation of such items from one location to another. The ingress units 242 and/or the egress units 244 may include any form of mover, including but not limited to belts, chains, screws, tracks or rollers, that may drive such machines or elements, as well as any number of carriers for transporting such items on or within the ingress units 242 and/or the egress units 244. Such machines or elements may further include one or more pulleys, shafts, hubs, bushings, sprockets, bearings and other elements for causing a movement of the ingress units 242 and/or the egress units 244. Further, the ingress units 242 and/or the egress units 244 may transfer items from one or more static or dynamic conveying apparatuses into the storage pool 240, or may remove items from the storage pool into one or more static or dynamic conveying apparatuses, which may include one or more machines or elements such as a bin, a chute, a cart, a truck or another like apparatus.

Alternatively, the ingress units 242 and/or the egress units 244 may include one or more humans, e.g., staff members, who may manually place items within the storage pool 240, or retrieve items from the storage pool 240. In some embodiments, one or more of the ingress units 242 and/or the egress units 244 may be a trained canine, equine or any other animal. The ingress units 242 and/or the egress units 244 may also feature one or more human-operated or autonomous machines, including but not limited to vehicles (e.g., trucks or forklifts), autonomous mobile robots, watercraft, aircraft (e.g., manned or unmanned aerial vehicles, such as drones) or any other machine. In some embodiments, such as the aquatic storage facility 140 of FIGS. 1A through 1M, the ingress units 242 and the egress units 244 may be similar systems or may operate in a similar manner. In other embodiments, the ingress units 242 and the egress units 244 may be different systems, or may operate in different manners.

Although the aquatic fulfillment center 230 of FIG. 2A and FIG. 2B includes a single box corresponding to one ingress unit 242, and a single box corresponding to one egress unit 244, those of ordinary skill in the pertinent arts will recognize that the storage pool 240 may include any number or type of ingress units or egress units in accordance with the present disclosure. Moreover, such ingress units 242 and such egress units 244 may be aligned or configured in any manner or location within the storage pool 240.

The flow source 252 may be any device or component for initiating or inhibiting a flow of a liquid within the storage pool 240. For example, in some embodiments, the flow source 252 may be a jet or other liquid expulsion apparatus for expelling or propelling the liquid, or a vacuum and/or suction port or other suction apparatus for drawing in the liquid, thereby creating one or more local currents in the liquid within a vicinity of the flow source 252. Alternatively, where the storage pool 240 is a natural body of water, one or more flow sources may be either natural or artificial in nature. For example, such a storage pool 240 may receive a body of water from natural watercourses (e.g., rivers, streams and the like) or atmospheric sources (e.g., rainfall), and also from one or more artificial sources, such as dams or other reservoirs.

The diverter 256 may be any component or machine for imparting motion upon or accelerating an object in a liquid within the storage pool 240, or for slowing or stopping an item in motion in the liquid within the storage pool 240, in other manner. The diverter 255 may include any form of pusher diverter, swinging arm diverter, or any other structure configured to automatically contact an item in liquid within the storage pool 240, at any depth or height. Any type of diverters 256 or diversion systems may be utilized within storage pools in accordance with the present disclosure.

Although the aquatic fulfillment center 230 of FIG. 2A and FIG. 2B includes a single box corresponding to one flow source 252, and a single box corresponding to one diverter 256, those of ordinary skill in the pertinent arts will recognize that the storage pool 240 may include any number or type of flow sources or diverters in accordance with the present disclosure. Moreover, such flow sources 252 and diverters 256 may be aligned or configured in any orientation with respect to the liquid within the storage pool 240, and may be operated singly or in concert to initiate, increase, decrease or inhibit any net or local current flows within the liquid.

The sonar transducer 254 may be any device for converting electrical signals into acoustic signals (e.g., pulses, tones or pings) that are emitted or radiated into liquid within the storage pool 240. In some embodiments, the sonar transducer 254 may include any number of signal generators, amplifiers, conductors, coils, membranes, terminals, insulation or other materials or components for emitting or radiating acoustic signals into liquids at any intensity and within any frequency spectra, as desired. In some other embodiments, the sonar transducer 254 may further include one or more beamformers for generating the acoustic signals in a beam and emitting or radiating the beam in any pattern and in any desired direction. For example, the sonar transducer 254 may be an electrodynamic transducer, an ultrasonic transducer, a Tonpilz sonar transducer, or any other apparatus or machine for generating and emitting or radiating acoustic signals into the liquid within the storage pool 240.

Although the aquatic fulfillment center 230 of FIGS. 2A and 2B includes a single box corresponding to a single sonar transducer 254, those of ordinary skill in the pertinent arts will recognize that the storage pool 240 may include any number or type of sonar transducers that are aligned to emit or radiate sounds at any intensity and within any frequency spectra in accordance with the present disclosure. For example, a storage pool may include a plurality of sonar transducers that are mounted or otherwise arranged in an array and configured to emit or radiate unique signals, or identical signals, at any intensity or within any frequency spectra. Alternatively, a storage pool may include a plurality of sonar transducers, each of which is configured to emit or radiate acoustic signals within a discrete intensity range of a single frequency spectrum.

The controller 250 may be any type or form of electronic device or system configured to control the operation of one or more of the ingress unit 242, the egress unit 244, the flow source 252, the sonar transducer 254 or the diverter 256, or any other aspect of operations within the aquatic fulfillment center 230. The controller 250 may be in communication with one or more humans or machines within the aquatic fulfillment center 230, or the various facilities and other components of the aquatic fulfillment center 230. The controller 250 may also be associated with one or more other computing devices or machines, and may communicate with the marketplace 210, the vendor 220 or the customer 280 over the network 290, as indicated by line 238, through the sending and receiving of digital data.

The controller 250 may generate instructions or commands based on information received from the item 160 and/or the depth control cartridge 265, or information received from one or more of the server 212, the laptop computer 222, the server 232 or any other external computing device via the network 290. For example, the controller 250 may transmit one or more control signals to systems or components associated with the ingress unit 242 and/or the egress unit 244, the flow source 252, the sonar transducer 254 or the diverter 256, and receive one or more signals in response from such components. The controller 250 may be associated with any form of motors, power sources, circuits, generators, amplifiers and/or beamformers or other components for operating the various machines or apparatuses within the aquatic fulfillment center 230, including but not limited to the ingress unit 242, the egress unit 244, the flow source 252, the sonar transducer 254 or the diverter 256. In some embodiments, the controller 250 may generate instructions or commands for any auxiliary systems (not shown) associated with the aquatic fulfillment center 230 and/or the storage pool 240, including but not limited to any lighting systems, imaging devices or other sensors, communications systems, security systems or climate control systems (e.g., for maintaining a temperature of a liquid within the storage pool 240 or an environment in which the storage pool 240 is located), as well as any workers or autonomous mobile robots within the aquatic fulfillment center 230.

The item 260 may be any object, including but not limited to a consumer good, that is intended for storage within the storage pool 240 with one or more depth control cartridges 265 associated therewith. The item 260 may be of any type, shape, size or form, and may be stored within the storage pool 260 in its native packaging or, alternatively, in a waterproof or liquid-resistant container. Although the aquatic fulfillment center 230 of FIGS. 2A and 2B includes a single box corresponding to a single item 260 within the storage pool 240, and a single box corresponding to a single depth control cartridge 265 joined thereto, those of ordinary skill in the pertinent arts will recognize that the storage pool 240 may include any number or type of items that may be accommodated within a volume of the storage pool 240, and any number or type of depth control cartridges joined thereto that may be selectively adapted to have a net density that is greater than, less than, or equal to a density of the liquid within the storage pool 240, as desired.

The depth control cartridge 265 (or other depth control device) may be any system component that may be applied, affixed or adhered to the item 260, or otherwise physically associated with the item with the item 260, and configured to selectively vary a net density of the item 260 with respect to a density of a liquid within the storage pool 240. As is discussed above with regard to FIG. 1E, the depth control cartridge 265 includes a GPS receiver 270, one or more hydrophones 272, one or more lights 273, a transceiver 274, a computer processor 275, a depth sensor 276 and one or more control valves 278.

The GPS receiver 270 is used to determine a position of the depth control cartridge 265 based on signals received from one or more GPS satellites 295. The hydrophones 272 or other acoustic receivers are used to capture acoustic data from the liquid within the storage pool 240 or above a surface of the liquid. The light 273 is used to increase the visibility of the item 260 or the depth control cartridge 265 when the item 260 is at or near a surface of a liquid within the storage pool 240, or at any depth. For example, the light 273 may include one or more light-emitting diodes ("LED"), incandescent light bulbs, fluorescent light bulbs (linear or compact), halogen light bulbs or any other source of light, in any color, frequency or intensity. The transceiver 274 is used to communicate with one or more external computer devices, e.g., over the network 290. In some embodiments, the acoustic data captured by the hydrophone 272 may include one or more pulses, tones or pings, or other tonals or series of tonals, that may carry one or more instructions for changing a depth or height of the item 260 by increasing or decreasing a net mass or a net volume of the item 260, and varying a net density of the item 260 accordingly. The depth sensor 276 is used to determine a depth of the depth control cartridge 265 in the liquid within the storage pool 240, or a distance from a bottom of the storage pool 240. The control valves 278 may be operated in order to increase or decrease a net density of the item 260, such as by charging air or another lightweight fluid into a flexible bladder or other expandable volume or relieving fluid therefrom (e.g., to increase or decrease a net volume of the item 260), or by taking in at least some of the liquid within the storage pool 240 into a ballast tank or other onboard reservoir, or discharging liquid to the storage pool 240 (e.g., to increase or decrease a net mass of the item 260) from the ballast tank or other reservoir.

Each of the GPS receiver 270, the hydrophone 272, the light 273, the transceiver 274, the depth sensor 276 and the control valve 278 may be in communication with the processor 275, and may operate under control of the processor 275 in response to one or more instructions or commands. Moreover, two or more of the devices or components of the depth control cartridge 265 may be embodied in the same device or component. For example, the transceiver 274 may be a cellular transceiver that may also be used to determine a position of the depth control cartridge 265, e.g., by cellular triangulation. The hydrophone 272 may also include a transducer for emitting or radiating sounds into a liquid, e.g., an acknowledgment to an acoustic signal received thereby. Moreover, the depth control cartridge 265 may further include any other type or form of position sensor, acoustic sensor, environmental sensor (e.g., thermometers, salinity sensors, current sensors) or any other components for varying a net mass and/or a net volume of the item 260, or for changing a vertical and/or horizontal position of the item 260.

The aquatic fulfillment center 230 may also include one or more workers, staff members or associates (not shown), who may be any designated personnel charged with performing one or more tasks within the aquatic fulfillment center 230. For example, the workers may handle or transport items (e.g., any type or form of good, product, media or other tangible consumer article) within the aquatic fulfillment center 230, such as by depositing one or more items into the storage pool 240 or retrieving one or more items from the storage pool 240, or affix one or more depth control cartridges 265 to the item 260 prior to depositing the item 260 into the storage pool 240. The workers may also operate one or more pieces of equipment therein, and perform any maintenance on any automatic machines or components associated with the aquatic fulfillment center 230, e.g., the ingress unit 242 and/or the egress unit 244, the flow sources 252, the sonar transducer 254 or the diverter 256. The workers may also maintain a proper chemical balance of the liquid within the storage pool 240, such as by taking one or more samples of the liquid (e.g., pH samples, phosphates, carbonates or the like), and may add one or more solutes or other chemicals to the storage pool 240, or drain and refill the storage pool 240 as necessary. The workers may also operate one or more computing devices or machines for registering the receipt, retrieval, transportation or storage of items at the aquatic fulfillment center 230, including a computing device that is specifically programmed or configured for such purposes, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

For example, the aquatic fulfillment center 230 may include or operate one or more order processing and/or communication systems using computer devices in communication with one or more of the server 232, the database 234 and/or the processor 236, or through one or more other computing devices or machines that may be connected to the network 290, as is indicated by line 238, in order to transmit or receive information in the form of digital or analog data, or for any other purpose. Such computer devices or machines may also operate or provide access to one or more reporting systems for receiving or displaying information or data regarding workflow operations, and may provide one or more interfaces for receiving interactions (e.g., text, numeric entries or selections) from one or more operators, users or workers in response to such information or data.

Additionally, as is discussed above, the aquatic fulfillment center 230 may include one or more receiving stations featuring any apparatuses that may be required in order to receive shipments of items at the aquatic fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage within the liquid of the storage pool 240. The aquatic fulfillment center 230 may further include one or more distribution stations where items that have been retrieved from the storage pool 240 may be evaluated, prepared and packed for delivery from the aquatic fulfillment center 230 to addresses, locations or destinations specified by customers, also by way of carriers such as cars, trucks, trailers, freight cars, container ships or cargo aircraft (e.g., manned aircraft or unmanned aircraft, such as drones). Alternatively, an item received at a receiving station of the aquatic fulfillment center 230 may be transferred directly to a distribution station for further processing, or "cross-docked," without first being placed into the storage pool 240.

The customer 280 may be any entity or individual that wishes to download, purchase, rent, lease, borrow or otherwise obtain items (e.g., goods, products, services or information of any type or form) from the marketplace 210. The customer 280 may utilize one or more computing devices, such as a smartphone 282 or any other like machine that may operate or access one or more software applications, such as a web browser (not shown) or a shopping application 284, and may be connected to or otherwise communicate with the marketplace 210, the vendor 220 or the aquatic fulfillment center 230 through the network 290, as indicated by line 288, by the transmission and receipt of digital data. Moreover, the customer 280 may also receive deliveries or shipments of one or more items from facilities maintained by or on behalf of the marketplace 210, such as the aquatic fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," an "aquatic fulfillment center," a "worker," or a "customer," or like terms, may be automated steps performed by their respective computer systems, or implemented within software modules (or computer programs) executed by one or more general purpose computers. Moreover, those of ordinary skill in the pertinent arts would recognize that references to process steps or actions described herein as being performed by or relating to a "vendor" could also be performed by or relate to a manufacturer, a merchant or a seller, or another source of items. Those of ordinary skill in the pertinent arts would also recognize that process steps described as being performed by a "marketplace," a "vendor," an "aquatic fulfillment center," a "worker," or a "customer" may be typically performed by a human operator, but could, alternatively, be performed by an automated agent.

The marketplace 210, the vendor 220, the aquatic fulfillment center 230 and/or the customer 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, Bluetooth or near-field communication techniques. For example, the server 232 may be adapted to transmit information or data in the form of synchronous or asynchronous messages from the aquatic fulfillment center 230 to the server 212, the laptop computer 222, a desktop computer, the depth control cartridge 265, the smartphone 282 or any other computer device in real time or in near-real time, or in one or more offline processes, via the network 290. Those of ordinary skill in the pertinent art would recognize that the marketplace 210, the vendor 220, the aquatic fulfillment center 230 or the customer 280 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, the processor 275 or the smartphone 282, or any other computers or control systems utilized by the marketplace 210, the vendor 220, the aquatic fulfillment center 230 or the customer 280 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of an aquatic storage facility, e.g., the storage pool 140 of FIGS. 1A through 1M, in connection with electronic commerce and in a fulfillment center environment, those of ordinary skill in the pertinent arts will recognize that such systems and methods are not so limited. For example, one or more of the aquatic storage facilities disclosed herein may be utilized to store items that are not for sale, such as chilled or warmed food or beverages, or rare books or other printed documents in a temperature-controlled environment, and to selectively retrieve items therefrom, as desired.

Figure 3:
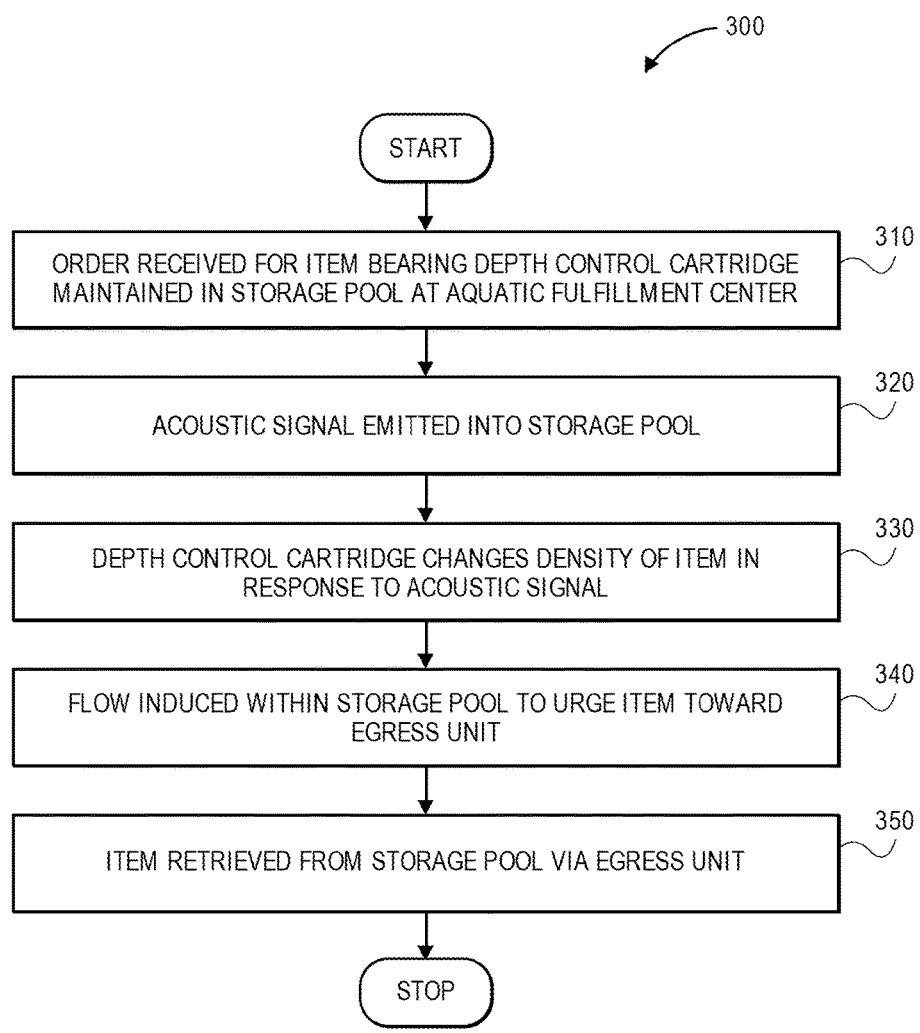
FIG. 3 is a flow chart of one process for retrieving an item from an aquatic storage facility in accordance with the present disclosure.

Referring to FIG. 3, a flow chart 300 of one process for retrieving an item from an aquatic storage facility in accordance with the present disclosure is shown. At box 310, an order is received for an item bearing a depth control cartridge (or other depth control device) that is maintained in a storage pool at an aquatic fulfillment center. For example, the order may be received by an online marketplace from a customer who accessed one or more web pages or dedicated shopping applications associated with the online marketplace, and searched or browsed for one or more items prior to placing the order. Upon receiving the order, the online marketplace may determine that the item, e.g., the item 160-1 or one or more of the items 160-*n* shown in FIG. 1C, is stored within a storage pool or other like facility at an aquatic fulfillment center.

At box 320, an acoustic signal is emitted into the storage pool. The acoustic signal may include any number of tonals that are emitted into the water simultaneously or in series, at any desired intensity or within any desired frequency spectra, and may include or represent an instruction specifying a depth and/or a net density of the ordered item, as well as tonals identifying one or more checksums or identifiers of the ordered item.

At box 330, the depth control cartridge changes a net density of the item in response to the acoustic signal. For example, the acoustic signal may be captured and interpreted using one or more hydrophones or other acoustic sensors provided on the depth control cartridge, and a net mass and/or a net volume of the depth control cartridge may be varied in response to one or more instructions included in the acoustic signal. Such instructions may specify a particular density or density range desired for the ordered item, or may simply direct the depth control cartridge to achieve any net density that is less than a density of the liquid within the storage pool. The instructions may further direct the depth control cartridge to take one or more actions that are known to cause the item to have a net density less than that of the liquid within the storage pool, e.g., by pressurizing and inflating a flexible bladder or other expansion volume to a maximum extent, or by blowing liquid out of a ballast tank (or, alternatively, by depressurizing and deflating a flexible bladder or other expansion volume to a minimum extent, or flooding liquid into a ballast tank), without specifying an actual net density, depth or height for the ordered item. The acoustic signal may be emitted or radiated generally into the liquid within the storage pool, or in one or more beams in a general or specific direction toward the ordered item, and may include one or more acoustic checksums and/or identifiers of the ordered item, or any other additional tonals.

At box 340, a flow is induced within the storage pool to urge the ordered item toward an egress unit. For example, referring again to the aquatic storage facility 140 of FIGS. 1A through 1M, liquid flow may be initiated from one or more of the flow sources (e.g., jets) 152-1, 152-2, 152-3, 152-4 in a manner that causes a current to flow toward the egress unit 144. Therefore, where the ordered item remains afloat at or near a surface of the liquid, the liquid flow may be reasonably expected to carry the ordered item to within a vicinity of the egress unit. In some embodiments, one or more diverters may physically urge the ordered item toward the egress unit. In some other embodiments, the ordered item may be urged toward a location of a worker, who may stand ready to retrieve the ordered item from the storage pool, as necessary, and a mechanical or automated egress unit need not be provided. At box 350, the item is retrieved from the storage pool via the egress unit, and the process ends. For example, referring again to FIGS. 1L and 1M, the egress unit 144 (e.g., a conveyor) may engage with the ordered item, and cause the item to exit the storage pool based on friction resulting from contact with a banded or belted surface of the egress unit 144, or in any other manner.

Therefore, a change in a net density of an item may cause a vertical change in a position of an item within a storage pool or other aquatic storage facility. A localized current induced within a vicinity of the item may urge the item toward a location where the item may be retrieved therefrom, e.g., a location of an egress unit, or of one or more workers or machines configured to extract the ordered item from the storage pool.

A depth control cartridge or other apparatus for changing a net density of an item within an aquatic storage facility may be joined to the item or a container thereof in any manner. For example, referring again to FIG. 1D, the depth control cartridge 165-1 is joined to a flat, sufficiently large side or face of the item 160-1. Alternatively, a depth control cartridge may be joined to a corner, an edge, a vertex, or a rounded feature of an item or a container thereof.

Referring to FIGS. 4A and 4B, pictorial diagrams illustrating aspects of one embodiment of an aquatic storage facility in accordance with the present disclosure are shown. Except where otherwise noted, reference numerals preceded by the number "4" shown in FIG. 4A or FIG. 4B indicate components or features that are similar to components or features having reference numerals preceded by the number "2" shown in FIG. 2A or FIG. 2B, by the number "1" shown in FIGS. 1A through 1M.

As is shown in FIG. 4A, a storage pool 440 or other aquatic storage facility includes a container 460 immersed in water therein. The container 460 is a substantially box-shaped object having a depth control device 465 with an expandable volume 468 mounted to one corner thereof. The depth control device 465 is configured to capture and interpret one or more acoustic signals, and to vary a net density of the container 460 accordingly in response to such signals. Because a net density of the container 460 exceeds the density of water, or $\rho_{CONTAINER} > \rho_{H2O}$, the container 460 rests atop a number of other items on a bottom 441 of the storage pool 440. Alternatively, the depth control device 465 may further include one or more ballast tanks (not shown) that may be filled partly or fully in order to cause a density of the item 460 to exceed a density of water.

As is shown in FIG. 4B, upon capturing and interpreting an acoustic signal, the depth control device 465 causes the expandable volume 468 to inflate with air or another lightweight fluid, thereby causing the density of the container 460 to drop below the density of water, or $\rho_{CONTAINER} < \rho_{H2O}$, and causing the container 460 to elevate from the bottom 441 of the storage pool 440 in response. Placing the depth control device 465 on a corner of the item 460, rather than a single face, of the item 460, enables the item 460 to be oriented in a specific manner as the item 460 rises from the bottom 441 of the storage pool 440. For example, by affixing the depth control device 465 to the corner of the item 460, the item 460 may be preferably aligned to travel through or between one or more layers of other items that may be aligned above or below the item 460 as the item 460 travels through the fluid within the storage pool 440. Alternatively, a depth control device having an expandable volume (e.g., a flexible bladder) of any size or shape may be mounted or joined to any aspect of an item, including one or more flat, angled or rounded sections of the item, in order to achieve a desired orientation of the item as the item is stored or while the item is in vertical transit between two or more depths or heights, or in horizontal transit by way of current flow between two or more points. Alternatively, where the depth control device 465 includes one or more ballast tanks, the ballast tanks may be pumped, drained or blown in order to cause a density of the depth control device 465 to fall below that of water, thereby causing the item 460 to rise within the storage pool 440.

The aquatic storage facilities of the present disclosure may be configured to release one or more items stored therein either in response to one or more acoustic signals, or in accordance with a predetermined schedule that may be established on any basis, including a known level of demand for one or more items. For example, where a demand for a fungible item is known, a plurality of the fungible items may be deposited into an aquatic storage facility and configured to be independently elevated within the storage pool in response to one or more acoustic signals, or in accordance with a predetermined schedule defined based on the demand.

Figure 5:
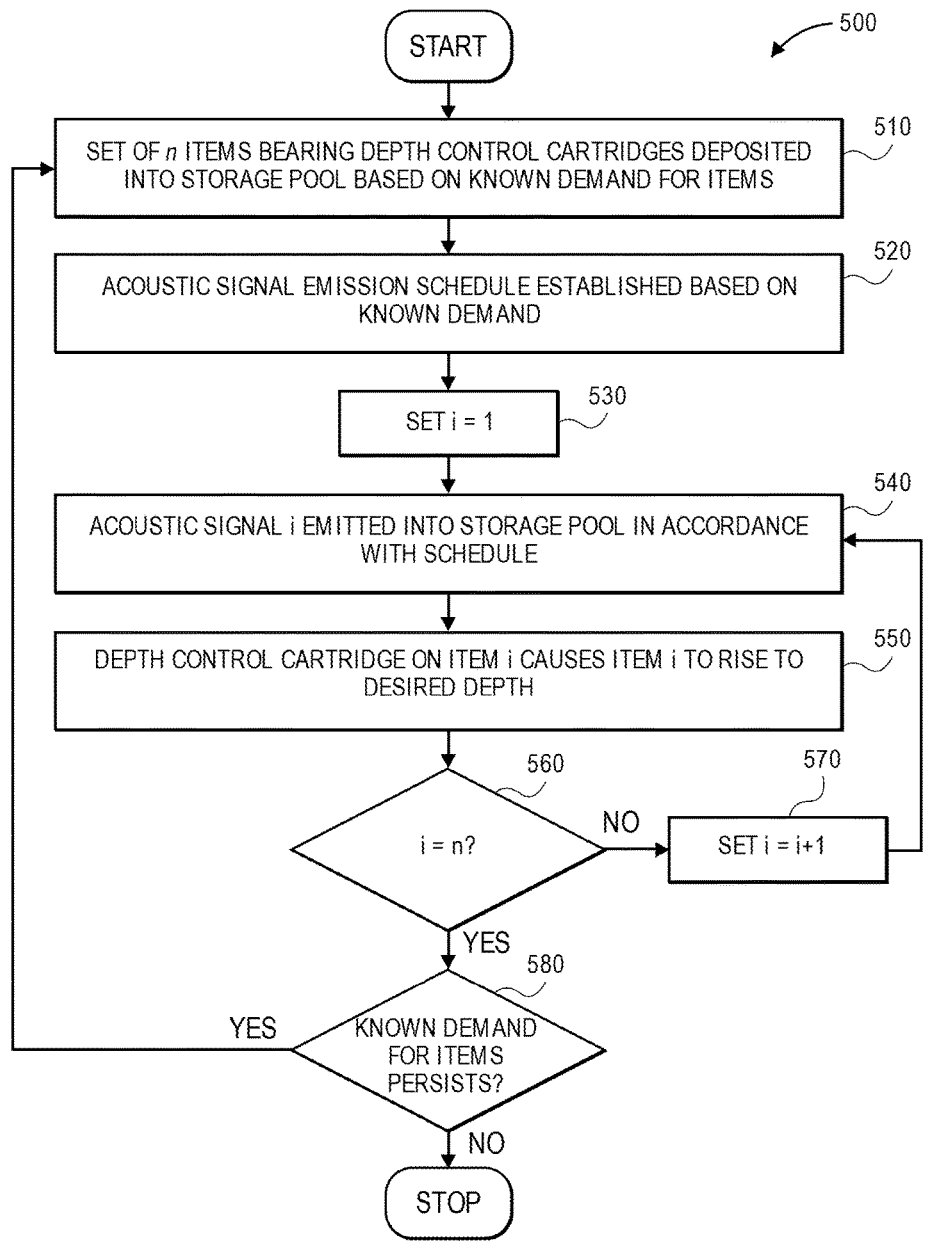
FIG. 5 is a flow chart of one process for retrieving an item from an aquatic storage facility in accordance with the present disclosure.

Referring to FIG. 5, a flow chart 500 of one process for retrieving an item from an aquatic storage facility in accordance with the present disclosure is shown. At box 510, each of a set of n items bearing depth control cartridges (or other depth control devices) is deposited into a storage pool based on a known demand for the items. For example, the demand for the items may be determined on a seasonal basis (e.g., increased demand for holiday ornaments or lights in the months of November or December), on a localized basis (e.g., increased demand for high-definition television sets in Connecticut in March each year, prior to the airing of amateur basketball tournaments), or on any other basis, including predicted or actual weather conditions (e.g., increased demand for batteries when a powerful storm is anticipated or has struck). At box 520, a schedule for emitting acoustic signals into the storage pool is established based on the known demand. For example, where it is estimated that five tailgating chairs will be sold per day in August, prior to football season, a schedule of acoustic signals including instructions for elevating five different tailgating chairs stored in waterproof or liquid-resistant containers having depth control cartridges affixed thereto may be defined. The individual depth control cartridges may be configured to cause a net density of each of such containers to fall below the density of water upon receiving such signals. Alternatively, a plurality of depth control cartridges may be individually programmed to elevate their respective items at given times and on given dates, and an acoustic signal need not be emitted into the storage pool in order to achieve this result.

At box 530, a value of a step variable i is set at 1, or i=1. At box 540, an acoustic signal i is emitted into the storage pool in accordance with the schedule. The acoustic signal i may be emitted from an active sonar transducer or like device mounted within the storage pool or in any other relevant location within an acoustic range of each of the n items. At box 550, a depth control cartridge provided on item i causes the item i to rise to a desired depth in response to the acoustic signal i. In response to the acoustic signal i, the depth control cartridge may cause a flexible bladder or other expandable volume provided on the depth control cartridge to expand, e.g., by charging air or another lightweight fluid into the flexible bladder, or discharge a defined mass or volume of water from a ballast tank within the depth control cartridge to the storage pool. Any means or method for reducing a net density of the item i in response to the acoustic signal i may be utilized in accordance with the present disclosure. Alternatively, each of the depth control cartridges may be independently configured or programmed to change a net density of a respective item at a given time, in accordance with a predetermined schedule.

At box 560, whether the value of the step variable i is equal to the number n of items in the set is determined. If the value of the step variable i is not equal to the number n, thereby indicating that at least some of the n items in the set remain within the storage pool, then the process advances to box 570, where the value of the step variable i is incrementally increased by 1, and to box 540, where the acoustic signal i is emitted into the storage pool in accordance with the schedule. If the value of the step variable i is equal to the number n, thereby indicating that each of the n items has been elevated from the storage pool, the process advances to box 580, where whether the known demand for the items persists is determined. For example, where the set included a sufficient number n of the items to accommodate one week's worth of demand for the items, and the demand is known to persist for two or more weeks, then another set of n items must be deposited into the storage pool in order to accommodate the demand in the following week. If the demand is known to no longer persist, then the process ends. If the demand persists, however, then the process returns to box 510, wherein another set of n items bearing depth control cartridges is deposited into the storage pool.

Referring to FIGS. 6A through 6H, pictorial diagrams illustrating aspects of one embodiment of an aquatic storage facility in accordance with the present disclosure are shown. Except where otherwise noted, reference numerals preceded by the number "6" shown in FIGS. 6A through 6H indicate components or features that are similar to components or features having reference numerals preceded by the number "4" shown in FIG. 4A or FIG. 4B, by the number "2" shown in FIG. 2A or FIG. 2B, by the number "1" shown in FIGS. 1A through 1M.

Figure 6A:
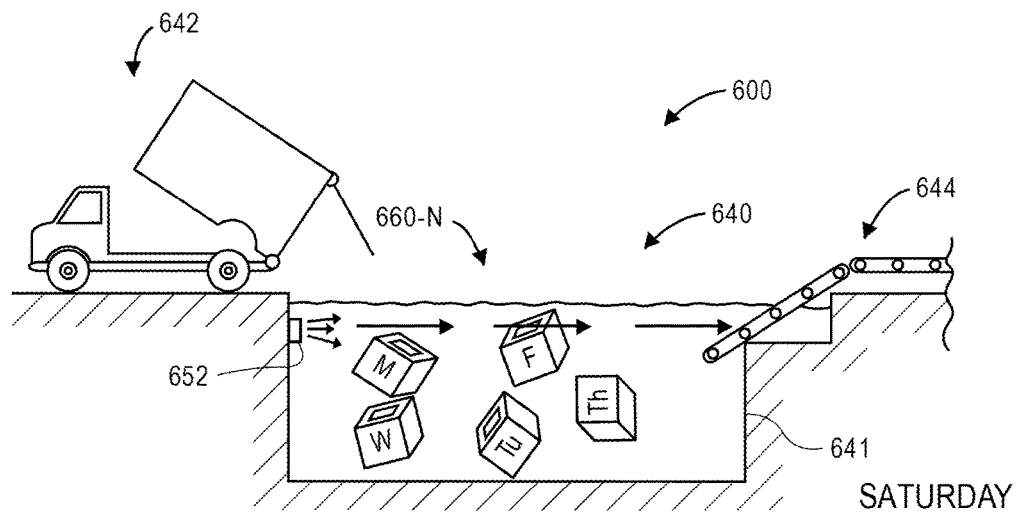
FIGS. 6A through 6H are pictorial diagrams illustrating aspects of one embodiment of an aquatic storage facility in accordance with the present disclosure.
Figure 6B:
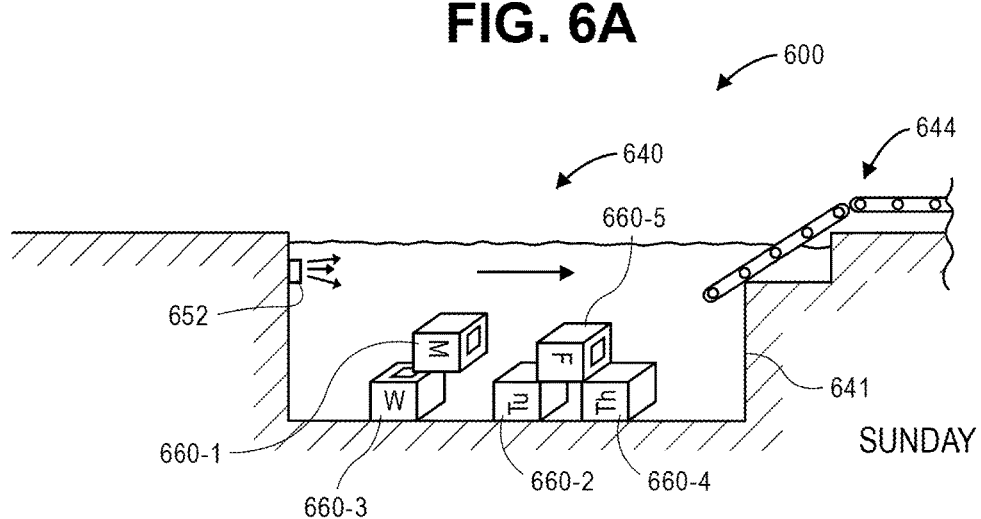

As is shown in FIG. 6A, a system 600 includes an aquatic storage facility 640 (e.g., a storage pool) substantially filled with a fluid (e.g., water). The aquatic storage facility 640 includes a flow source 652 (e.g., a jet) and an egress unit 644 (e.g., a conveyor aligned to remove items from the storage pool). A truck 642 approaches the aquatic storage facility 640 on a Saturday and deposits a set of items 660-$n$ therein, e.g., by backing up to the aquatic storage facility 640 and elevating one end of a bed or dump box to drop the items 660-$n$ behind the truck 642. As is shown in FIG. 6B, as of Sunday, because the densities of each of the items 660-$n$ exceed a density of the fluid within the aquatic storage facility 640, each of the items 660-$n$ has descended to a bottom 641 of the aquatic storage facility 640 and come to a rest there.

Figure 6C:
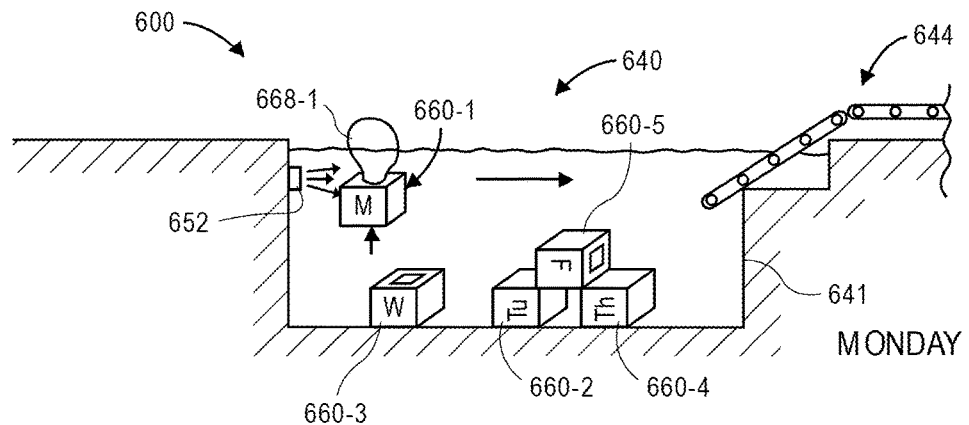

As is discussed above, an item having a depth control device or other component that is configured to vary a density of the item may be programmed to change a net density of the item and, therefore, a depth of the item within an aquatic storage facility in accordance with a predetermined schedule. The schedule may be selected on any basis, including but not limited to a known or anticipated demand for the items. For example, as is shown in FIG. 6C, a first one 660-1 of the set of items 660-$n$ may automatically rise from the bottom 641 of the aquatic storage facility 640 on a Monday, in anticipation of a demand for the first item 660-1 on that date, e.g., in response to an acoustic signal emitted or radiated into the liquid within the aquatic storage facility 640, or based on a pre-programmed schedule. The first item 660-1 may include a depth control device or other component having an expandable volume 668-1 that may be pressurized to increase in volume as the first item 660-1 rests on the bottom 641 of the storage pool 640 until the first item 660-1 lifts from the bottom 641 and rises to a surface of the liquid. When the first item 660-1 is at the surface of the liquid, or at the same depth or height within the storage pool 640 as the flow source 652, the first item 660-1 may be urged toward the egress unit 644, and removed from the storage pool 640 accordingly.

Figure 6D:
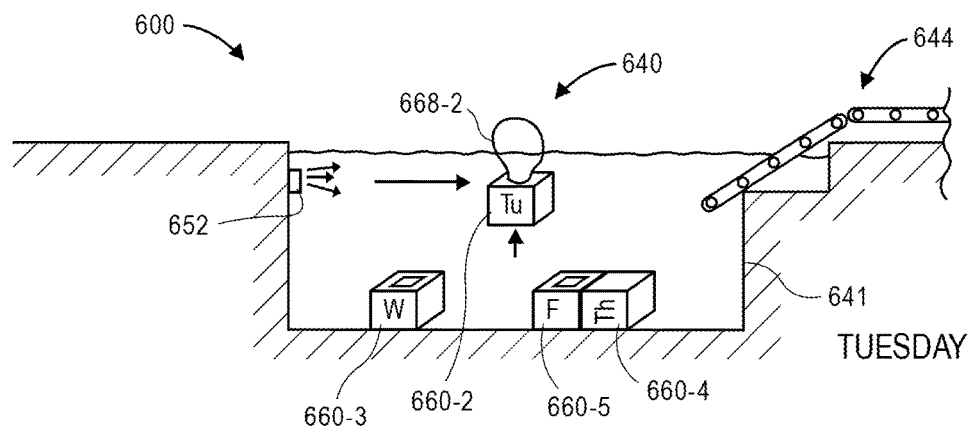
Figure 6E:
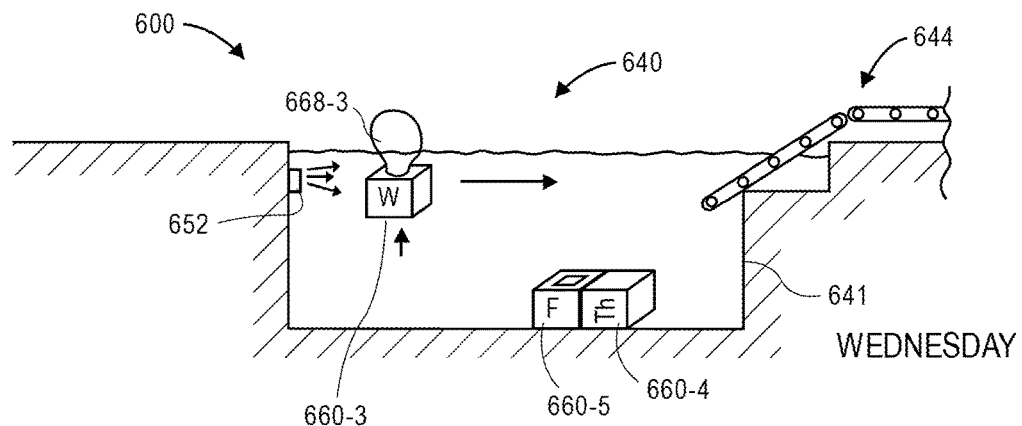
Figure 6F:
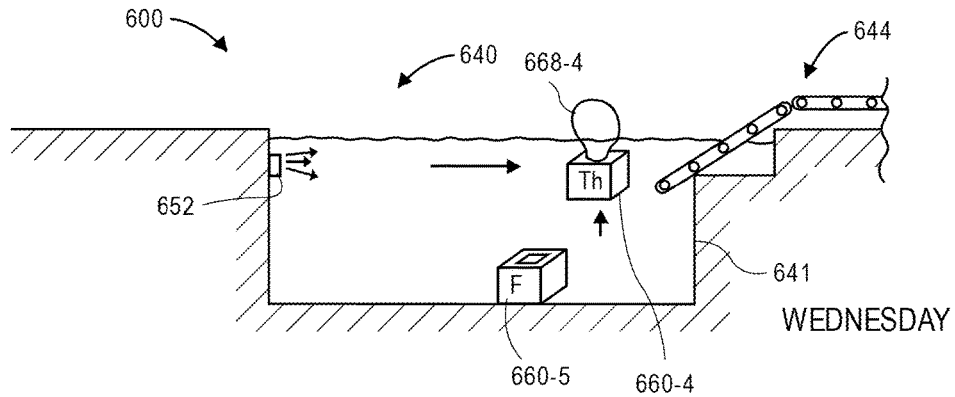
Figure 6G:
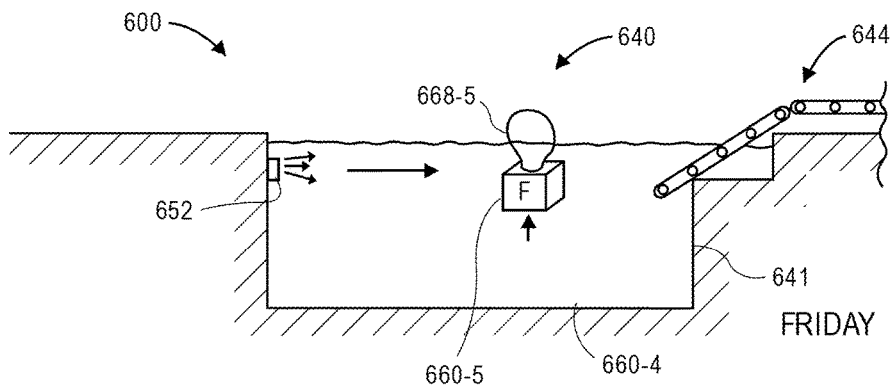
Figure 6H:
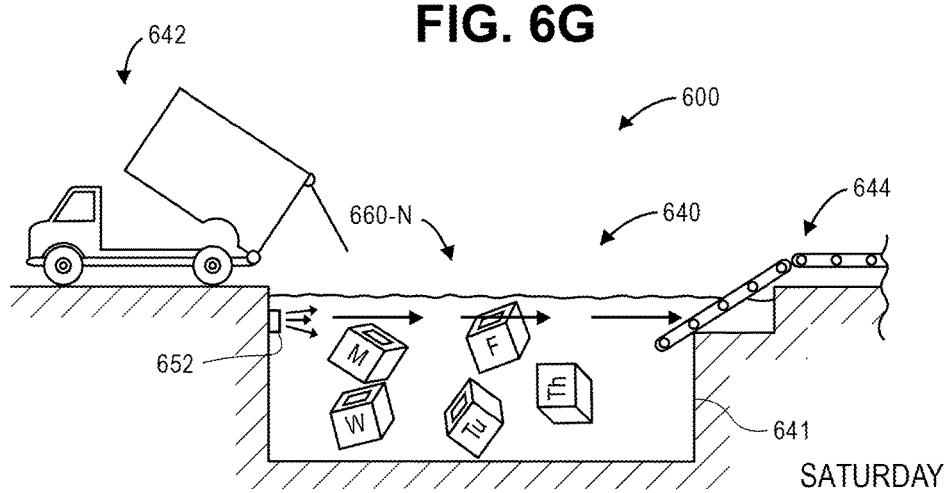

As is shown in FIG. 6D, a second one 660-2 of the set of items 660-$n$ may automatically rise from the bottom 641 of the aquatic storage facility 640 on a Tuesday, in anticipation of a demand for the second item 660-2 on that date, e.g., by pressurizing and inflating an expandable volume 668-2 provided on the second item 660-2, until the second item lifts from the bottom 641 and rises to the surface of the liquid. The second item 660-2 may then be urged toward the egress unit 644 by one or more currents generated by the flow source 652. As is shown in FIG. 6E, FIG. 6F and FIG. 6G, a third item 660-3, a fourth item 660-4 and a fifth item 660-5 of the set of items 660-$n$ may automatically rise from the bottom 641 of the aquatic storage facility 640 on a Wednesday, a Thursday and a Friday, respectively, in anticipation of demands for the third item 660-3, the fourth item 660-4 and the fifth item 660-5 on those dates, e.g., by pressurizing and inflating expandable volumes 668-3, 668-4, 668-5 provided thereon, until the respective items lift from the bottom 641 and rise to the surface of the liquid. The third item 660-3, the fourth item 660-4 and the fifth item 660-5 may then be urged toward the egress unit 644 on those dates by currents generated by the flow source 652. Alternatively, one or more of the items 660-1, 660-2, 660-3, 660-4, 660-5 may include one or more ballast tanks that may be automatically pumped, drained or blown on predetermined schedules in order to reduce a mass thereof, thereby causing the respective items 660-1, 660-2, 660-3, 660-4, 660-5 to lift from the bottom 641 and rise to a surface of the liquid. Subsequently, as is shown in FIG. 6H, the aquatic storage facility 640 may be refilled with a new set 660-$n$ of items on a Saturday, in anticipation of demand for such items in the coming days.

The depth control devices that are mounted to or otherwise associated with items within an aquatic storage facility may be configured to cause such items to descend to a bottom or lower level of the aquatic storage facility (e.g., by causing a net density of an item to exceed a density of a fluid within the aquatic storage facility) or to ascend to a surface of the fluid within the aquatic storage facility (e.g., by causing the net density of the item to fall below the density of the fluid within the aquatic storage facility). Alternatively, a depth control device may be configured to cause an item to remain at a substantially constant depth or height within an aquatic storage facility, by causing a net density of the item to exceed or fall below a density of a fluid within the aquatic storage facility until the item reaches a desired depth (e.g., distance from a surface of the fluid) or a desired height (e.g., distance from a bottom of the aquatic storage facility), and then causing the net density of the item to match the density of the fluid. Thereafter, the motion of the item within the fluid may slow due to friction, and the item may be caused to rest at a desired depth. Changes in net densities of items may be caused with hysteresis in mind, in order to account for this friction or other factors relating to motion.

Referring to FIGS. 7A, 7B and 7C, pictorial diagrams illustrating aspects of one embodiment of an aquatic storage facility in accordance with the present disclosure are shown. Except where otherwise noted, reference numerals preceded by the number "7" shown in FIGS. 7A, 7B and 7C indicate components or features that are similar to components or features having reference numerals preceded by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

As is shown in FIG. 7A, an aquatic storage facility 740 is filled with water (or another liquid) and includes a container 760 having a depth control device 765 with an expandable bladder 768 having a volume $V_A$ joined to the container 760. Because a net density of the container 760 is greater than or equal to a density of water, or $\rho_{CONTAINER} \geq \rho_{H2O}$, the container 760 rests on a bottom 741 of the aquatic storage facility 740. The volume $V_A$ may be selected to ensure that the net density of the container 760 remains above the density of water, thereby causing the container 760 to remain on the bottom 741. Alternatively, the depth control device 765 may include a ballast tank (not shown) that may be filled to include a predetermined mass of water therein that may be selected to ensure that the net density of the container 760 will equal or exceed the density of water, causing the container 760 will rest on the bottom 741.

The depth control devices of the present disclosure may be used to change a depth or height of an item within an aquatic storage facility, and cause the item to remain at a desired depth or height. As is shown in FIG. 7B, the bladder 768 may be pressurized with air or another lightweight fluid to a volume $V_B$, where the volume $V_B$ is greater than the volume $V_A$ of the bladder 768 in FIG. 7A, thereby causing the net density of the container 760 to fall below a density of water, or $\rho_{CONTAINER} < \rho_{H2O}$. As a result, the container 760 lifts from the bottom 741 of the aquatic storage facility 740. The volume $V_B$ may be selected to ensure that the net density of the container 760 remains sufficiently below the density of water, thereby causing the container 760 to rise up from the bottom 741. Alternatively, where the depth control device 765 includes a ballast tank filled to include a predetermined mass of water therein, at least some of the water may be pumped, drained or blown therefrom in order to cause the net density of the container to fall below the density of water, and to cause the container 760 to rise up from the bottom 741.

As is shown in FIG. 7C, the bladder 768 may be depressurized to a volume $V_C$, e.g., by returning at least some of the air or other fluid charged into the bladder in FIG. 7B back into a tank or another source, or by venting the air or other fluid to the water within the aquatic storage facility 740, where the volume $V_C$ is less than the volume $V_B$ of the bladder 768 in FIG. 7B but greater than the volume $V_A$ of the bladder 768 in FIG. 7A. The volume $V_C$ may be selected to cause the net density of the container 760 to match the density of water, thereby causing the container 760 to level off at a desired depth d from a surface of the water, or a desired height h from the bottom 741. Alternatively, where the depth control device 765 includes a ballast tank filled to include a predetermined mass of water therein, additional water may be added thereto or charged therein, in order to cause the net density of the container to match the density of water, and to cause the container 760 to level off at the desired depth d or the desired height h.

Figure 8:
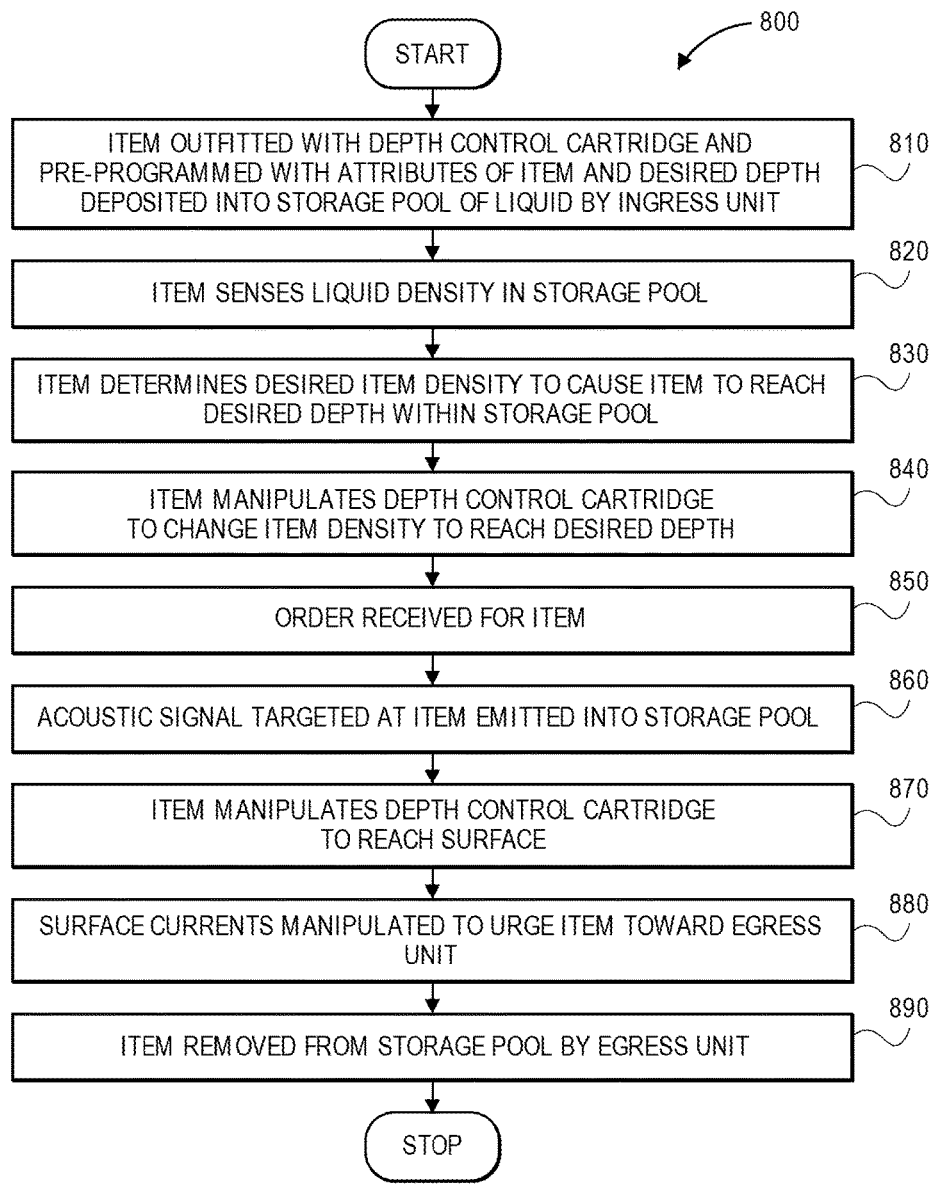
FIG. 8 is a flow chart of one process for retrieving an item from an aquatic storage facility in accordance with the present disclosure.

Referring to FIG. 8, a flow chart 800 of one process for retrieving an item from an aquatic storage facility in accordance with the present disclosure is shown. At box 810, an item outfitted with a depth control cartridge (or other depth control device) and pre-programmed with attributes of the item and a desired depth for the item is deposited into a storage pool of liquid by an ingress unit. For example, the depth control cartridge may be programmed with information regarding the item and/or its contents, e.g., a mass, a volume, one or more dimensions, as well as any expiration dates, intended uses, or other characteristics of the item. Additionally, the desired depth may be identified with respect to a specific distance from a surface of the liquid within the storage pool or a specific distance from a bottom of the storage pool. Alternatively, the desired depth may be identified with respect to a feature of the storage pool, e.g., "bottom." The ingress unit may be a conveyor, e.g., the ingress unit 142 of FIG. 1A, as well as a human, a robot, a vehicle or any other type of machine.

At box 820, the item senses a density of the liquid within the storage unit. For example, where the liquid within the storage pool is pure water, the density of the liquid may have a maximum of 1.0000 grams per cubic centimeter ($g/cm^3$) at four degrees Celsius (4° C.), as well as values of 0.9982, 0.9922, 0.9832 and 0.9718 grams per cubic centimeter ($g/cm^3$) at twenty, forty, sixty or eighty degrees Celsius (20° C., 40° C., 60° C. or 80° C. Where the liquid within the storage pool is seawater, however, the density of the liquid may typically range from 1.020 to 1.029 grams per cubic centimeter ($g/cm^3$). Densities of a liquid typically vary based on the local salinity, temperature, depth and pressure of the liquid, among other factors.

At box 830, the item determines a desired item density in order to cause the item to reach the desired depth within the storage pool. One or more onboard computer processors may determine the net density of the item in a present configuration and, based on the density of the liquid within the storage unit sensed at box 820, calculate a preferred density that would cause the item to reach the desired depth. The desired item density may be expressed as a function of time and depth, e.g., values of the density that the item should have at a given time or at a given depth within the storage pool, in order to cause the item to settle at the desired depth.

At box 840, the item manipulates the depth control cartridge to change the item density in order to cause the item to reach the desired depth. For example, the depth control cartridge may charge a predetermined volume or mass of air or another fluid into an expansion volume, which may be a flexible bladder or any other component that may elastically change in volume in response to differences in internal pressure, or vent a predetermined volume or mass of air or another fluid therefrom. Alternatively, the depth control cartridge may include one or more internal ballast tanks coupled to external surfaces thereof that may be flooded with liquid in order to increase a mass of the depth control cartridge and the item, or may have liquid pumped or blown therefrom in order to decrease the mass of the depth control cartridge and the item, as desired.

At box 850, an order is received for the item, e.g., while the item is at the desired depth within the storage pool. At box 860, an acoustic signal targeted at the item is emitted into the storage pool. The acoustic signal may include tonals at one or more intensities and in one or more frequency spectra that include one or more instructions encoded therein. For example, the acoustic signal may include an instruction to minimize a net density of the item, thereby causing the item to rise to a surface of the liquid. In some embodiments, the acoustic signal may include one or more checksums to confirm the authenticity of the acoustic signal, and one or more acoustic identifiers of the ordered item, to ensure that only the ordered item executes the instructions in response to the acoustic signal. In some embodiments, the acoustic signal may be generally emitted into the liquid within the acoustic pool. In other embodiments, however, the acoustic signal may be emitted in the form of one or more beams directed toward a general region of the storage pool where the ordered item is presumably located.

At box 870, the item manipulates the depth control cartridge to reach a surface of the liquid within the storage pool. The depth control cartridge may cause an expansion volume to expand in a rapid or a controlled manner, thereby lowering the net density of the item below the density of water and causing the item to rise within the storage pool. Alternatively, where the item includes an internal tank filled with the liquid, the internal tank may be pumped, drained or blown to any extent, in order to reduce a mass of the item.

At box 880, surface currents within the storage pool are manipulated to urge the item toward an egress unit. For example, one or more jets or vacuum units may expel or suck liquid in a specific direction corresponding to the egress unit within the storage pool, thereby causing a local current flow in that direction. The egress unit may be a machine configured to remove the item from the storage pool or, alternatively, a region of the storage pool where a human, a robot, or another machine stand ready to pick the item from the storage pool. At box 890, the item is removed from the storage pool by the egress unit, and the process ends.

As is discussed above, the storage of items at various depths or heights within an aquatic storage facility may be particularly advantageous where the items are of different sizes or shapes, or where demand for such items may vary, or where attributes of the items (e.g., expiration dates, environmental constraints) are best served by storing the items in different locations within the aquatic storage facility. Referring to FIGS. 9A through 9F, pictorial diagrams illustrating aspects of one embodiment of an aquatic storage facility in accordance with the present disclosure are shown. Except where otherwise noted, reference numerals preceded by the number "9" shown in FIGS. 9A through 9F indicate components or features that are similar to components or features having reference numerals preceded by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

Figure 9A:
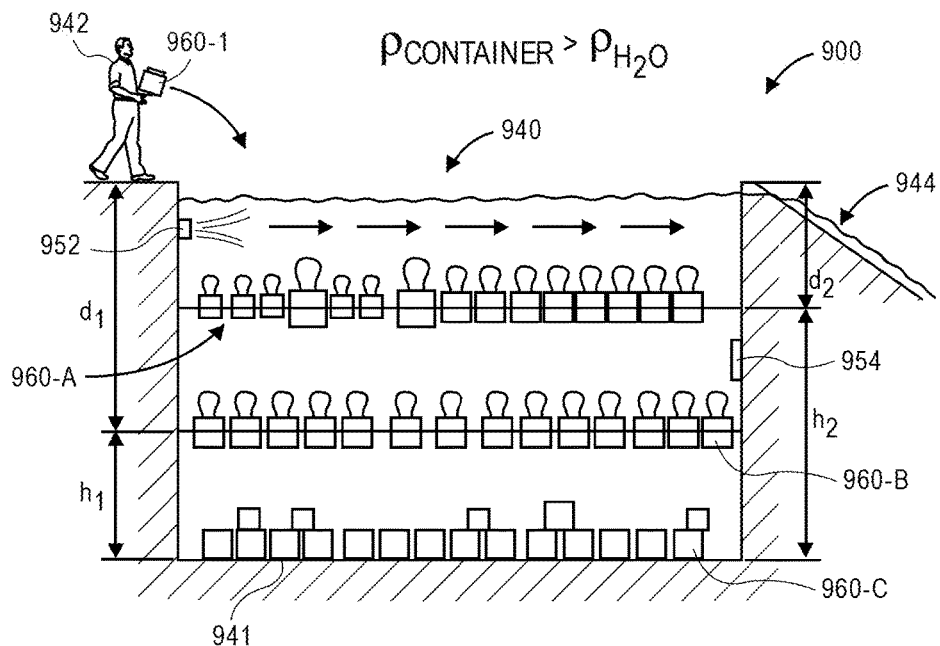
FIGS. 9A through 9F are pictorial diagrams illustrating aspects of one embodiment of an aquatic storage facility in accordance with the present disclosure.

As is shown in FIG. 9A, a system 900 includes an aquatic storage facility 940 filled with water or another liquid. The aquatic storage facility 940 includes an egress unit 944 comprising a ramp descending from an upper edge of the aquatic storage facility 940 and a flow source 952 (e.g., a jet) for expelling water toward the egress unit 944. In some embodiments, the ramp may be formed from, or lined by, a layer of a plastic material. The aquatic storage facility 940 further includes a sonar transducer 954 or other sound-emitting device provided on an inner surface of the aquatic storage facility 940. The sonar transducer 954 is configured to emit or radiate one or more sounds into the water. A plurality of items are stored within the aquatic storage facility 940, including a first set of items 960-A, a second set of items 960-B and a third set of items 960-C.

Each of the first set of items 960-A is stored at a depth $d_2$ from the surface from the liquid, or at a height $h_2$ from a bottom 941 of the aquatic storage facility 940. Therefore, each of the first set of items 960-A is configured to have a net density substantially equal to that of water, e.g., by depth control cartridges or other like devices affixed to such items, and selectively operating such cartridges in order to cause the net densities of the items to substantially equal water while at the depth $d_2$ or at the height $h_2$. Similarly, each of the second set of items 960-B is stored at a depth $d_1$ from the surface from the liquid, or at a height $h_1$ from the bottom 941 of the aquatic storage facility 940, with each of the second set of items 960-B having a net density substantially equal to that of water at the depth $d_1$ or at the height $h_1$. Finally, each of the third set of items 960-C rests at or near the bottom 941 of the aquatic storage facility 940. Therefore, each of the third set of items 960-C is configured to have a density greater than that of water, thereby causing each of such items to descend to the bottom 941. As is also shown in FIG. 9A, a worker 942 approaches an edge of the aquatic storage facility 940 with an 960-1 to be deposited therein.

Figure 9B:
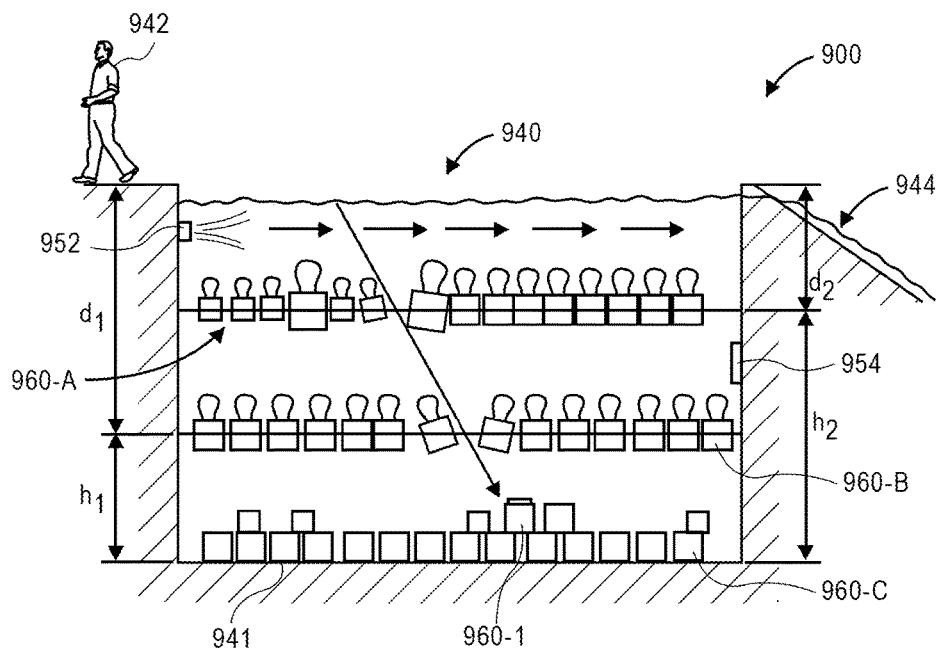

As is shown in FIG. 9B, the worker 942 has tossed the item 960-1 into the aquatic storage facility 940, and the item 960-1 has descended to the bottom 941, where the item 960-1 comes to a rest atop one or more of the third set of items 960-C. In order to arrive at the bottom 941, the item 960-1 was required to pass through two layers of items, viz., the first set of items 960-A at the depth $d_2$ or the height $h_2$ and the second set of items 960-B at the depth $d_1$ or the height $h_1$. The item 960-1 may be caused to descend to the bottom 941 by ensuring that a density of the item 960-1 is greater than the density of water, e.g., by depressurizing and deflating a bladder or other expansion volume, or by charging an onboard ballast tank full of water.

Figure 9C:
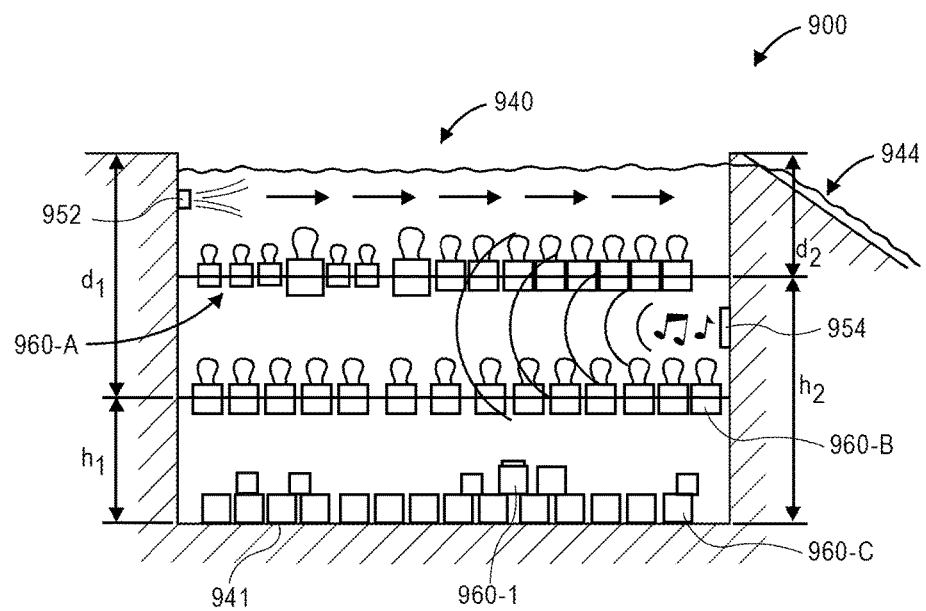

As is shown in FIG. 9C, an acoustic signal may be emitted into the liquid of the acoustic storage facility 940 by the sonar transducer 954. The acoustic signal may be specifically intended for one or more of the items, e.g., the item 960-1, or one or more of the first set of items 960-A, the second set of items 960-B or the third set of items 960-C, within the aquatic storage facility 940, and may include one or more checksums, acoustic identifiers and/or instructions (e.g., to execute a change in density or depth) associated with the one or more items for which the acoustic signal is intended.

Figure 9D:
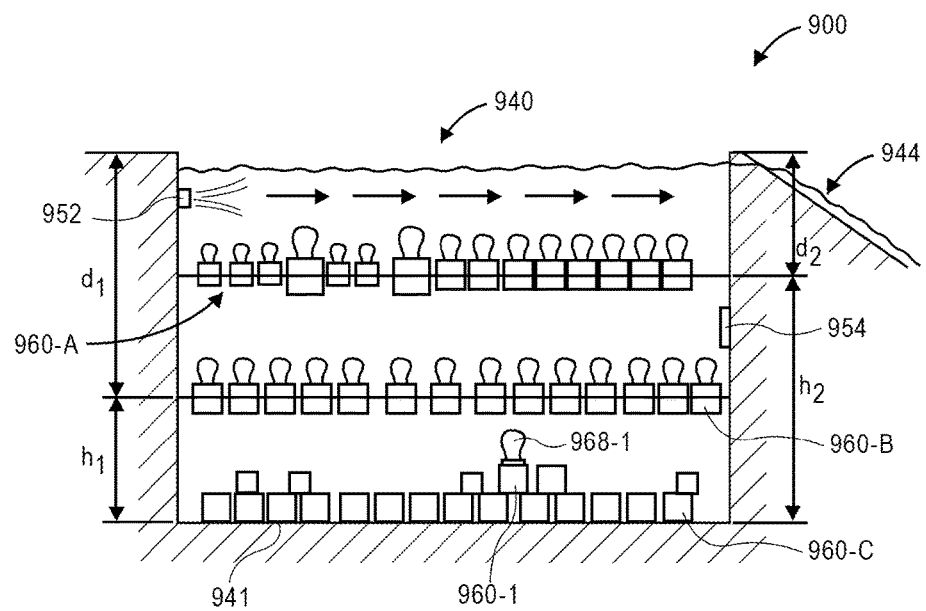

As is shown in FIG. 9D, upon receiving the acoustic signal, the item 960-1 may respond by taking one or more actions to reduce a net density of the item 960-1, such as by charging air or another lightweight fluid into an expansion volume 968-1, thereby increasing a net volume of the item 960-1 or, alternatively, by pumping or blowing water from one or more onboard ballast tanks, thereby decreasing a net mass of the item 960-1.

Figure 9E:
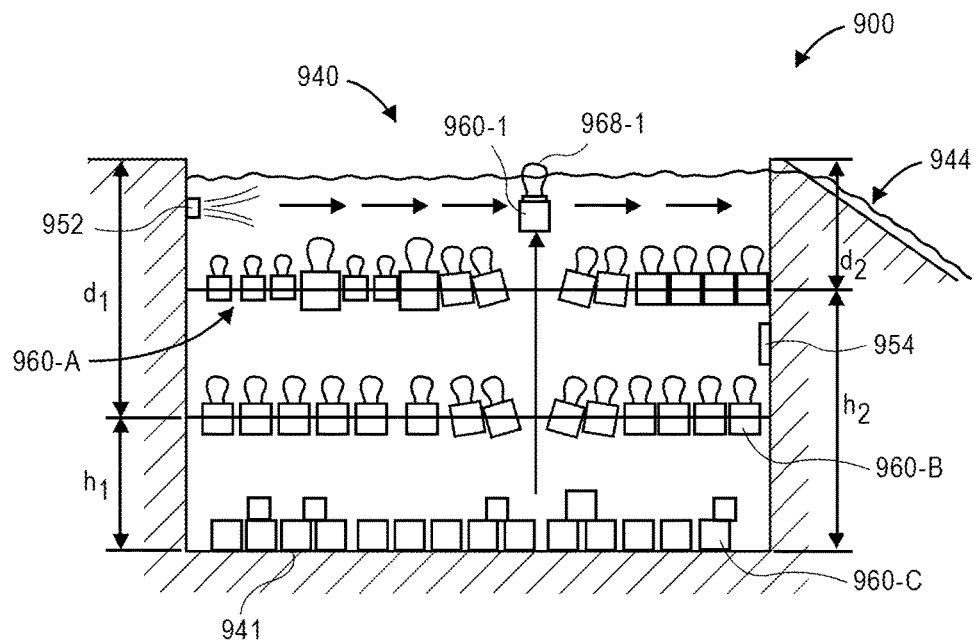
Figure 9F:
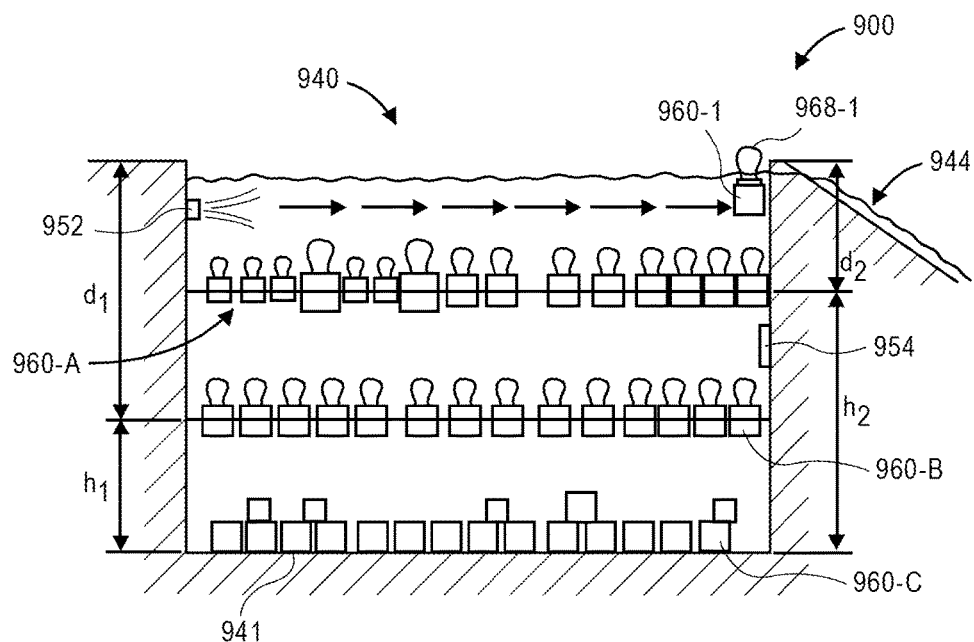

As is shown in FIG. 9E, after the net density of the item 960-1 has fallen below the density of water, the item 960-1 ascends to a surface of the water within the storage pool 940. In order to reach the surface, the item 960-1 was required to pass through the two layers of items again, viz., the first set of items 960-A at the depth $d_2$ or the height $h_2$ and the second set of items 960-B at the depth $d_1$ or the height $h_1$. As is shown in FIG. 9F, once the item 960-1 has reached the surface of the water, or is at a similar depth or height of the flow source 952, the item 960-1 is urged in a direction of the egress unit 944, where the item 960-1 may be caused to travel down the ramp from the upper edge of the aquatic storage facility 940.

As is discussed above, the aquatic storage facilities of the present disclosure may include one or more natural bodies of water. Referring to FIGS. 10A through 10F, pictorial diagrams illustrating aspects of one embodiment of an aquatic storage facility in accordance with the present disclosure are shown. Except where otherwise noted, reference numerals preceded by the number "10" shown in FIGS. 10A through 10F indicate components or features that are similar to components or features having reference numerals preceded by the number "9" shown in FIGS. 9A through 9F, by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

Figure 10A:
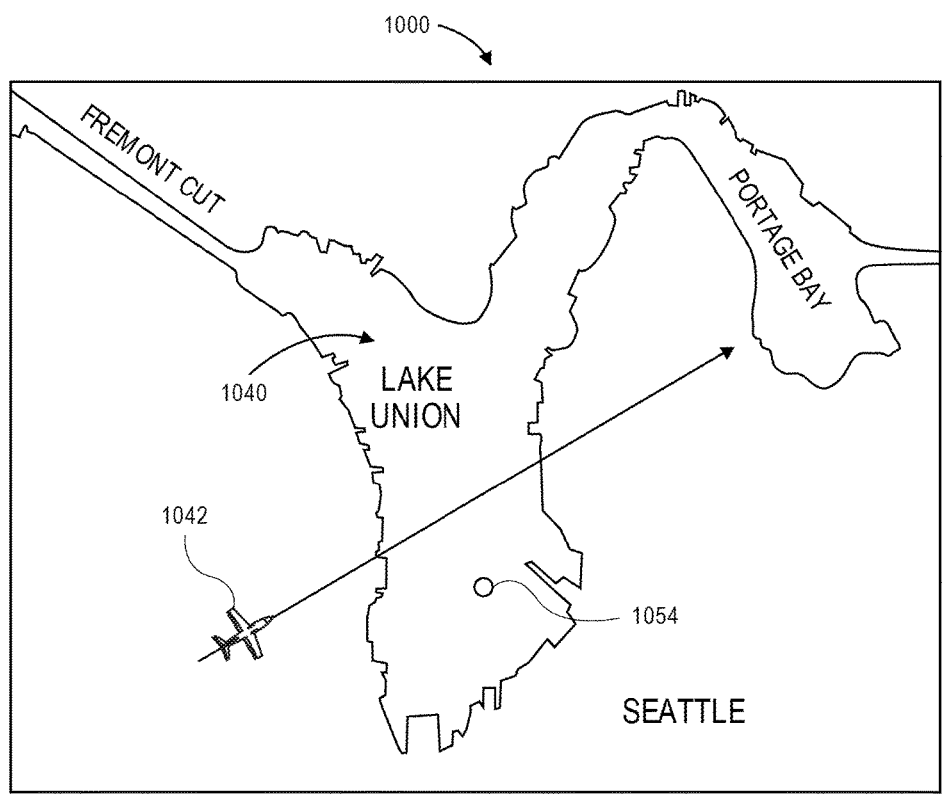
FIGS. 10A through 10F are pictorial diagrams illustrating aspects of one embodiment of an aquatic storage facility in accordance with the present disclosure.

As is shown in FIG. 10A, a system 1000 includes a natural storage pool 1040 (viz., Lake Union, in Seattle, Wash.) having an active sonar buoy 1054 or other vessel floating therein. The natural storage pool 1040 is in fluid communication with other natural bodies of water (viz., the Fremont Cut and Portage Bay), which may feed influent to the natural storage pool 1040 or receive effluent from the natural storage pool 1040. An aircraft 1042 travels over the natural storage pool 1040 in a northeasterly direction. The active sonar buoy 1054 may include one or more hydrophones, transmitters and/or computer devices configured for communication with one or more external computer devices (not shown) over a network.

Figure 10B:
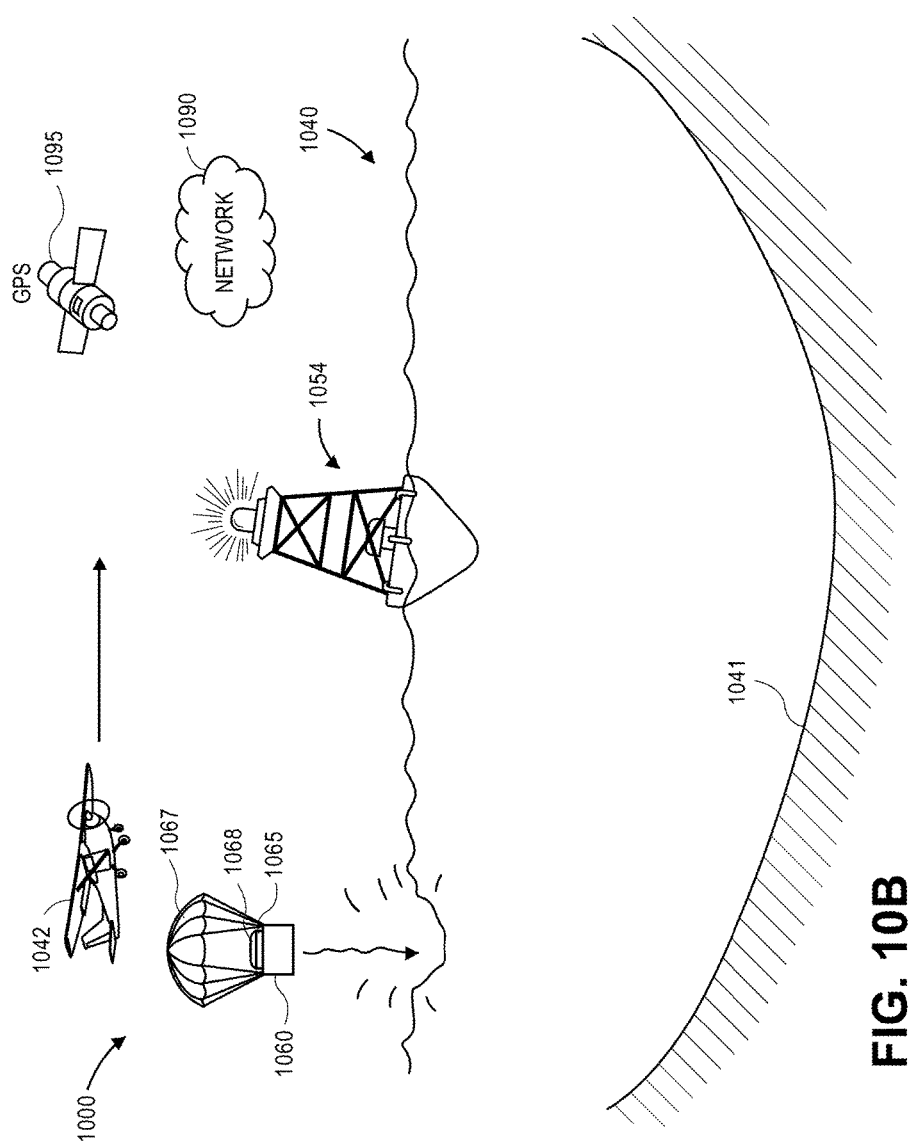

As is shown in FIG. 10B, the aircraft 1042 drops an item 1060 into the natural storage pool 1040. The item 1060 is equipped with a parachute 1067 and includes a depth control device 1065 mounted thereto. The depth control device 1065 (e.g., a depth control cartridge releasably or fixedly joined to the item 1060) includes an expansion volume 1068 that may be charged with air or another lightweight fluid, and may vent or release the air or other lightweight fluid therefrom. Alternatively, the depth control device 1065 may include one or more tanks for receiving water from the natural storage pool 1040, or for discharging water to the natural storage pool 1040, as necessary, in order to automatically vary a mass of the item 1060.

Figure 10C:
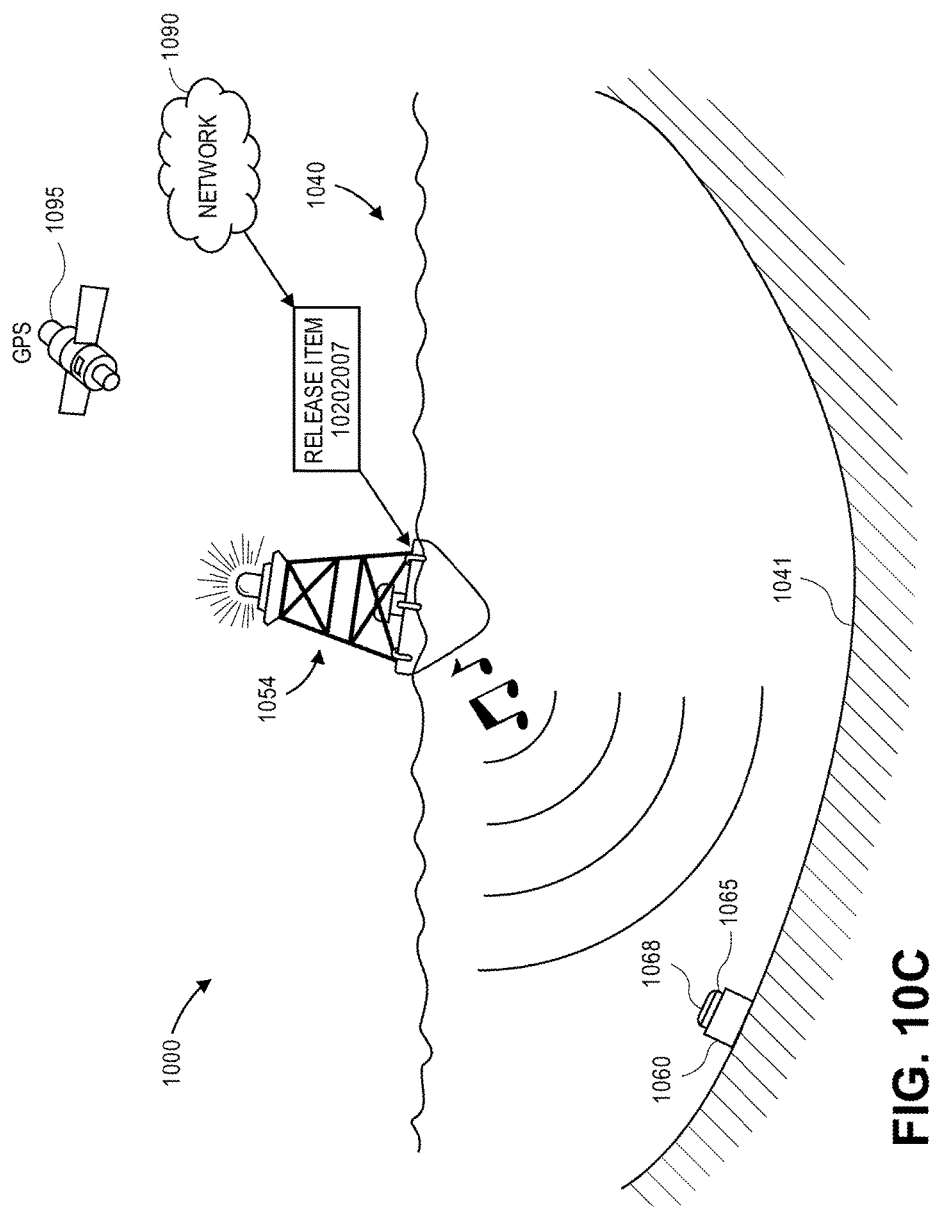
Figure 10D:
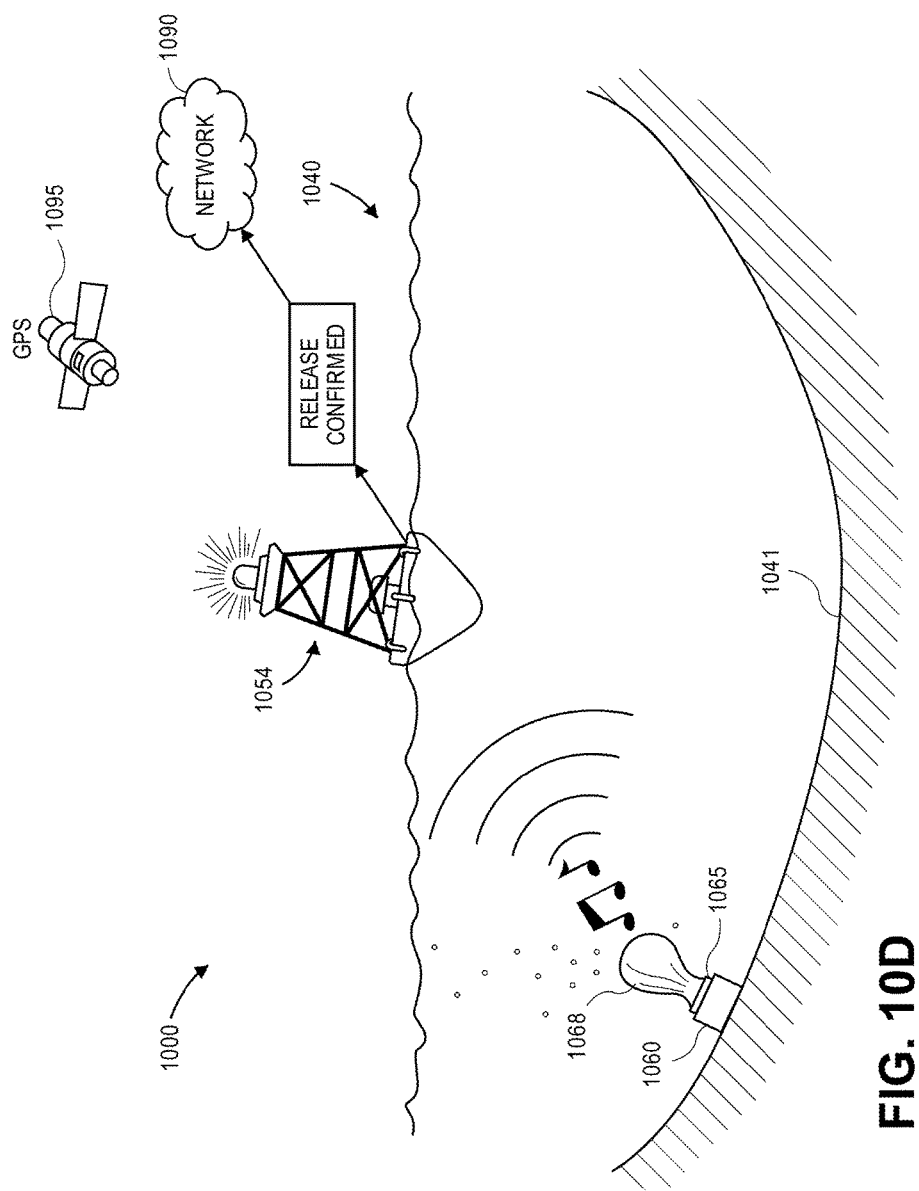
Figure 10E:
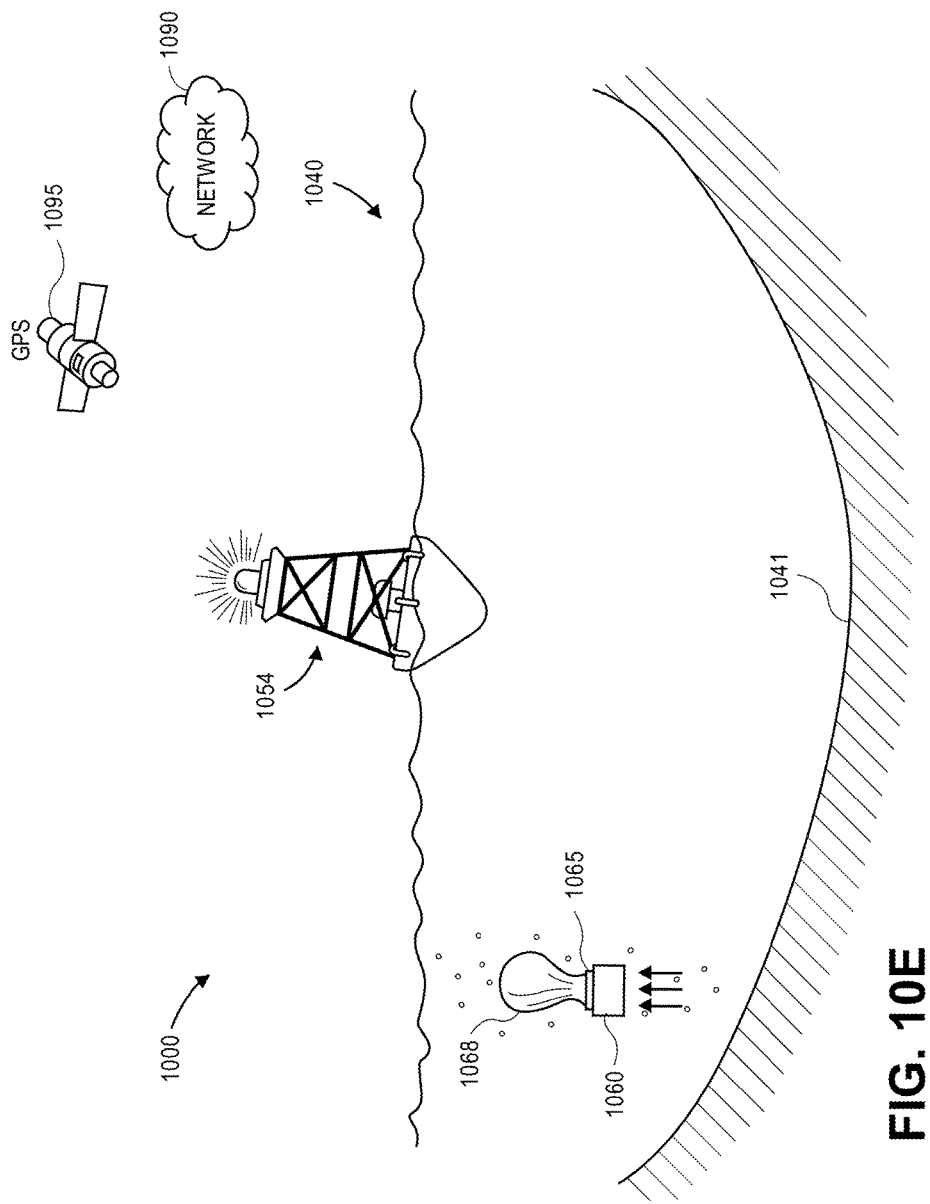

As is shown in FIG. 10C, the item 1060 descends to a bottom 1041 of the natural storage pool 1040, and comes to a rest there. The item 1060, therefore, has a net density that is greater than the density of the water within the natural storage pool 1040. Subsequently, the active sonar buoy 1054 may receive a message including one or more commands from the network 1090 and issue an instruction to the item 1060 to release itself from the bottom 1041 of the natural storage pool 1040. For example, an order for the item 1060 may be received by an online marketplace, which may then communicate a message including the instruction to the item 1060 over the network 1090. As is shown in FIG. 10D, the item 1060 may transmit an acoustic signal in response, acknowledging receipt of the acoustic signal from the active sonar buoy 1054, and confirming that the item 1060 is in the process of releasing itself from the bottom 1041 of the natural storage pool 1040, e.g., by charging air or another lightweight fluid into the expansion volume 1068 or, alternatively, by pumping, draining or blowing water from one or more onboard tanks. The active sonar buoy 1054 may transmit one or more messages to an external computer device (not shown) over the network 1090. As is shown in FIG. 10E, the charging of the air or other lightweight fluids into the expansion volume 1068 causes the item 1060 to lift from the bottom 1041 and ascend toward a surface of the water.

Figure 10F:
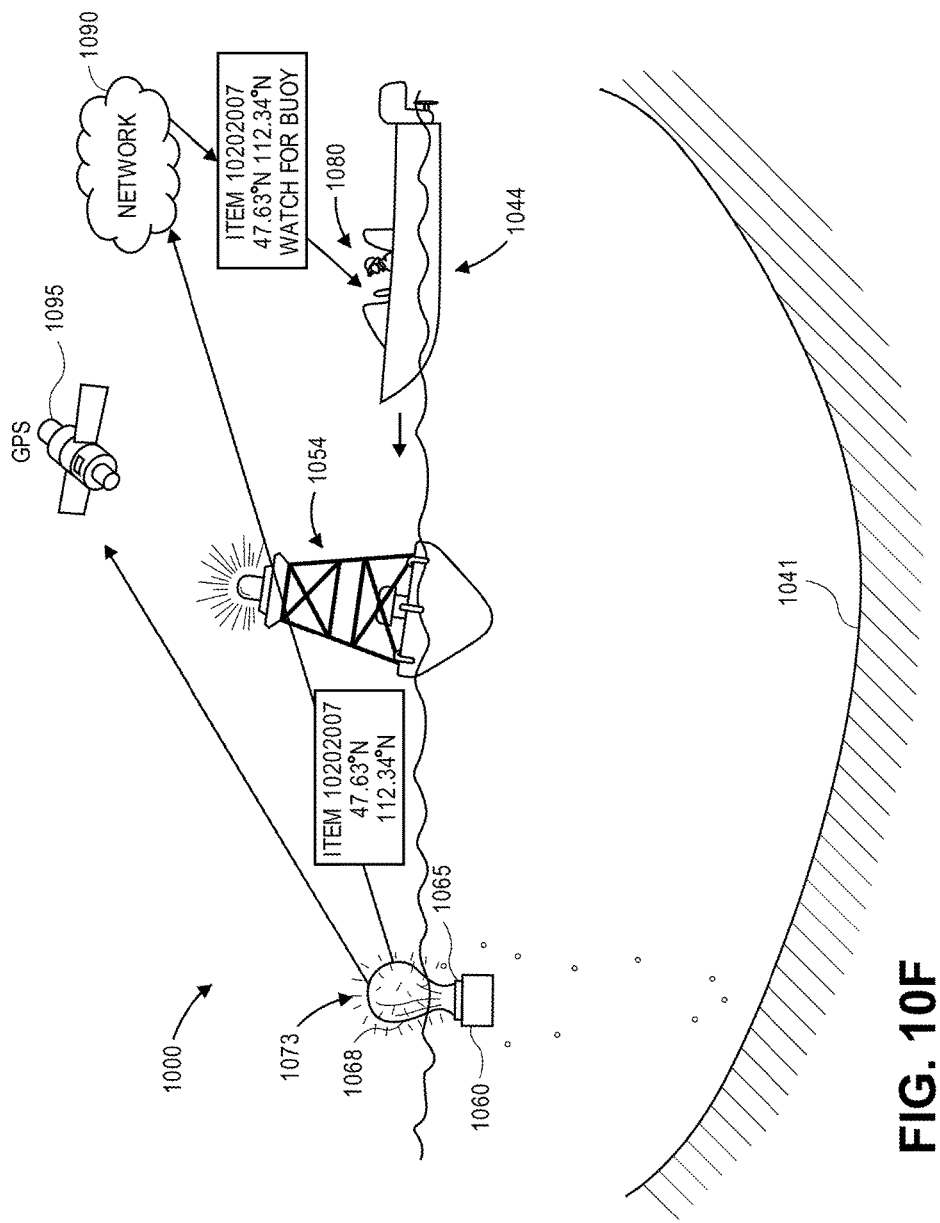

As is shown in FIG. 10F, once the item 1060 has reached the surface of the water, the depth control device 1065 may determine a position of the item 1060, e.g., based on signals received from one or more orbiting GPS satellites 1095, and may transmit one or more messages identifying the position of the item 1060 to an external computer device (not shown) over the network 1090. Concurrently or shortly thereafter, e.g., in real time or in near-real time, a message may be transmitted to a computer device associated with a customer 1080 who placed an order for the item 1060, or with a vehicle 1044 in which the customer 1080 is traveling, informing the customer 1080 of the position of the item 1060 and including advice regarding travel to the position of the item 1060 (e.g., locations of obstacles or hazards). The customer 1080 may then proceed to the position of the item 1060 in the vehicle 1044 and manually retrieve the item 1060 there. The depth control cartridge 1065 may further illuminate a light 1073 or another beacon to aid the customer 1080 in locating the item 1060.

Natural storage pools of the present disclosure may also utilize natural or artificially generated current flows when storing and distributing items to customers. Referring to FIGS. 11A through 11I, pictorial diagrams illustrating aspects of one embodiment of an aquatic storage facility in accordance with the present disclosure are shown. Except where otherwise noted, reference numerals preceded by the number "11" shown in FIGS. 11A through 11I indicate components or features that are similar to components or features having reference numerals preceded by the number "10" shown in FIGS. 10A through 10F, by the number "9" shown in FIGS. 9A through 9F, by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

Figure 11A:
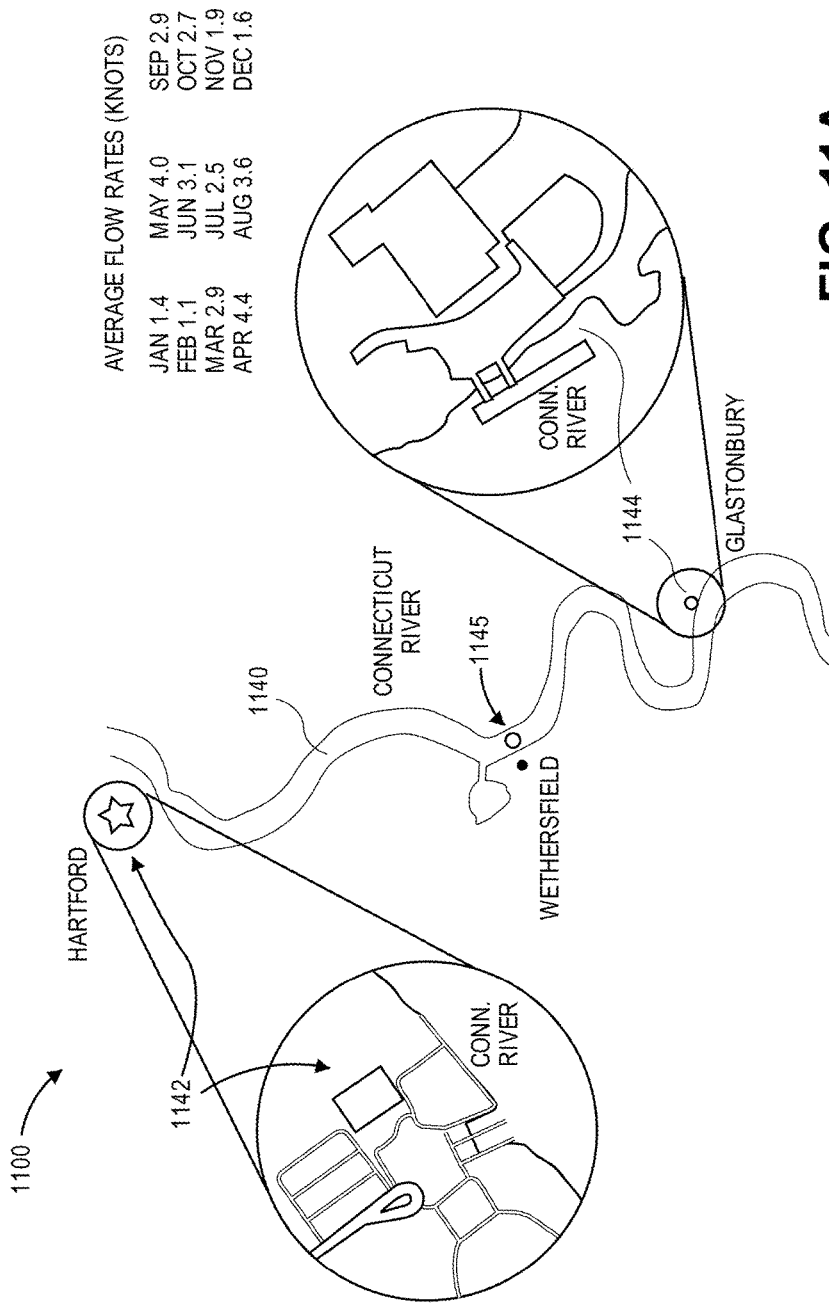

As is shown in FIG. 11A, a system 1100 includes a natural storage pool 1140, viz., the Connecticut River, passing from an ingress unit 1142 at Hartford, Conn., to an egress unit 1144 at Glastonbury, Conn., by way of an intervening point 1145 at Wethersfield, Conn. The natural storage pool 1140 is known to experience seasonal current flows ranging in speeds from peak flows during spring months (e.g., based on snow melt in points north) to minimum flows in winter months (e.g., due to the presence of floes and bergs on the river).

Figure 11B:
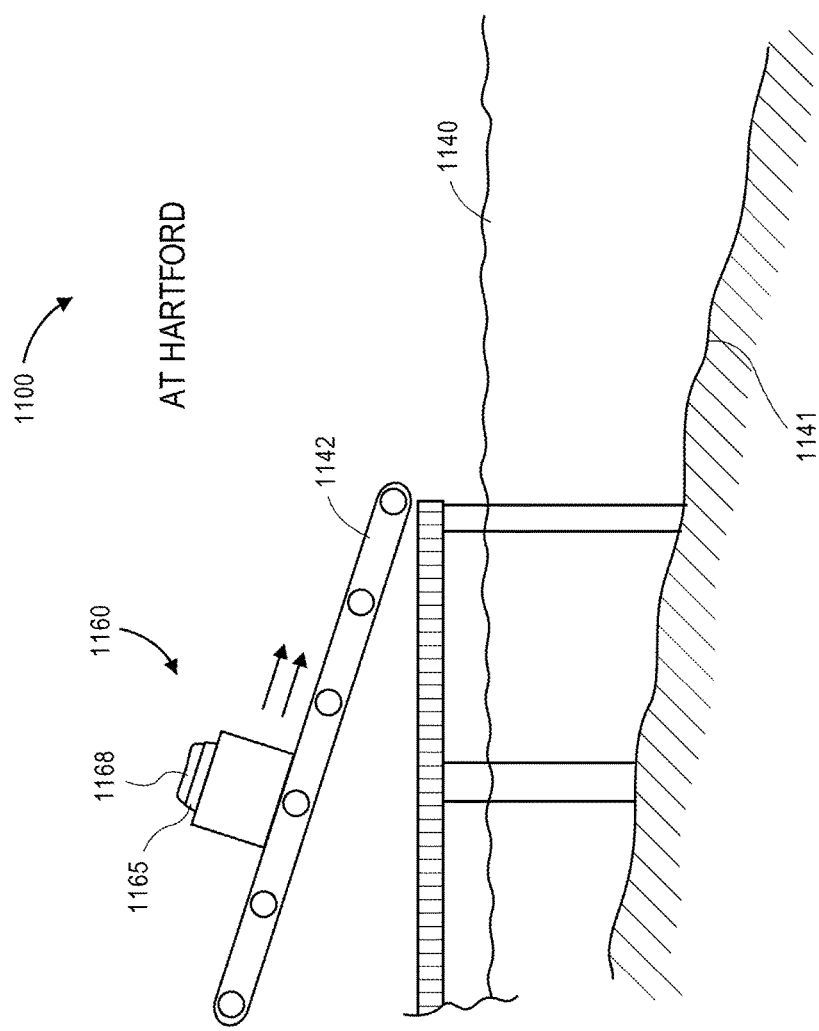
Figure 11C:
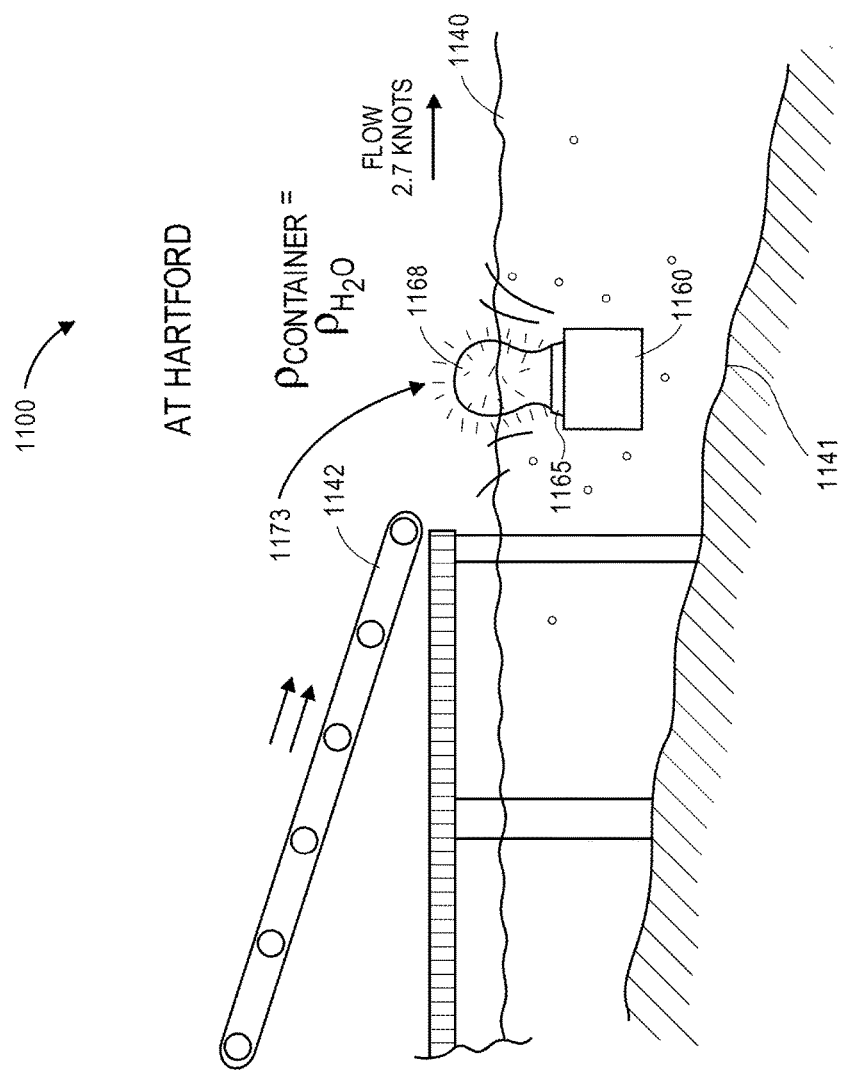

As is shown in FIG. 11B, the ingress unit 1142 may include one or more conveyors or other machines that may deposit an item 1160 bearing a depth control device 1165 into the natural storage pool 1140. Alternatively, the ingress unit 1142 may include docks, ports or other fixed or floating stations from which one or more humans, vehicles or other machines may deposit items into the natural storage pool 1140. As is shown in FIG. 11C, once the item 1160 has been deposited into the natural storage pool 1140, the depth control device 1165 may manipulate a net density of the item 1160 to match a density of the water in the natural storage pool 1140, or such that $\rho_{CONTAINER} = \rho_{H2O}$, e.g., by pressurizing and inflating an expansion volume 1168 to a determined volume $V_C$, thereby causing the item 1160 to float within the natural storage pool 1140. Alternatively, the depth control device 1165 may include one or more onboard tanks that may take on water from the natural storage pool 1140, or pump, drain or blow water to the natural storage pool 1140, as necessary, in order to cause the net density of the item 1160 to match the density of the water in the natural storage pool 1140. The presence of natural currents within the natural storage pool 1140 causes the floating item 1160 to depart from the ingress unit 1142, at a predictable or measurable speed. Additionally, the depth control cartridge 1165 may further illuminate a light 1173 or another beacon to inform boaters, swimmers or others within the natural storage pool 1140 that the item 1160 is floating therein.

Figure 11D:
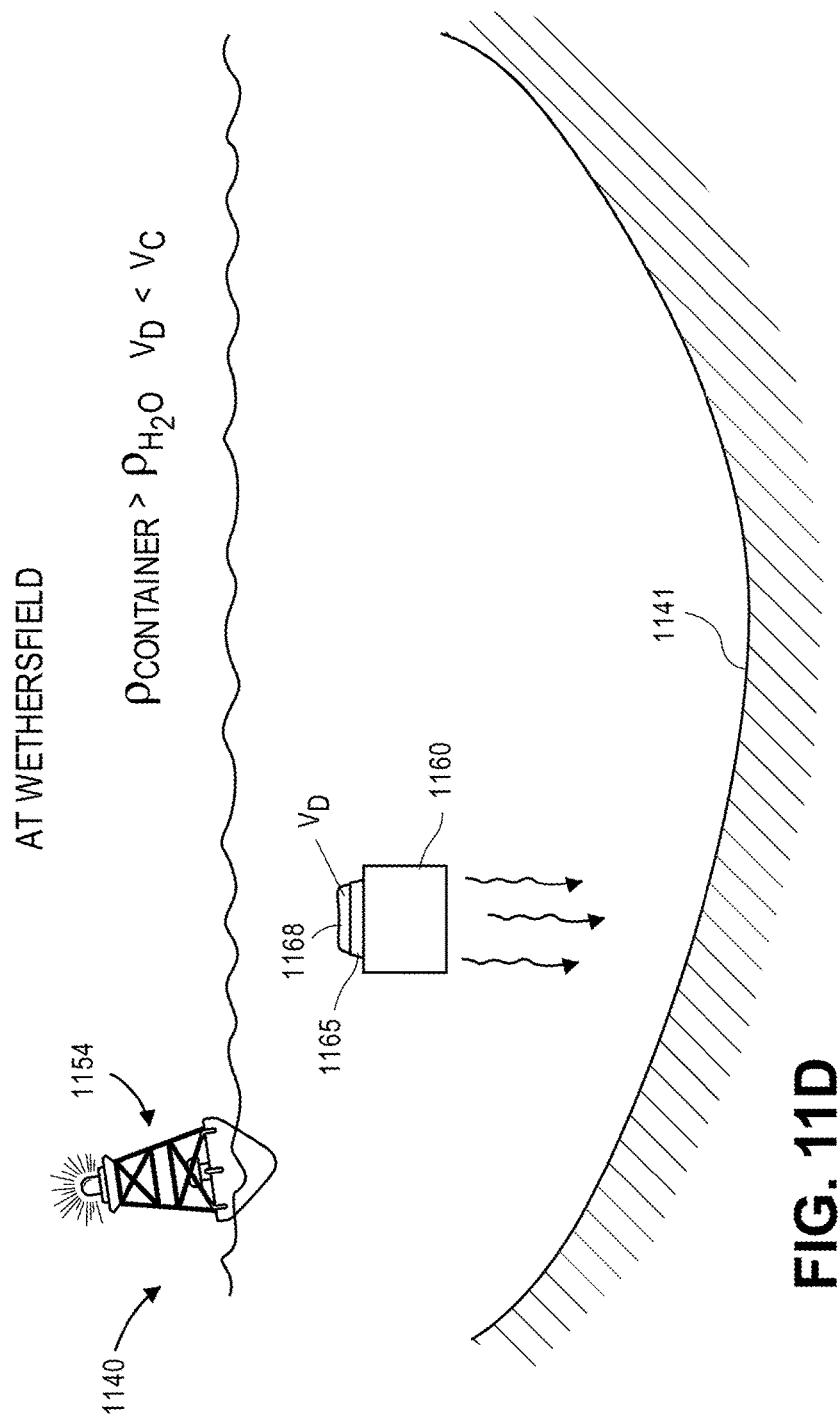

As is shown in FIG. 11D, once the item 1160 reaches the intervening point 1145, or any other point between the ingress unit 1142 and the egress unit 1144, the depth control device may further manipulate a net density of the item 1160 to exceed the density of water, or $\rho_{CONTAINER} > \rho_{H2O}$, thereby causing the item 1160 to descend to a bottom 1141 of the aquatic storage facility 1140. For example, the depth control device 1165 may completely or partially depressurize and contract the expansion volume 1168 to a volume $V_D$ that is less than the volume $V_C$ of the expansion volume 1168 as is shown in FIG. 11C. Alternatively, the depth control device 1165 may take on water from the natural storage pool 1140, e.g., into one or more onboard tanks, and cause the item 1160 to sink to the bottom 1141 at or near the intervening point 1145.

Figure 11F:
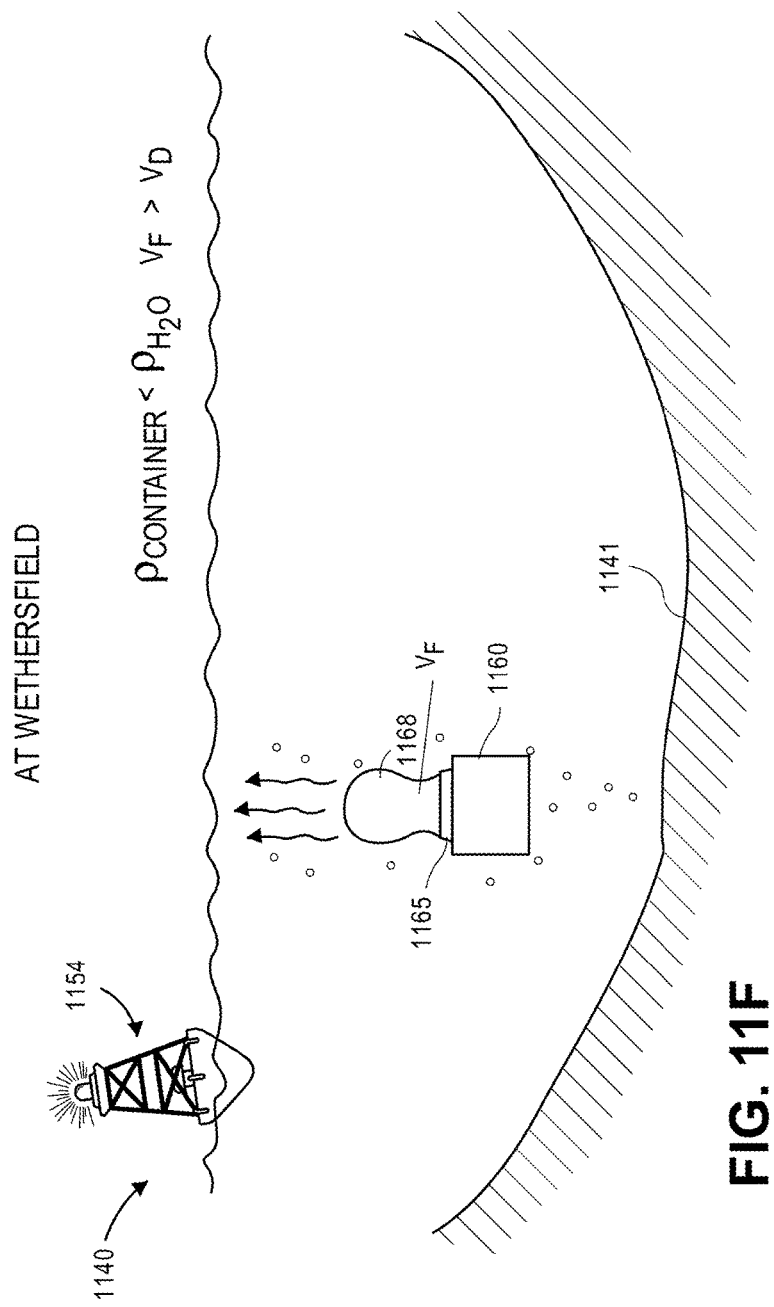
Figure 11G:
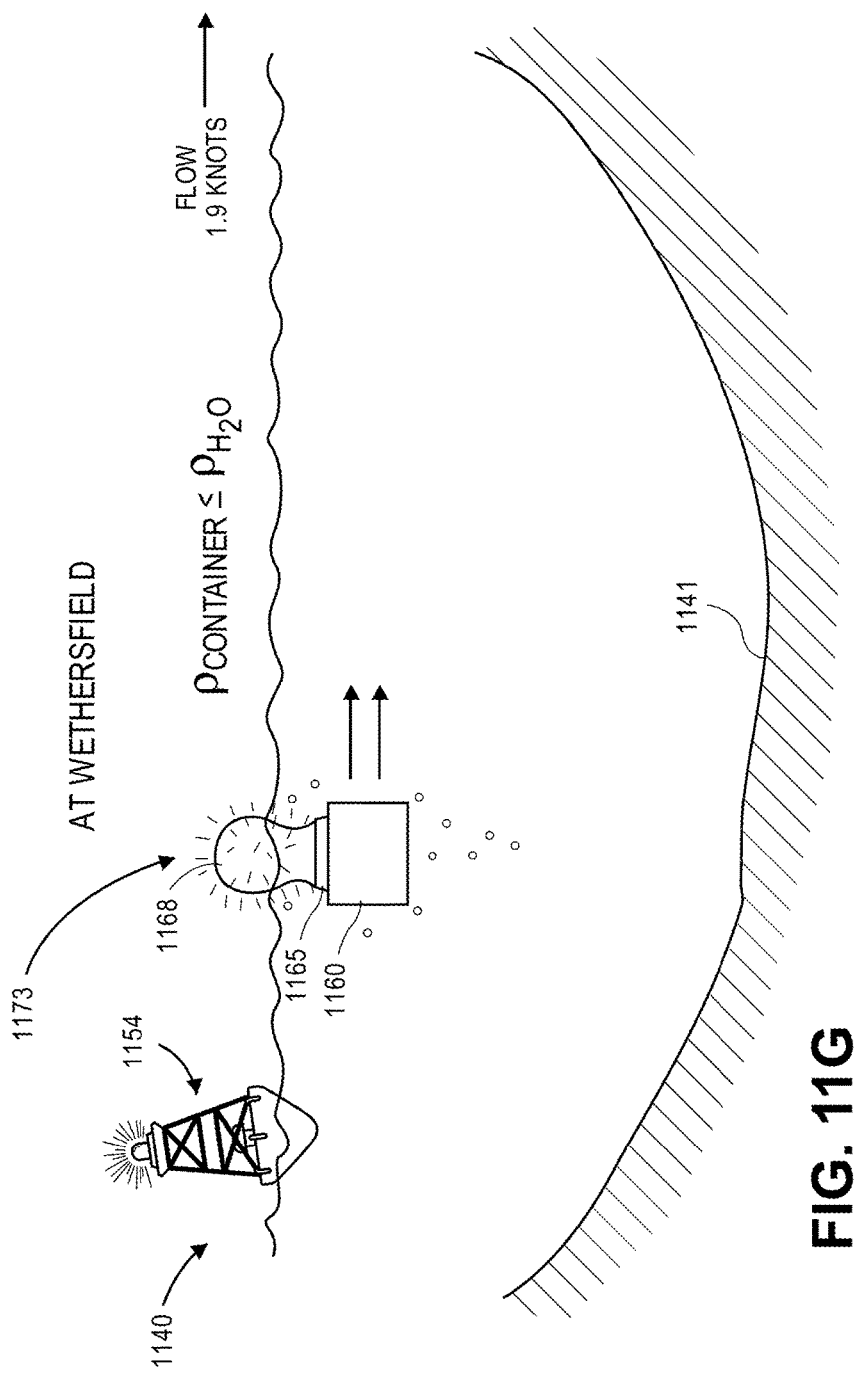

As is shown in FIG. 11E, when the item 1160 is resting on the bottom 1141 of the natural storage pool 1140, one or more acoustic signals may be emitted into the natural storage pool 1140, e.g., by an active sonar buoy 1154 or another vessel floating within the natural storage pool 1140. The acoustic signals may include one or more instructions for the item 1160, as well as any checksums or acoustic identifiers of the item 1160. The active sonar buoy 1154 may be in communication with one or more external computer devices (not shown), e.g., over a network. As is shown in FIG. 11F, in response to the acoustic signal received from the active sonar buoy 1154, the depth control device 1165 may manipulate a net density of the item 1160 to fall below the density of water, or $\rho_{CONTAINER} < \rho_{H2O}$, thereby causing the item 1160 to ascend from the bottom 1141 to a surface of the water. For example, the depth control device 1160 may pressurize and inflate the expansion volume to a determined volume $V_F$ that is greater than the volume $V_D$ of the expansion volume as is shown in FIG. 11D. Alternatively, the depth control device 1165 may pump, drain or blow water from one or more onboard tanks, thereby causing the item 1160 to rise from the bottom 1141 to a surface of the water. As is shown in FIG. 11G, once the item 1160 has neared or reached the surface of the water, the presence of natural currents within the natural storage pool 1140 causes the floating item 1160 to depart from the intervening point 1145, at a predictable or measurable speed. The light 1173 may be illuminated when the item 1160 approaches or reaches the surface, as well.

Figure 11H:
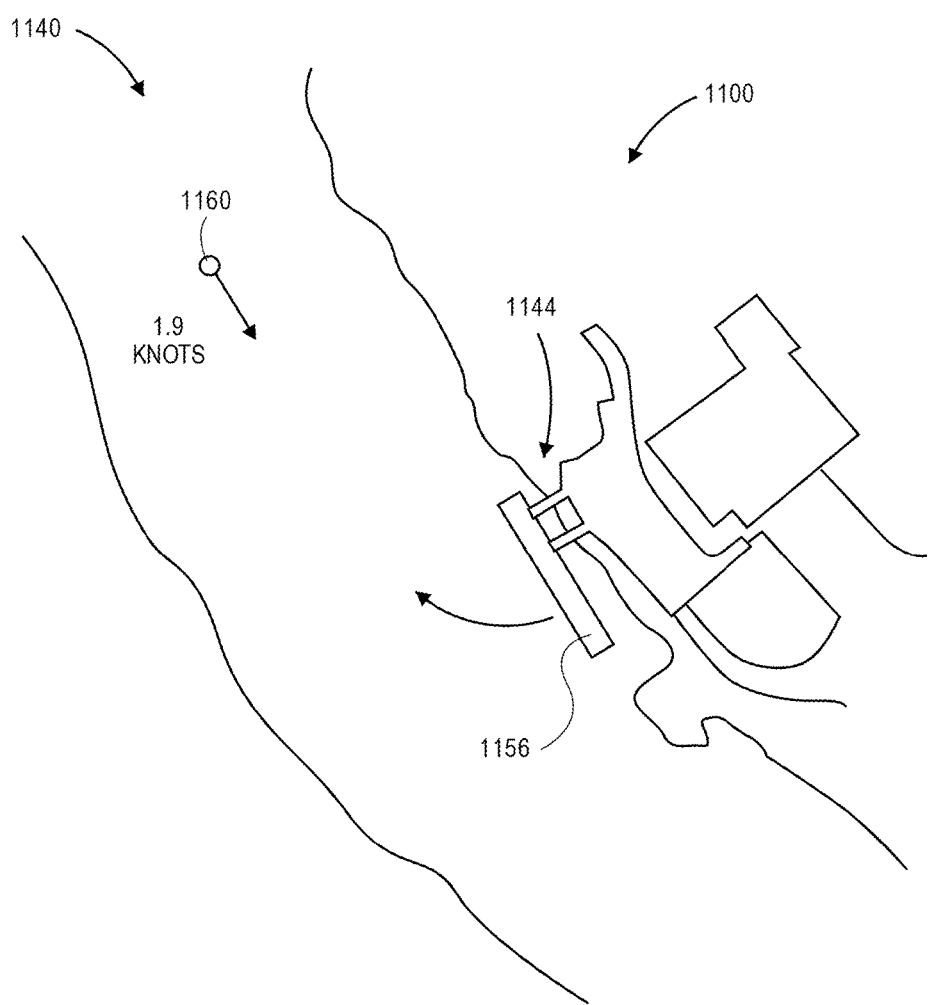
Figure 11I:
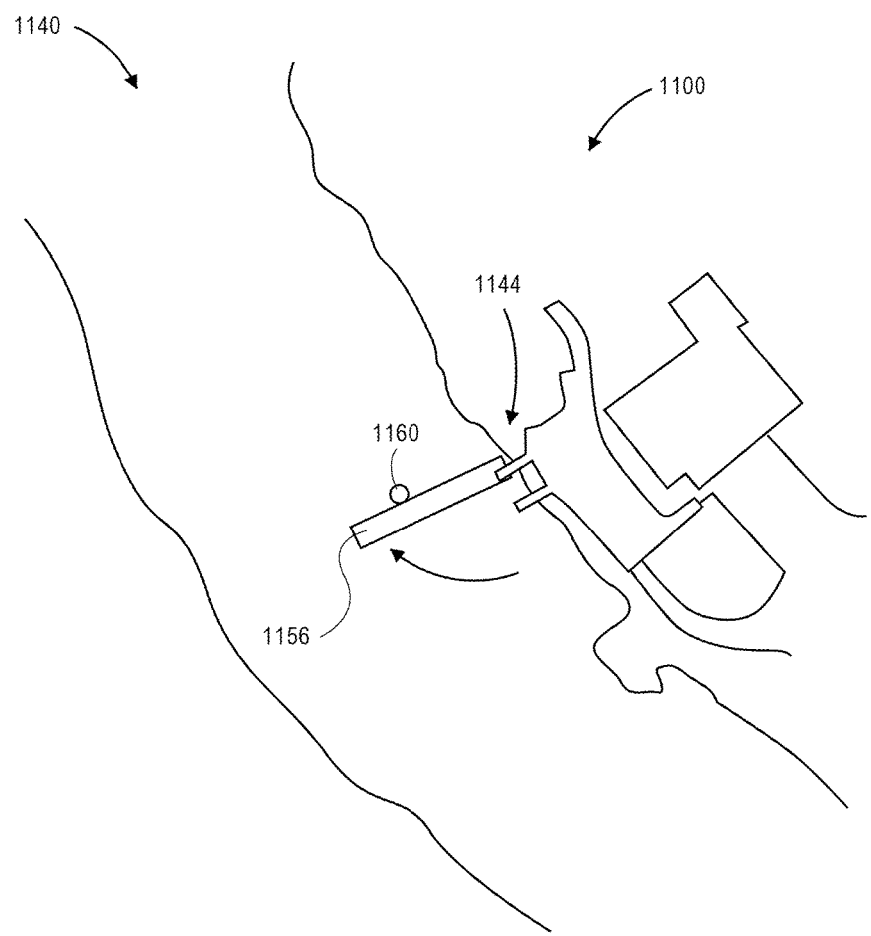

As is shown in FIG. 11H, natural current flows at the intervening point 1145 cause the item 1160 to approach the egress unit 1144, which may include one or more diverts 1156 or other mechanisms to retrieve items, viz., the item 1160, from the natural storage pool 1140. As is shown in FIG. 11I, the divert 1156 may swing from an original position, e.g., parallel to a direction of flow within the natural storage pool 1140, to a retrieving position, e.g., perpendicular to the direction of flow within the natural storage pool 1140, and may automatically retrieve the item 1160 from the natural storage pool 1140. Alternatively, the divert 1156 may include one or more docks or other transportation surfaces upon which a human or machine may travel to meet the item 1160 when the item 1160 comes into contact with the divert 1156.

As is discussed above, the depth control devices of the present disclosure may have any shape, and may be sized based on the mass and/or volume of the items to which such devices are to be affixed. Moreover, where an item is substantially lighter than water or another liquid provided in an aquatic storage facility, a depth control device affixed thereto may rely exclusively on changing a mass of water or another liquid within one or more onboard tanks to manipulate a depth of the item within an aquatic storage facility. Referring to FIGS. 12A through 12C, pictorial diagrams illustrating aspects of one embodiment of an aquatic storage facility in accordance with the present disclosure are shown. Except where otherwise noted, reference numerals preceded by the number "12" shown in FIGS. 12A, 12B and 12C indicate components or features that are similar to components or features having reference numerals preceded by the number "11" shown in FIGS. 11A through 11I, by the number "10" shown in FIGS. 10A through 10F, by the number "9" shown in FIGS. 9A through 9F, by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

As is shown in FIG. 12A, an item 1260 (viz., a packaged, collared shirt) includes a depth control device 1265 affixed thereto. The depth control device 1265 is substantially disc-shaped and includes a ballast tank 1277 disposed therein that is coupled to a perimeter of the depth control device 1265 by a plurality of control valves 1278 having openings disposed about the perimeter.

As is shown in FIG. 12B, the item 1260 may be deposited into a liquid within a storage pool 1240, e.g., by tossing, dumping or dropping the item 1260 therein. With the ballast tank 1277 empty, and the mass within the ballast tank 1277 being substantially nil, or $m_{TANK} = \rho_{AIR} \cdot V_{TANK}$, the item 1260 floats atop a surface of the storage pool 1240. As is shown in FIG. 12C, however, when one or more of the control valves 1278 is opened, thereby enabling the ballast tank 1277 to be filled with water, or $m_{TANK} = \rho_{H2O} \cdot V_{TANK}$, the item 1260 descends until the item 1260 rests on the bottom 1241 of the storage pool 1240.

Figure 13A:
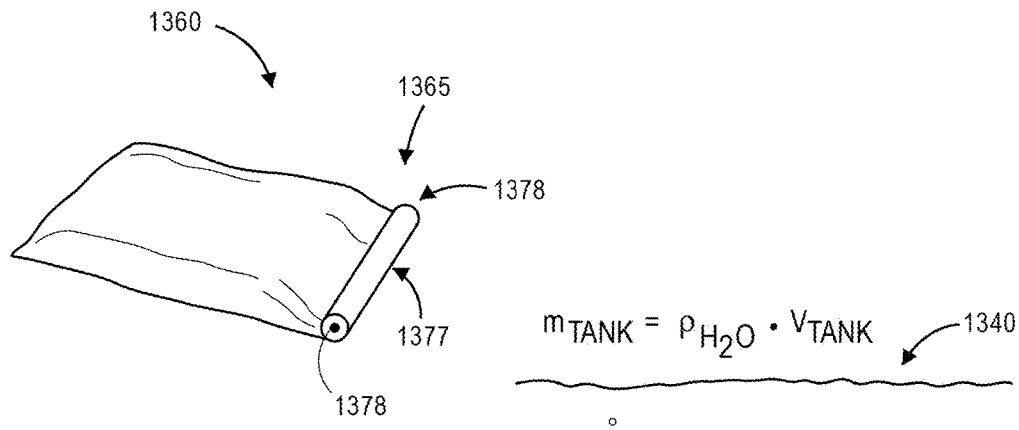
FIGS. 13A through 13C are pictorial diagrams illustrating aspects of one embodiment of an aquatic storage facility in accordance with the present disclosure.
Figure 13B:
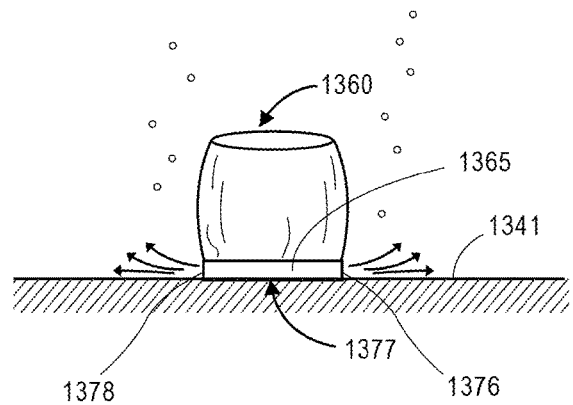
Figure 13C:
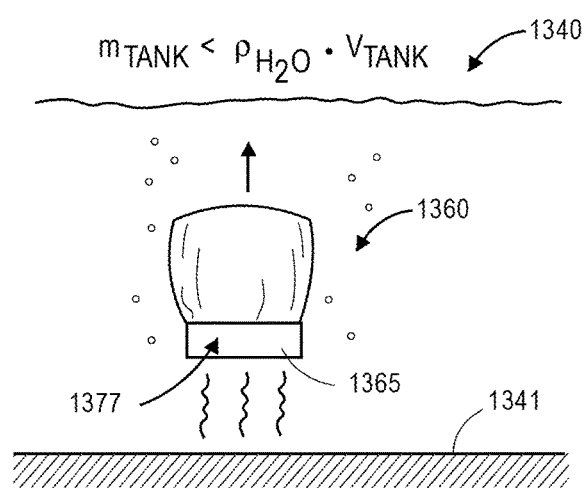

A depth control device may be selectively affixed to an item in a specific location, in order to ensure that the item maintains a desired orientation within an aquatic storage facility when the item is partially or entirely submerged. Referring to FIGS. 13A, 13B and 13C, pictorial diagrams illustrating aspects of one embodiment of an aquatic storage facility in accordance with the present disclosure are shown. Except where otherwise noted, reference numerals preceded by the number "13" shown in FIGS. 13A, 13B and 13C indicate components or features that are similar to components or features having reference numerals preceded by the number "12" shown in FIGS. 12A, 12B and 12C, by the number "11" shown in FIGS. 11A through 11I, by the number "10" shown in FIGS. 10A through 10F, by the number "9" shown in FIGS. 9A through 9F, by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

As is shown in FIG. 13A, an item 1360 (viz., a pillow) includes a depth control device 1365 joined to an end thereof. The depth control device 1365 is substantially cylindrical and includes a ballast tank 1377 disposed therein, and a pair of control valves 1378 on either end of the depth control device 1365. As is shown in FIG. 13B, because the item 1360 is significantly lighter than water, the item 1360 remains vertically oriented when resting on a bottom 1341 as the ballast tank 1377 is filled with water, or when the mass within the ballast tank 1377 is $m_{TANK}=\rho_{H2O} \cdot V_{TANK}$. As is shown in FIG. 13C, when the item 1360 is desired, some or all of the water within the ballast tank 1377 may be pumped, drained or blown therefrom, e.g., in response to an acoustic signal from a transducer (not shown), in accordance with a schedule, or for any other reason.

Items to be stored in an aquatic storage facility may be outfitted with two or more depth control devices. Particularly where the items to be stored are irregularly or eccentrically shaped, the items may be outfitted with depth control devices on opposing sides or faces thereof, and the depth control devices may be configured to operate in different manners, as necessary. Referring to FIGS. 14A through 14G, pictorial diagrams illustrating aspects of one embodiment of an aquatic storage facility in accordance with the present disclosure are shown. Except where otherwise noted, reference numerals preceded by the number "14" shown in FIGS. 14A through 14G indicate components or features that are similar to components or features having reference numerals preceded by the number "13" shown in FIGS. 13A, 13B and 13C, by the number "12" shown in FIGS. 12A, 12B and 12C, by the number "11" shown in FIGS. 11A through 11I, by the number "10" shown in FIGS. 10A through 10F, by the number "9" shown in FIGS. 9A through 9F, by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

As is shown in FIG. 14A, an item 1460 (viz., a dog bowl) includes a plurality of depth control devices 1465-1, 1465-2, 1465-3 affixed thereto. A first depth control device 1465-1 is affixed in a concave upper opening of the item 1460, while a second depth control device 1465-2 and a third depth control device 1465-3 are affixed to convex undersides of the item 1460. As is shown in FIG. 14B, the first depth control device 1465-1 includes a bladder 1468-1 that may be expanded by pressurized air or another fluid (not shown). As is shown in FIG. 14C, the second depth control device 1465-2 and the third depth control device 1465-3 are provided at radially opposite points on the convex undersides of the item 1460. The second depth control device 1465-2 includes a ballast tank 1477-2 in a canister-like structure having a pair of control valves 1478-2A, 1478-2B with openings provided on opposite ends. The third depth control device 1465-3 includes a ballast tank 1477-3 in a canister-like structure having a pair of control valves 1478-3A, 1478-3B with openings provided on opposite ends.

As is discussed above, depth control devices of the present disclosure, including but not limited to the depth control devices 1465-1, 1465-2, 1465-3 shown in FIGS. 14A, 14B, and 14C, may be operated independently or in concert to vary a depth or a height of an item to which the depth control devices are affixed within a body of liquid. As is shown in FIG. 14D, the item 1460 may be deposited into a storage pool 1440 of water or another aquatic storage facility by a worker 1442 or other ingress unit. As is shown in FIG. 14E, where a net density of the item 1440 is less than a density of water, or where $\rho_{TOTAL}$, which is equal to a ratio of a sum of the masses of the item 1460, the contents of the ballast tanks 1477-2, 1477-3 and the contents of the expansion volume 1468-1 (or $m_{ITEM}+m_{TANK}+m_{EXP}$) to a sum of the volumes of the item 1460, the ballast tanks 1477-2, 1477-3 and the expansion volume 1468-1 (or $V_{ITEM}+V_{TANK}+V_{EXP}$), is less than the density of water, or $\rho_{H2O}$, the item 1460 will float on the surface of the water.

As is shown in FIG. 14F, the net density of the item, or $\rho_{TOTAL}$, may be increased by increasing an amount of water in the ballast tanks 1477-2, 1477-3, or $m_{TANK}$. If a sufficiently large mass of water is ingested into the ballast tanks 1477-2, 1477-3, the item 1460 will descend toward a bottom 1441 of the storage pool 1440. As is shown in FIG. 14G, the net density of the item, or $\rho_{TOTAL}$, may be decreased by increasing a volume of the expansion volume 1468-1, or $V_{EXP}$, such as by pressurizing the expansion volume 1468-1 with air or another lightweight fluid. If the expansion volume 1468-1 is pressurized to a sufficiently large volume, then the item 1460 will lift from the bottom 1441 of the storage pool 1440 and begin to rise.

Figure 15:
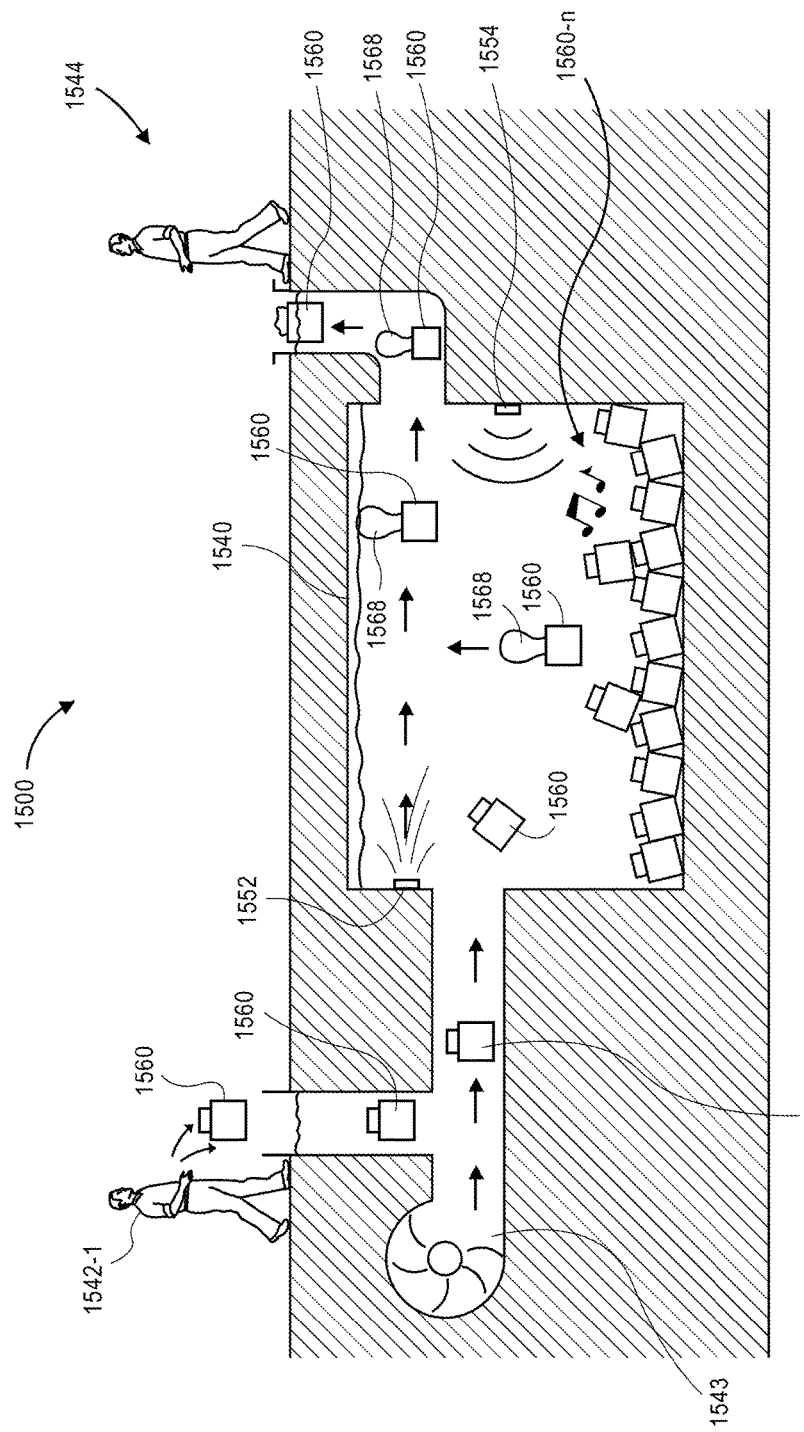
FIG. 15 is a pictorial diagram illustrating aspects of one embodiment of an aquatic storage facility in accordance with the present disclosure.

As is discussed above, the aquatic storage facilities may be incorporated into existing fluid systems that are open or closed in nature. The ingress units and the egress units of the aquatic storage facilities may include any number of pumps or pipes of any length, diameter, shape or rating. Referring to FIG. 15, a pictorial diagram illustrating aspects of one embodiment of an aquatic storage facility in accordance with the present disclosure is shown. Except where otherwise noted, reference numerals preceded by the number "15" shown in FIG. 15 indicate components or features that are similar to components or features having reference numerals preceded by the number "14" shown in FIGS. 14A through 14G, by the number "13" shown in FIGS. 13A, 13B and 13C, by the number "12" shown in FIGS. 12A, 12B and 12C, by the number "11" shown in FIGS. 11A through 11I, by the number "10" shown in FIGS. 10A through 10F, by the number "9" shown in FIGS. 9A through 9F, by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

As is shown in FIG. 15, a system 1500 includes a storage tank 1540 filled with water or another liquid and having a plurality of items 1560-$n$ resting on a bottom surface thereof. The storage tank 1540 has an ingress unit 1542, a pump 1543, an egress unit 1544, a flow source 1552 and a transducer 1554. The ingress unit 1542 comprises one or more chutes or other substantially vertical sections and a series of pipes or other substantially horizontal sections for inserting items 1560 into the storage tank 1540 from above. The pump 1543 is aligned to mechanically provide flow to the ingress unit 1542, and cause items inserted therein to enter the storage tank 1540. For example, the density of the items 1560 may be manipulated to cause the items 1560 to descend down the chute and into the pipes, and the pump 1543 may urge the items 1560 into the storage tank 1540.

Additionally, the flow source 1552 may provide flow to generate a current in a direction of the egress unit 1544, which may also include substantially horizontal sections (e.g., pipes) and substantially vertical sections (e.g., chutes) enabling items 1560 within the storage tank 1540 to be accessed by one or more workers. For example, as is shown in FIG. 15, in response to one or more acoustic signals emitted or radiated into the liquid by the transducer 1554, one or more of the items 1560-$n$ may inject pressurized air into a bladder 1568, thereby causing the bladder 1568 to expand in volume, and causing the item 1560 to rise within the storage tank 1540. Alternatively, one or more of the items 1560-$n$ may pump, drain or blow liquid from an onboard ballast tank, thereby reducing a mass of the item 1560, and causing the item 1560 to rise within the storage tank 1540. Once the items 1560 reach an approximate depth or height of the flow source 1552, the items 1560 may be urged toward the pipes of the egress unit 1544, where the items 1560 may be further configured to manipulate their respective densities and to rise within the chutes, so that the items 1560 may be retrieved by one or more workers. Alternatively, the egress unit 1544 may also include one or more pumps (not shown) that may be used to generate flow in a direction of the egress unit 1544, e.g., to act as a flow source, or to cause the items to enter the pipes of the egress unit 1544 and rise within the chutes of the egress unit 1544.

In some embodiments, the pipes of the ingress unit 1542 and the egress unit 1544, and the pump 1543, may be independent components that are separately associated with the storage tank 1540 and used for the express purposes of causing items to enter the storage tank 1540, or causing items to exit the storage tank 1540. In other embodiments, however, the pipes of the ingress unit 1542 and/or the egress unit 1544, or the pump 1543, may be utilized by one or more other fluid systems, including but not limited to public utility systems (e.g., water supplies), natural resource systems (e.g., oil supplies) or the like.

Figure 16A:
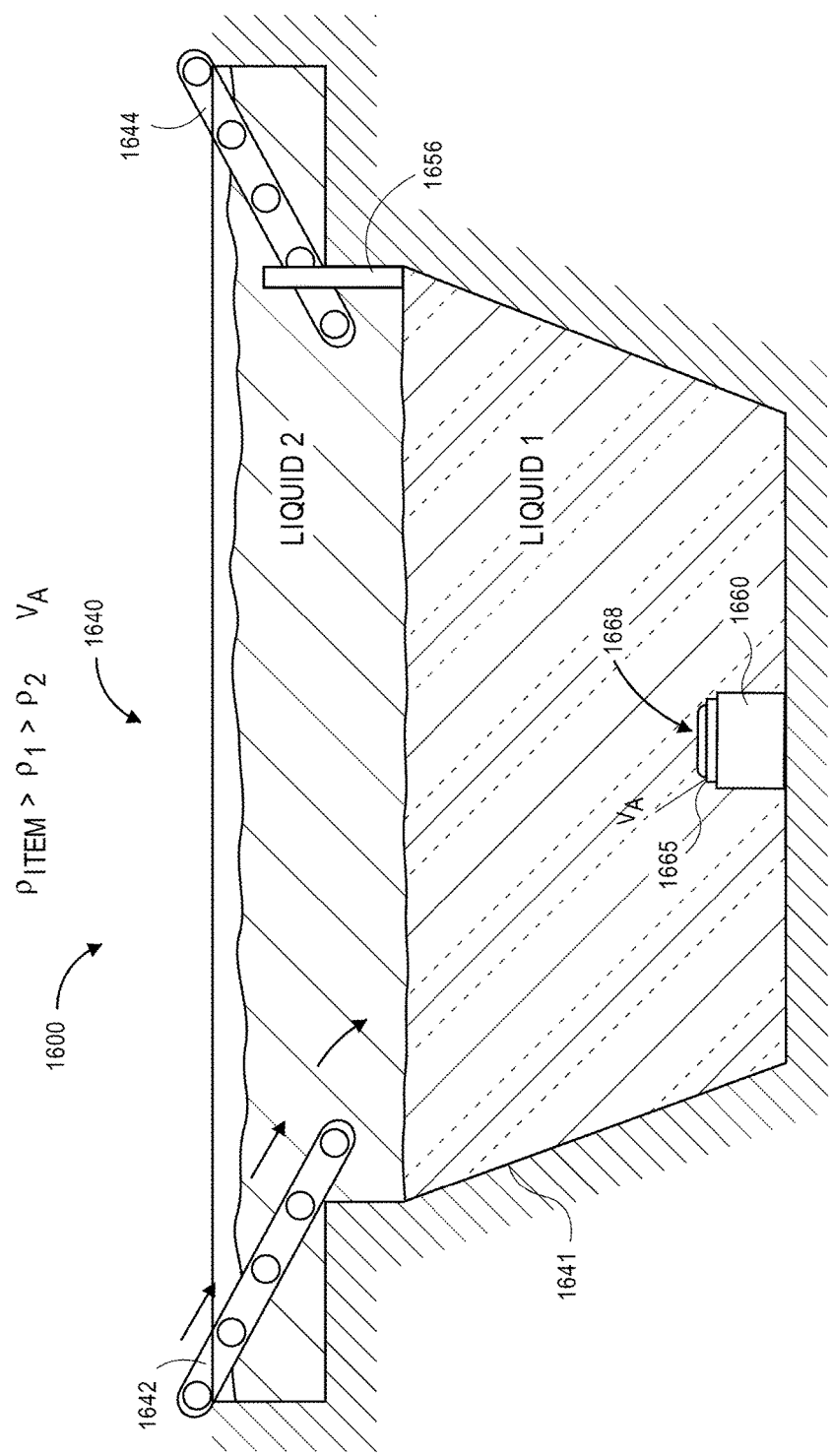
FIGS. 16A, 16B and 16C are pictorial diagrams illustrating aspects of one embodiment of an aquatic storage facility in accordance with the present disclosure.
Figure 16B:
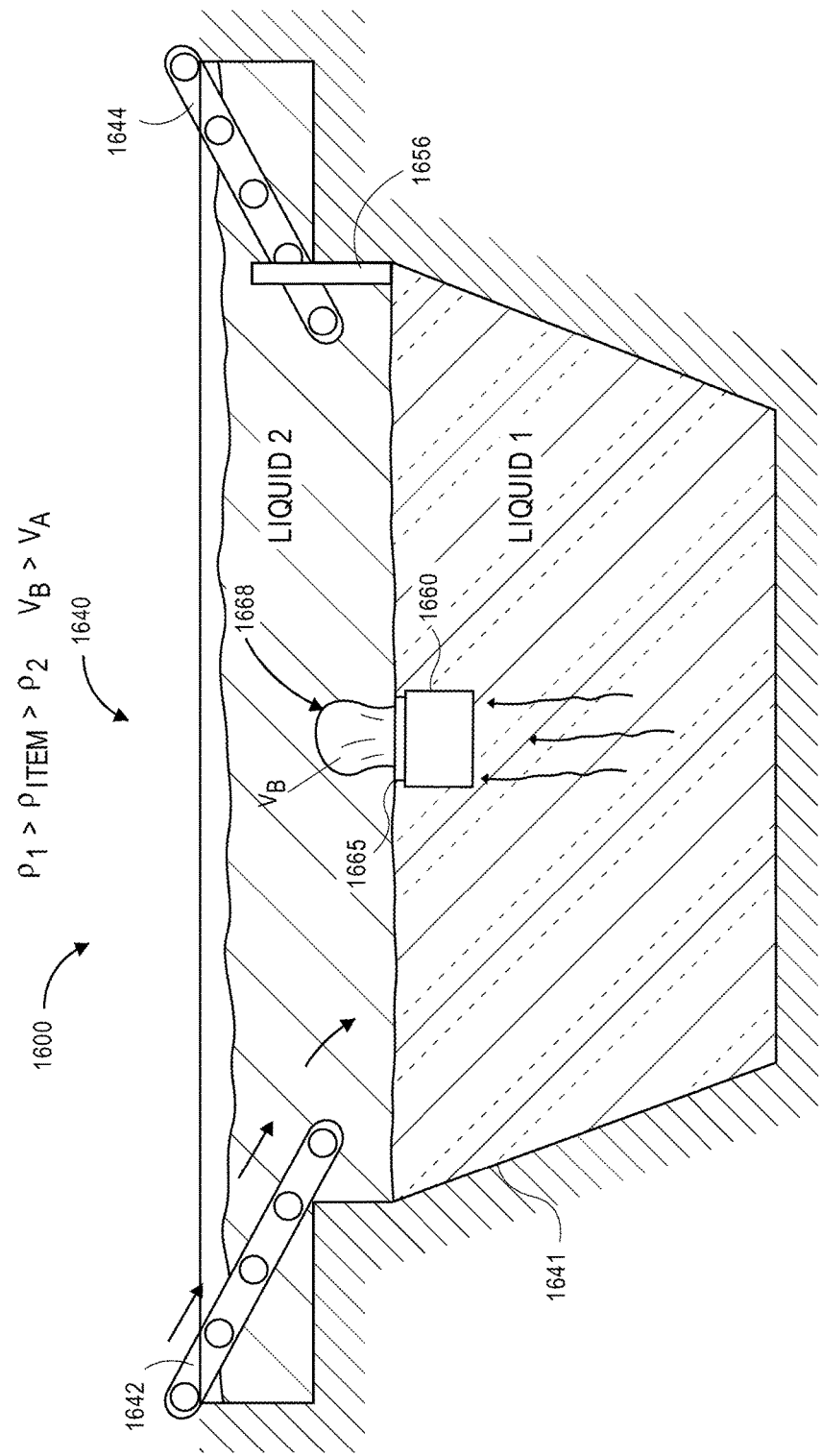
Figure 16C:
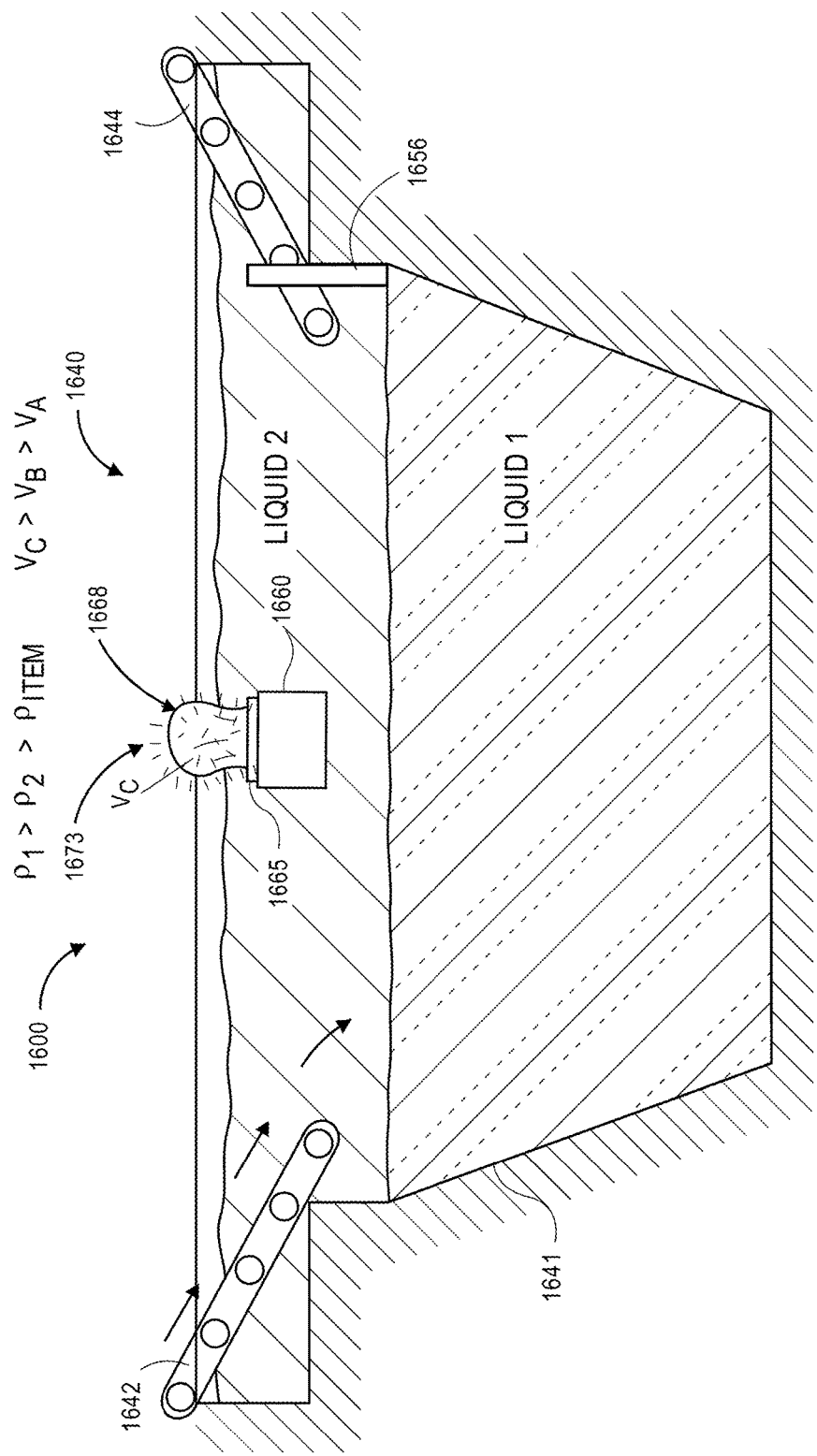

An aquatic storage facility may include two or more fluids, which may be miscible or immiscible in nature, and may form layers within the aquatic storage facility accordingly. Referring to FIGS. 16A, 16B and 16C, pictorial diagrams illustrating aspects of one embodiment of an aquatic storage facility in accordance with the present disclosure are shown. Except where otherwise noted, reference numerals preceded by the number "16" shown in FIG. 16A, 16B or 16C indicate components or features that are similar to components or features having reference numerals preceded by the number "15" shown in FIG. 15, by the number "14" shown in FIGS. 14A through 14G, by the number "13" shown in FIGS. 13A, 13B and 13C, by the number "12" shown in FIGS. 12A, 12B and 12C, by the number "11" shown in FIGS. 11A through 11I, by the number "10" shown in FIGS. 10A through 10F, by the number "9" shown in FIGS. 9A through 9F, by the number "7" shown in FIGS. 7A, 7B and 7C, by the number "6" shown in FIGS. 6A through 6H, by the number "4" shown in FIG. 4A or FIG. 4B, by the number "2" shown in FIG. 2A or FIG. 2B, by the number "1" shown in FIGS. 1A through 1M.

As is shown in FIG. 16A, a system 1600 includes a storage pool 1640 having a frame 1641, an ingress unit 1642 (e.g., a conveyor), an egress unit 1644 (e.g., a conveyor), and a pivotable diverter arm 1656 aligned adjacent to the egress unit 1644 that is configured to swing or pivot outwardly from one sidewall of the frame 1641 and to guide items toward the egress unit 1644. The storage pool 1640 includes a pair of liquids, viz., Liquid 1 and Liquid 2, disposed therein. An item 1660 having a depth control device 1665 with a bladder 1668 rests on a bottom of the frame 1641. The bladder 1668 is expanded to a volume $V_A$. The Liquid 1 and the Liquid 2 have different densities $\rho_1$, $\rho_2$ and are substantially immiscible, such that Liquid 2 (e.g., a lighter liquid) forms a layer atop Liquid 1 (a heavier liquid). For example, in some embodiments, Liquid 1 may be pure water, seawater or any other substantially aqueous liquid or mixture, while Liquid 2 may be kerosene, isopropyl alcohol, or any other liquid having a density that is less than a density of Liquid 1. Additionally, with the bladder 1668 expanded to the volume $V_A$, as is shown in FIG. 16A, a net density of the item 1660, or $\rho_{ITEM}$, is greater than the density of Liquid 1, or $\rho_1$, which is greater than the density of Liquid 2, or $\rho_2$.

As is shown in FIG. 16B, the bladder 1668 may be expanded from the volume $V_A$ to a volume $V_B$ that may be selected in order to cause the item 1660 to reach an interface between the Liquid 1 and the Liquid 2. Thus, as is shown in FIG. 16B, after the bladder 1668 is expanded to the volume $V_B$, the net density of the item 1660, or $\rho_{ITEM}$, is less than the density of Liquid 1, or $\rho_1$, but greater than the density of Liquid 2, or $\rho_2$. Due to the difference in densities between the item and both Liquid 1 and Liquid 2, the item 1660 will remain in a substantially constant vertical depth or height at or near the interface between the Liquid 1 and the Liquid 2.

As is shown in FIG. 16C, the bladder 1668 may be further expanded from the volume $V_B$ to a volume $V_C$ that may be selected in order to cause the item 1660 to rise to a surface of the Liquid 1. Thus, as is shown in FIG. 16C, after the bladder 1668 is expanded to the volume $V_C$, the net density of the item 1660, or $\rho_{ITEM}$, is less than the density of Liquid 1, or $\rho_1$, which is less than the density of Liquid 2, or $\rho_2$. Once the item 1660 has approached or broached the surface of Liquid 1, a light 1673 may be illuminated, thereby aiding in the location and retrieval of the item 1660 from the storage pool 1640.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of man-made storage pools or other aquatic facilities in association with a fulfillment center, the systems and methods disclosed herein are not so limited, and may be utilized in connection with any system for storing items, for any reason, including systems featuring natural and/or artificial bodies of water or other liquids.

Although some of the embodiments described herein describe specific systems or methods for transporting objects, or for controlling or changing the positions or velocities of such objects, the systems and methods of the present disclosure are not so limited, and may be used with any process or method for manipulating a density of an object within a medium. Additionally, such process or methods may be used in series or in parallel, and independently or in conjunction with one another, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 8, the orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale, particularly regarding the relative locations of aspects or elements of the network delivery systems disclosed herein to one another in vertical and/or horizontal space.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount. As another example, in certain embodiments, the terms "nearly vertical" or "nearly horizontal" may refer to a value, amount, or characteristic that departs from exactly vertical or exactly horizontal by not more than 15°, 10°, 5°, 3°, 1°, 0.1° or otherwise.

Although the invention has been described and illustrated with respect to illustrative embodiments thereof, the foregoing and various other additions and omissions may be made therein and thereto without departing from the spirit and scope of the present disclosure.

What is claimed is:

1. A depth control device comprising:
    a frame;
    a flexible bladder mounted in association with the frame, wherein the flexible bladder defines an expansion section having a variable interior volume;
    a source of pressurized air;
    a first control valve aligned in series between the source of pressurized air and an interior of the expansion section of the flexible bladder;
    a communications device disposed within the frame;
    a depth sensor disposed within the frame; and
    at least one computer processor disposed within the frame, wherein the at least one computer processor is in communication with the first control valve and the communications device, and
    wherein at least one external surface of the frame comprises a mounting mechanism for enabling attachment to an inventory item.

2. The depth control device of claim 1, further comprising:
    a ballast tank mounted in association with the frame, wherein the ballast tank has a fixed interior volume; and
    a second control valve aligned in series between the exterior of the frame and an interior of the ballast tank.

3. The depth control device of claim 2, wherein the at least one computer processor is configured to at least:
    receive a control signal by the communications device, wherein the control signal comprises information regarding a desired depth for the inventory item within a body of water;
    in response to receiving the control signal,
        determine, by the depth sensor, an actual depth of the inventory item within the body of water;
        select at least one of a change in a net volume of the inventory item or a change in a net mass of the inventory item based at least in part on the actual depth of the inventory item and the desired depth for the inventory item; and
        operate at least one of the first control valve or the second control valve to cause at least one of the change in the net mass of the inventory item or the change in the net volume of the inventory item.

4. The depth control device of claim 3, further comprising a light and a position sensor,
    wherein the desired depth is a surface of the body of water, and
    wherein the at least one computer processor is configured to at least:
        determine that the inventory item is at or near the surface of the body of water by the depth sensor; and
        in response to determining that the inventory item is at or near the surface of the body of water,
            activate the light;
            determine a surface position of the inventory item by the position sensor; and transmit at least one signal comprising the surface position of the inventory item by the communications device.

5. A method comprising:
receiving at least a first signal by a depth control device associated with an item at a first time, wherein the item has a first net density at the first time, wherein the item is provided at a first depth in a liquid at the first time, and wherein the first signal comprises data regarding a second depth in the liquid;
selecting a second net density for the item by the depth control device, wherein the second net density is selected based at least in part on at least one of the first depth, the second depth or a first density of the liquid at the first depth, and wherein the second net density is not equal to the first density of the liquid; and
in response to receiving at least the first signal,
causing the item to have the second net density at a second time by the depth control device.

6. The method of claim 5, wherein the depth control device further comprises at least one of:
a flexible bladder having a first control valve provided in series with a compressed air source, wherein the first control valve is configured to enable a flow of air between an interior of the flexible bladder and the compressed air source; or
a ballast tank having a second control valve provided in series with an exterior of the depth control device, wherein the second control valve is configured to enable a flow of liquid between an interior of the ballast tank and the exterior of the depth control device.

7. The method of claim 6, wherein the first net density is a quotient of a first net mass of the item at the first time divided by a first net volume of the item, and
wherein the second net density is a quotient of a second net mass of the second item at the second time divided by a second net volume of the item.

8. The method of claim 6, wherein causing the item to have the second net density comprises:
determining at least one of a volume of air or a pressure of air associated with the second net volume of the item; and
operating the first control valve at the second time to cause the interior of the flexible bladder to have the at least one of the volume of air or the pressure of air therein.

9. The method of claim 6, wherein causing the item to have the second net density comprises:
determining a difference between the first net mass and the second net mass by the depth control device;
determining at least one of a mass of the liquid or a volume of the liquid associated with the difference; and
operating the second control valve at the second time to cause the interior of the ballast tank to receive or discharge the at least one of the mass of the liquid or the volume of the liquid associated with the difference.

10. The method of claim 5, further comprising:
determining, by the depth control device, that the item is at approximately the second depth in the liquid at a third time;
selecting a third net density for the item by the depth control device, wherein the third net density is approximately equal to a second density of the liquid at the second depth; and
causing the item to have the third net density by the depth control device at a third time.

11. The method of claim 5, wherein the first net density equals or exceeds the first density of the liquid,
wherein the second depth is a surface of the liquid, and
wherein the second net density is less than the first density of the liquid.

12. The method of claim 5, wherein the liquid has the first density at the first depth and a second density at the second depth, and
wherein the second net density is selected based at least in part on the second density at the second depth.

13. The method of claim 5, further comprising:
prior to the first time, selecting the first net density for the item, wherein the first net density is selected based at least in part on the first depth and the first density of the liquid at the first depth; and
causing the item to have the first net density at the first time by the depth control device.

14. The method of claim 5, further comprising:
prior to the first time, selecting a first surface position of a body of the liquid for the item; and
prior to the first time, causing at least the item to be deposited into the body of the liquid at the first surface position.

15. The method of claim 14, wherein the body of the liquid is a storage pool filled at least in part with water, and wherein the method further comprises:
identifying a retrieval point for the item, wherein the retrieval point is associated with a second surface position of the body of the liquid; and
initiating a flow of the water within the storage pool in a horizontal direction toward the second surface position at approximately the second time.

16. The method of claim 14, wherein the body of the liquid is a natural body of water having at least a surface flow in a predetermined direction, and
wherein the method further comprises:
prior to the first time, determining a retrieval point for the item, wherein the retrieval point is associated with a second surface position of the body of the liquid, wherein the first surface position is selected based at least in part on the surface flow and the second surface position.

17. The method of claim 5, further comprising:
emitting at least the first signal into the liquid, wherein the first signal comprises:
a first tonal corresponding to the second depth; and
at least one of a second tonal comprising an acoustic checksum or a third tonal comprising an acoustic identifier of at least one of the depth control device or the item;
confirming, by the depth control device, the validity of the first signal based at least in part on at least one of the second tonal or the third tonal; and
in response to confirming the validity of the first signal, selecting the second net density based at least in part on the first tonal.

18. The method of claim 17, further comprising:
in response to confirming the validity of the first signal, emitting, by the depth control device, at least a second signal into the liquid, wherein the second signal comprises at least a fourth tonal corresponding to an acknowledgment of the first signal.

19. The method of claim 5, further comprising:
determining, by the depth control device, that the item is at or near a surface of the liquid; and
in response to determining that the item is at or near the surface of the liquid, transmitting a second signal by the depth control device, wherein the second signal includes at least one of:
a first indication that the item is at or near the surface of the liquid; or
a second indication of a surface position of the item.

20. The method of claim 5, further comprising:
prior to the first time, causing a plurality of items to be deposited in the liquid, wherein the item is one of the plurality of items;
establishing, by the computer system, a schedule for causing a change in depth of each of the plurality of items at a predetermined time; and
transmitting a plurality of signals in accordance with the schedule, wherein each of the plurality of signals is associated with one of the plurality of items, and wherein the first signal is transmitted at approximately the first time in accordance with the schedule.

21. A method comprising:
outfitting an item with a depth control device comprising:
a flexible bladder having an expansion section with a variable interior volume;
a control valve aligned in series between a source of pressurized air and an interior of the expansion section;
a depth sensor;
a position sensor;
a hydrophone;
a transceiver; and
at least one computer processor;
loading the item onto one of an aerial vehicle or a first aquatic vehicle;
causing the one of the aerial vehicle or the first aquatic vehicle to travel to a body of water; and
depositing the item into the body of water by the one of the aerial vehicle or the first aquatic vehicle at a first time, wherein a net density of the item at the first time is greater than a density of water.

22. The method of claim 21, further comprising:
receiving a request for the item at a second time, wherein the request specifies a destination for the item, and wherein the second time follows the first time;
emitting at least a first acoustic signal into the body of water, wherein the first acoustic signal comprises data corresponding to the item and an instruction to rise to a surface of the body of water;
receiving the first acoustic signal by the hydrophone; and
in response to the instruction,
causing the flexible bladder to expand to a predetermined volume at a third time by the control valve, wherein the net density of the item at the third time is less than the density of water with the flexible bladder expanded to the predetermined volume.

23. The method of claim 22, further comprising:
determining that the item is at or near the surface of the body of water at a fourth time by the depth sensor;
determining, by the position sensor, a position of the item at approximately the fourth time;
transmitting, by the transceiver, at a first position signal including data identifying the position of the item;
retrieving, by the first aquatic vehicle or a second aquatic vehicle, the item at or near the position; and
causing, by the first aquatic vehicle or the second aquatic vehicle, the item to be delivered to the destination.

* * * * *